(12) United States Patent
Kwak et al.

(10) Patent No.: US 9,317,198 B2
(45) Date of Patent: Apr. 19, 2016

(54) MULTI DISPLAY DEVICE AND CONTROL METHOD THEREOF

(71) Applicant: Samsung Electronics Co., Ltd, Suwon-si, Gyeonggi-do (KR)

(72) Inventors: Ji-yeon Kwak, Seoul (KR); Dae-hyun Kim, Hwaseong-si (KR); Sang-ho Kim, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 187 days.

(21) Appl. No.: 14/050,871

(22) Filed: Oct. 10, 2013

(65) Prior Publication Data

US 2014/0101578 A1 Apr. 10, 2014

(30) Foreign Application Priority Data

Oct. 10, 2012 (KR) .......................... 10-2012-0112681

(51) Int. Cl.
| | |
|---|---|
| *G06F 13/00* | (2006.01) |
| *G06F 15/00* | (2006.01) |
| *G06F 3/0488* | (2013.01) |
| *G06F 3/01* | (2006.01) |
| *G06F 3/03* | (2006.01) |
| *G06F 1/16* | (2006.01) |

(52) U.S. Cl.
CPC ............ *G06F 3/0488* (2013.01); *G06F 1/1616* (2013.01); *G06F 1/1618* (2013.01); *G06F 1/1647* (2013.01); *G06F 3/017* (2013.01); *G06F 3/0304* (2013.01); *G06F 3/04883* (2013.01)

(58) Field of Classification Search
CPC .... G06F 9/4445; G06F 3/0481; G06F 3/0488
USPC .......... 715/761–765, 778, 851–853, 840–841
See application file for complete search history.

(56) References Cited

U.S. PATENT DOCUMENTS

| | | | |
|---|---|---|---|
| 5,862,251 | A | 1/1999 | Al-Karmi et al. |
| 6,545,669 | B1 | 4/2003 | Kinawi et al. |
| 6,750,858 | B1 | 6/2004 | Rosenstein |
| 6,819,939 | B2 | 11/2004 | Masamura |

(Continued)

FOREIGN PATENT DOCUMENTS

| | | |
|---|---|---|
| EP | 2244166 | 10/2010 |
| EP | 2347317 | 7/2011 |

(Continued)

OTHER PUBLICATIONS

US 7,092,574, 08/2006, Suzuki et al. (withdrawn)

*Primary Examiner* — Kevin Nguyen
(74) *Attorney, Agent, or Firm* — Staas & Halsey LLP

(57) ABSTRACT

A multi display apparatus includes a first body comprising a first display, a second body comprising a second display, a hinge to connect the first and second bodies to each other, a first imaging unit provided on the first body, a second imaging unit provided on the second body, and a controller to recognize a user's gesture using a plurality of images photographed at the first and second imaging units, and perform a corresponding control operation in response to the recognized user gesture. The controller recognizes the user's gesture using a movement of a user object within recognition ranges of the respective imaging units. As a result, the operation of the multi display apparatus can be controlled more easily and conveniently.

28 Claims, 49 Drawing Sheets

(56) References Cited

U.S. PATENT DOCUMENTS

| | | |
|---|---|---|
| 7,006,134 B1 | 2/2006 | Arai et al. |
| 7,120,317 B1 | 10/2006 | Wu et al. |
| 8,049,737 B2 | 11/2011 | Cho et al. |
| 2003/0179422 A1 | 9/2003 | Liu |
| 2004/0020941 A1 | 2/2004 | Engesser et al. |
| 2004/0150671 A1 | 8/2004 | Kamiwada et al. |
| 2006/0062466 A1 | 3/2006 | Zou et al. |
| 2006/0161870 A1 | 7/2006 | Hotelling et al. |
| 2007/0242056 A1 | 10/2007 | Engelhardt et al. |
| 2008/0126955 A1 | 5/2008 | Takatoshi |
| 2008/0148184 A1 | 6/2008 | Davis |
| 2008/0244468 A1 | 10/2008 | Nishihara et al. |
| 2010/0060664 A1 | 3/2010 | Kilpatrick, II et al. |
| 2010/0064244 A1 | 3/2010 | Kilpatrick, II et al. |
| 2010/0073306 A1 | 3/2010 | Hickerson |
| 2010/0079355 A1 | 4/2010 | Kilpatrick, II et al. |
| 2010/0085382 A1 | 4/2010 | Lundqvist et al. |
| 2010/0103099 A1 | 4/2010 | Lee |
| 2010/0182265 A1 | 7/2010 | Kim et al. |
| 2010/0188353 A1 | 7/2010 | Yoon et al. |
| 2010/0245256 A1 | 9/2010 | Estrada et al. |
| 2010/0255862 A1 | 10/2010 | Mitsunaga et al. |
| 2010/0275159 A1 | 10/2010 | Matsubara et al. |
| 2011/0102314 A1 | 5/2011 | Roux |
| 2011/0107226 A1 | 5/2011 | Heo |
| 2011/0187646 A1 | 8/2011 | Mahmoud |
| 2011/0191704 A1 | 8/2011 | Hinckley et al. |
| 2011/0209102 A1 | 8/2011 | Hinckley et al. |
| 2011/0216064 A1 | 9/2011 | Dahl et al. |
| 2011/0291988 A1 | 12/2011 | Bamji et al. |
| 2011/0310031 A1 | 12/2011 | Harris et al. |
| 2012/0015694 A1 | 1/2012 | Han |
| 2012/0042246 A1 | 2/2012 | Schwesinger et al. |
| 2012/0064947 A1 | 3/2012 | Yi et al. |
| 2012/0084710 A1 | 4/2012 | Sirpal et al. |
| 2012/0144323 A1* | 6/2012 | Sirpal et al. ............ 715/761 |
| 2013/0093670 A1* | 4/2013 | Iwai ............................ 345/156 |

FOREIGN PATENT DOCUMENTS

| | | |
|---|---|---|
| JP | 09504884 | 5/1997 |
| JP | 2796768 | 7/1998 |
| JP | 2001-021972 | 1/2001 |
| JP | 2002-281135 | 9/2002 |
| JP | 2004-259297 | 9/2004 |
| JP | 2006-030379 | 2/2006 |
| JP | 2008033686 | 2/2008 |
| JP | 2008-102947 | 5/2008 |
| JP | 2008-262544 | 10/2008 |
| JP | 2011-039942 | 2/2011 |
| JP | 2011221229 | 11/2011 |
| KR | 1020040035019 | 4/2004 |
| KR | 10-0448038 | 9/2004 |
| KR | 1020040091272 | 10/2004 |
| KR | 1020040104777 | 12/2004 |
| KR | 1020050068127 | 7/2005 |
| KR | 1020050078690 | 8/2005 |
| KR | 1020050109190 | 11/2005 |
| KR | 10-0606797 | 8/2006 |
| KR | 1020060092621 | 8/2006 |
| KR | 100653965 | 11/2006 |
| KR | 20070014586 | 2/2007 |
| KR | 1020070022612 | 2/2007 |
| KR | 1020070051249 | 5/2007 |
| KR | 100803504 | 2/2008 |
| KR | 1020080113832 | 12/2008 |
| KR | 1020090065040 | 6/2009 |
| KR | 20090102815 | 9/2009 |
| KR | 1020090092641 | 9/2009 |
| KR | 1020100053597 | 5/2010 |
| KR | 10-0960577 | 6/2010 |
| KR | 1020100086639 | 8/2010 |
| KR | 1020100105005 | 9/2010 |
| KR | 1020100115547 | 10/2010 |
| KR | 1020100121880 | 11/2010 |
| KR | 1020100132772 | 12/2010 |
| KR | 20110053265 | 5/2011 |
| KR | 20110053269 | 5/2011 |
| KR | 20110055718 | 5/2011 |
| KR | 1020110049492 | 5/2011 |
| KR | 20110066165 | 6/2011 |
| KR | 20110069803 | 6/2011 |
| KR | 1020110063410 | 6/2011 |
| KR | 1020110116699 | 10/2011 |
| KR | 10-1094769 | 12/2011 |
| KR | 20110139697 | 12/2011 |
| KR | 20120006674 | 1/2012 |
| KR | 1020120001944 | 1/2012 |
| KR | 1020120026395 | 3/2012 |
| KR | 1020120038692 | 4/2012 |
| WO | 2006086508 | 8/2006 |
| WO | 2012044545 | 4/2012 |

* cited by examiner

FIG. 5
(1)
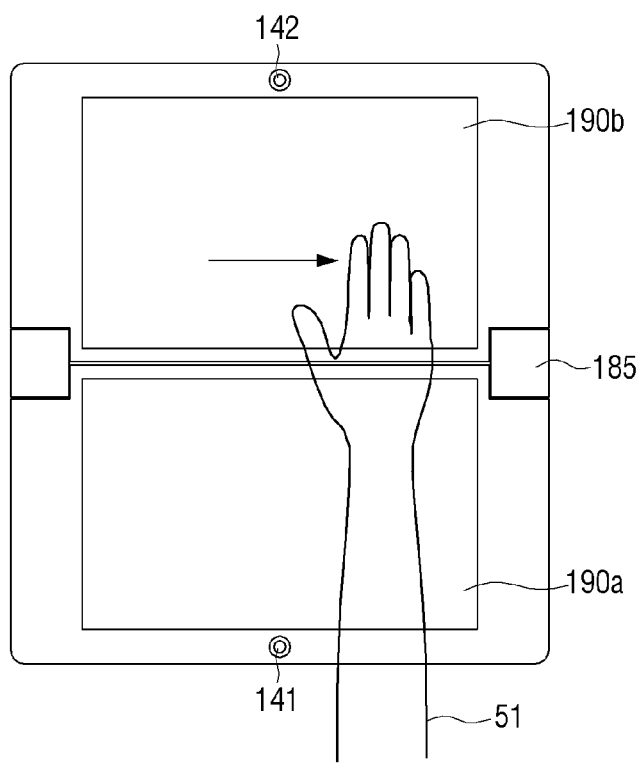
(2)
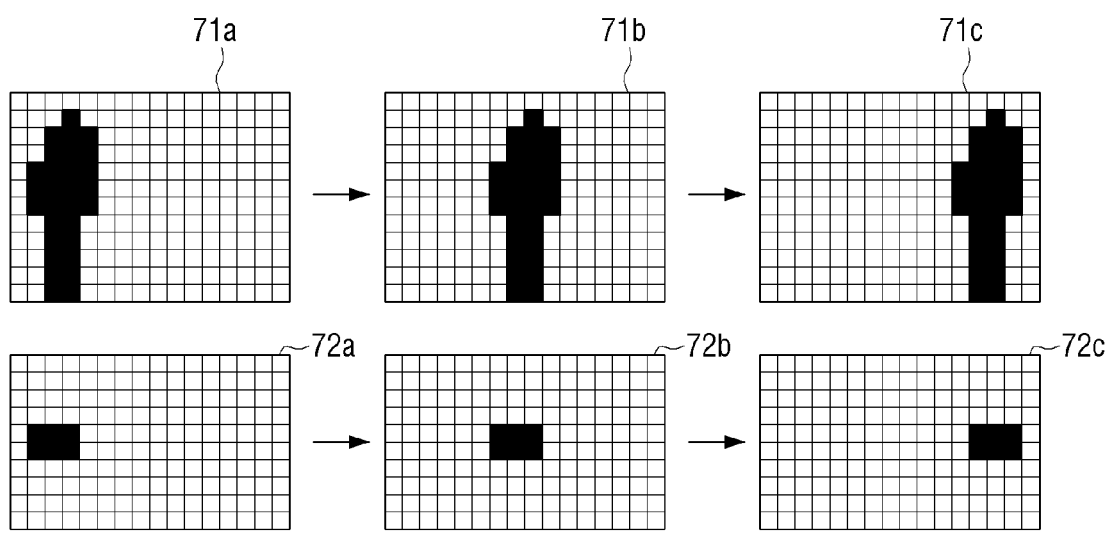

FIG. 6
(1)
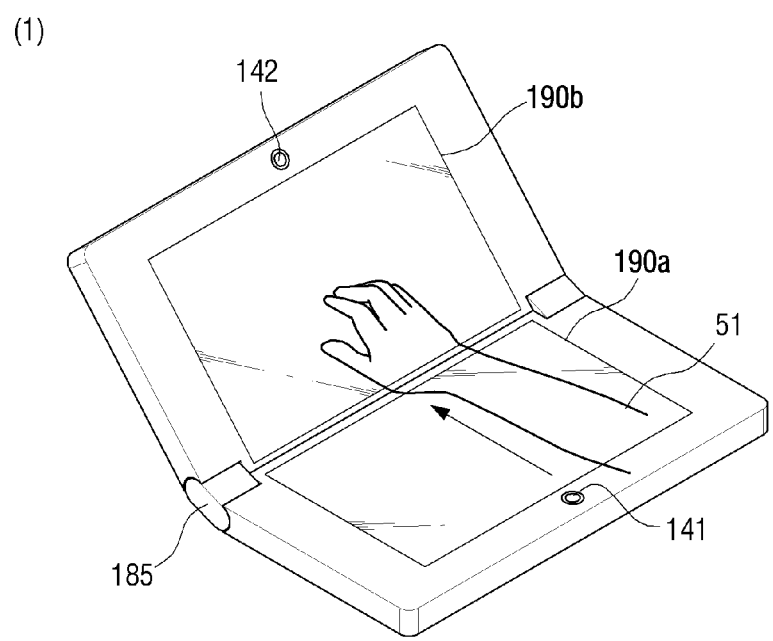
(2)
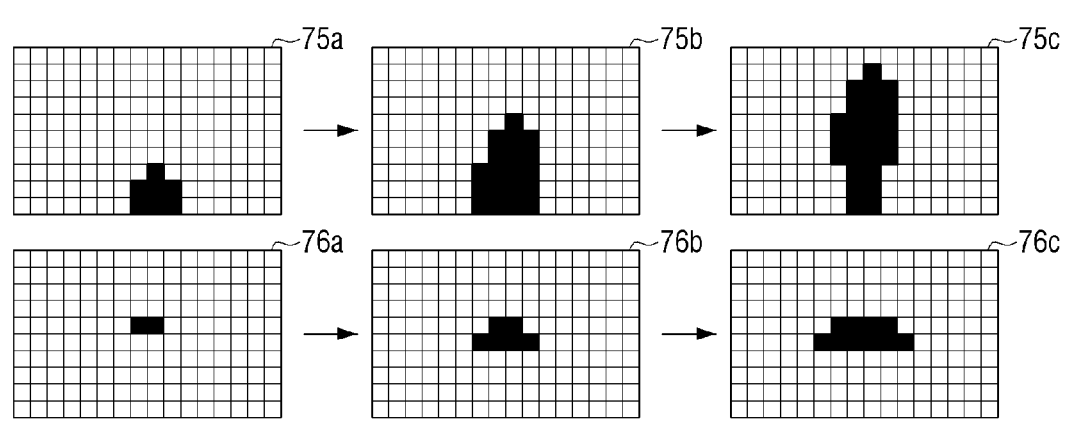

FIG. 7
(1)
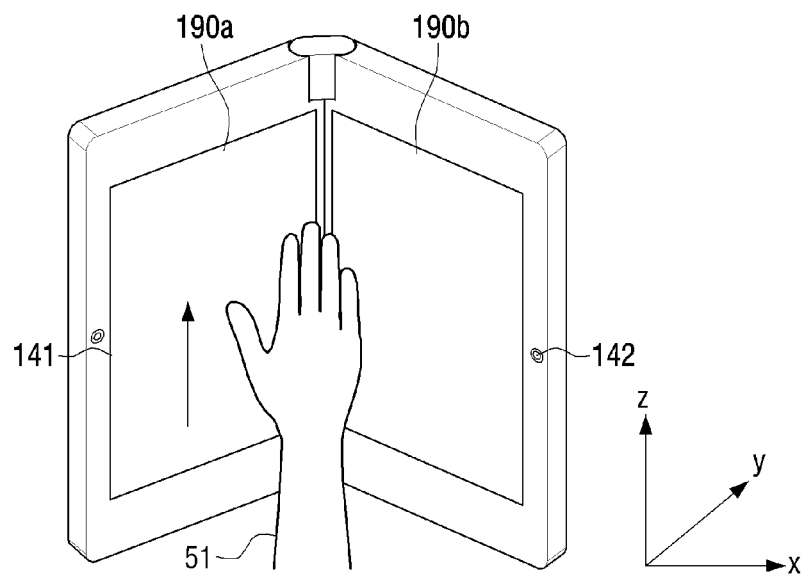
(2)
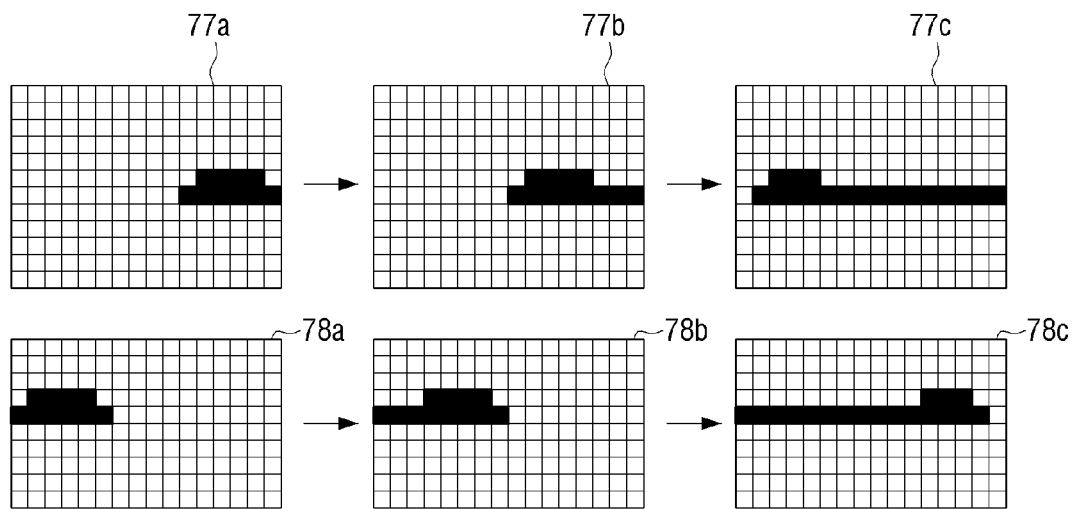

FIG. 16
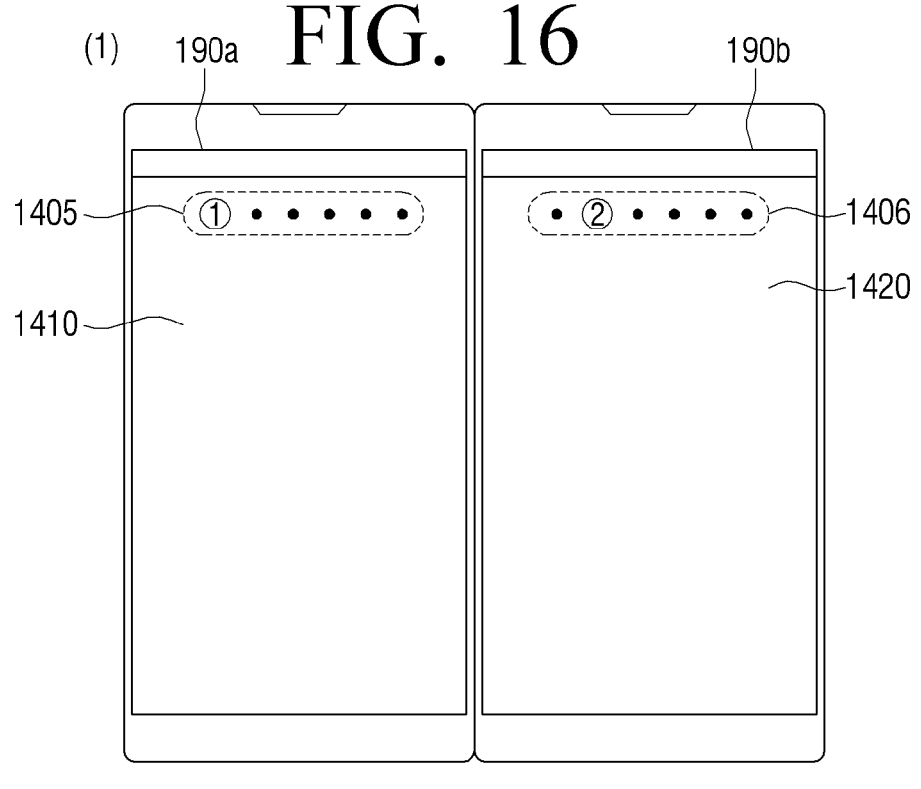
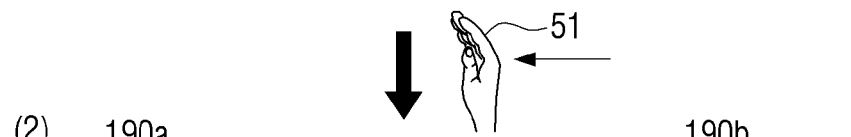
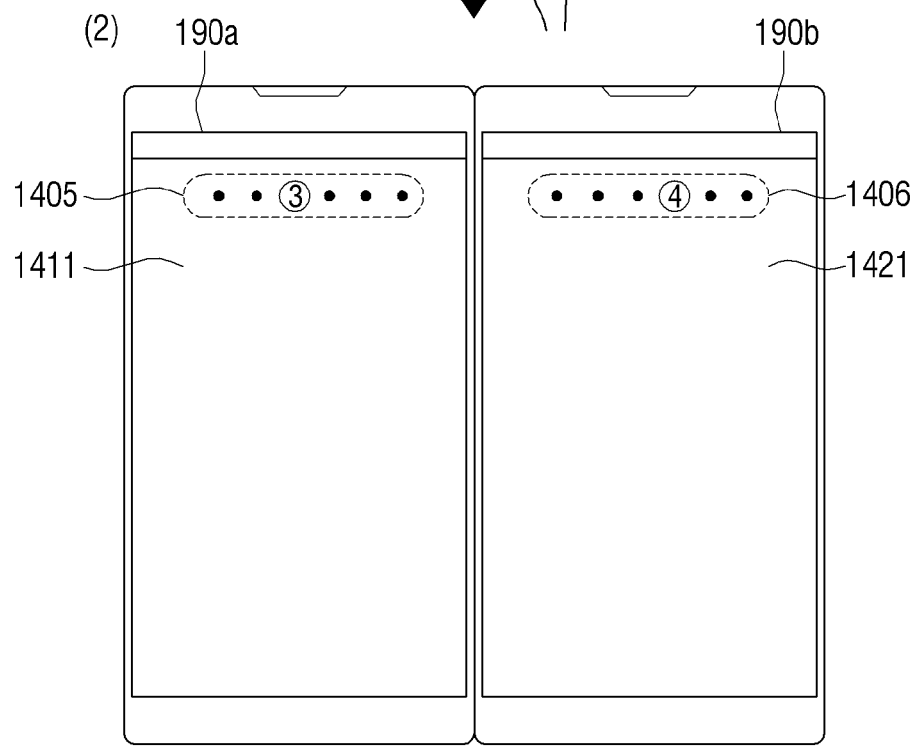

FIG. 18
(1)
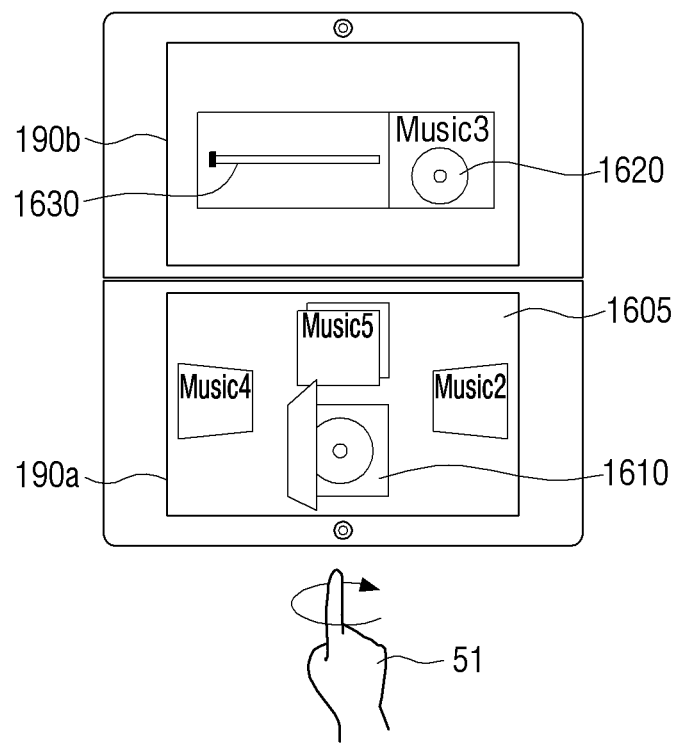
(2)
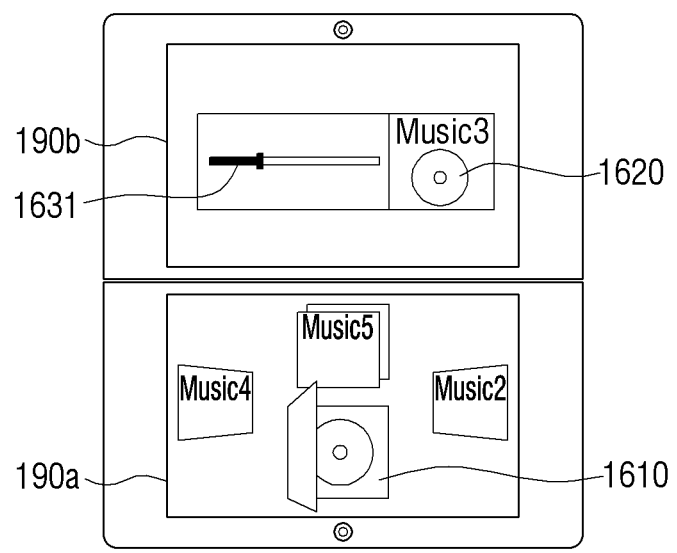

FIG. 20
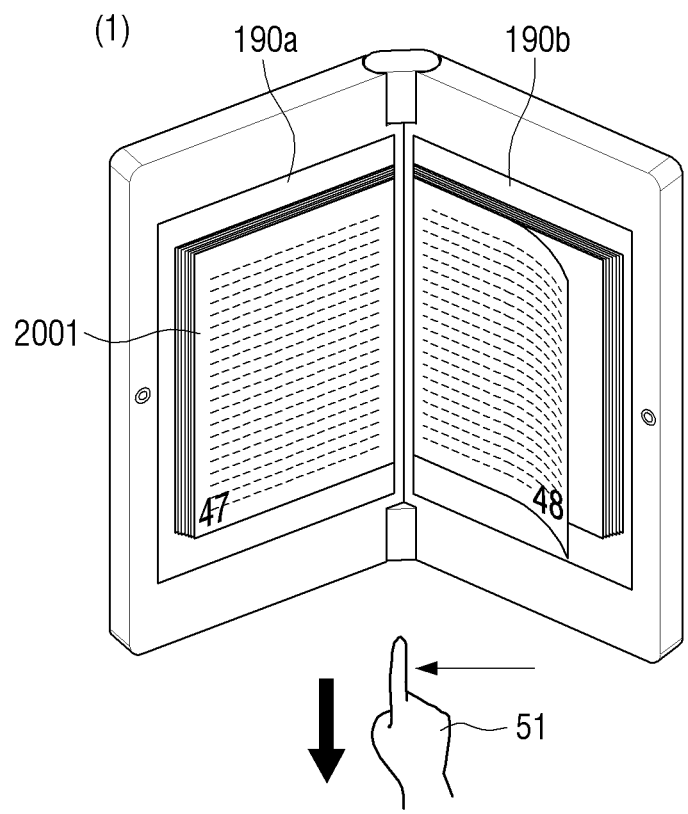
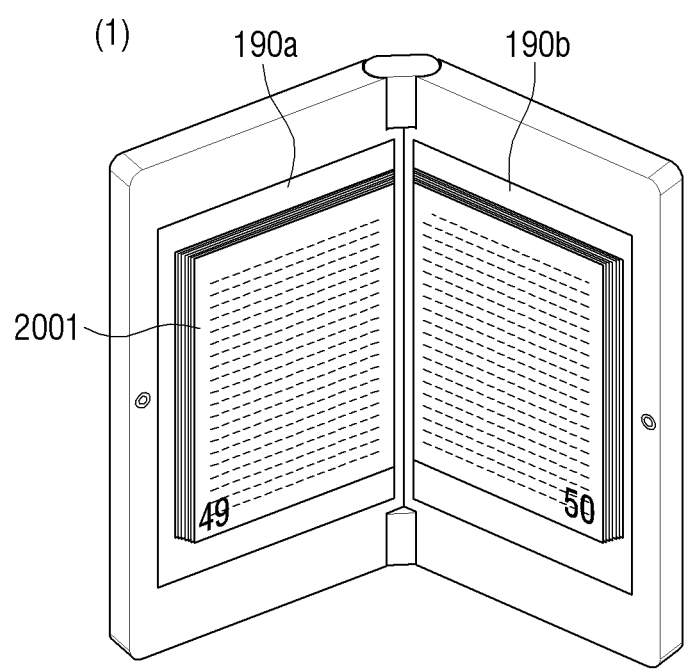

FIG. 21
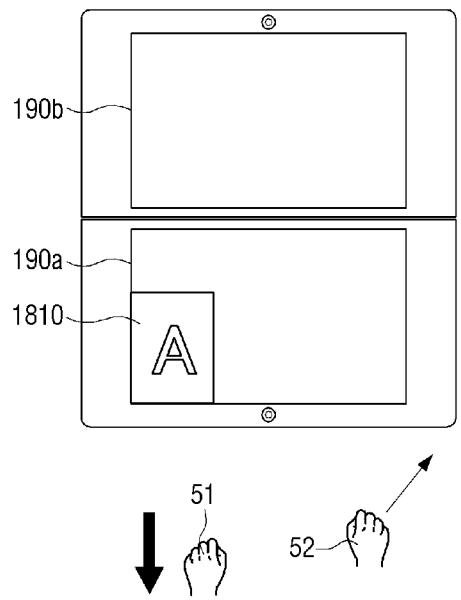
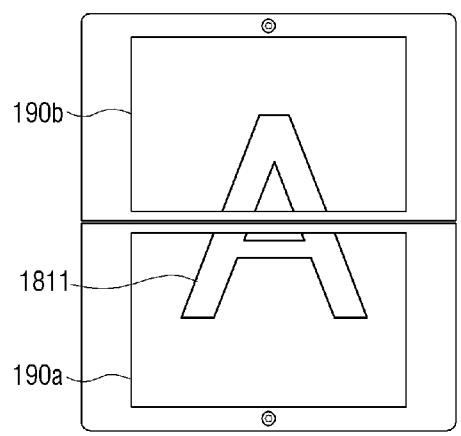
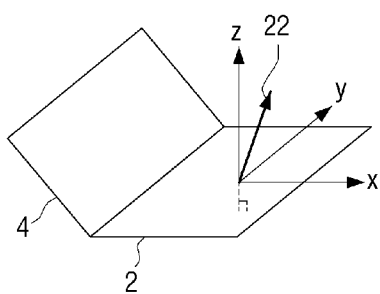

FIG. 23
(1)
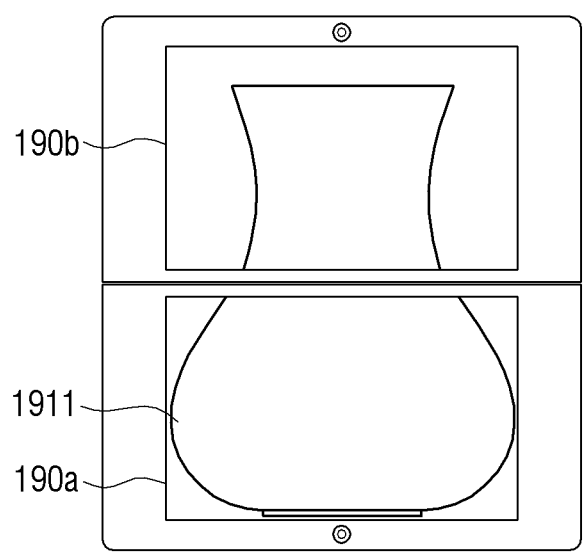
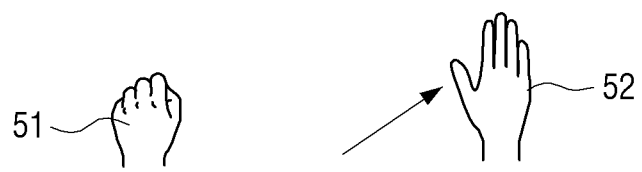
(2)
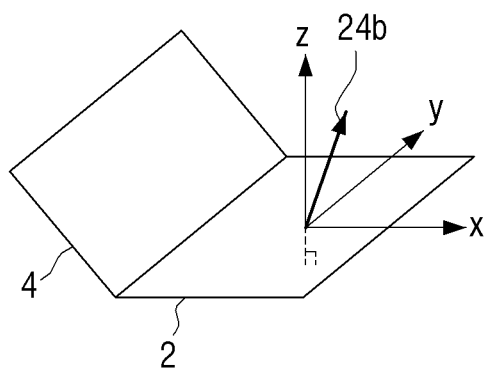

FIG. 24
(1)
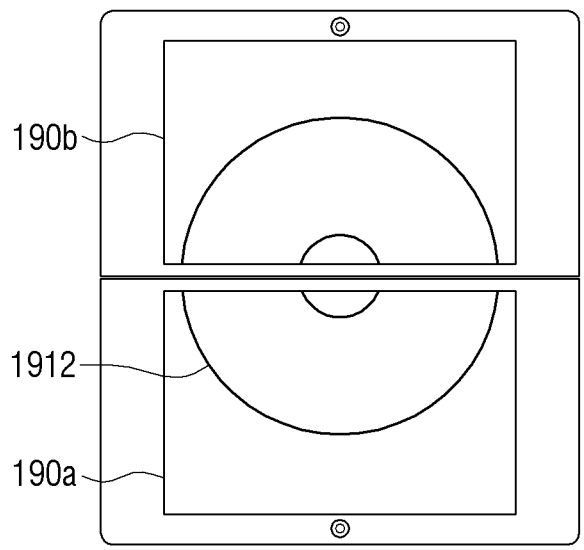
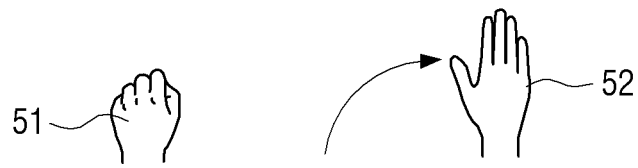
(2)
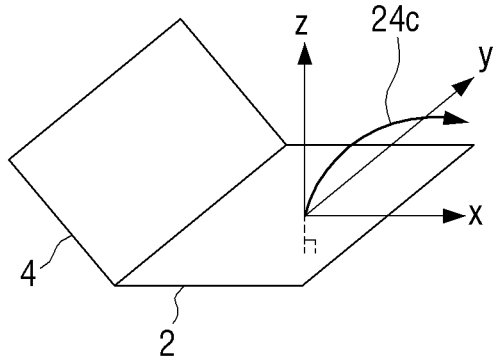

FIG. 25
(1)
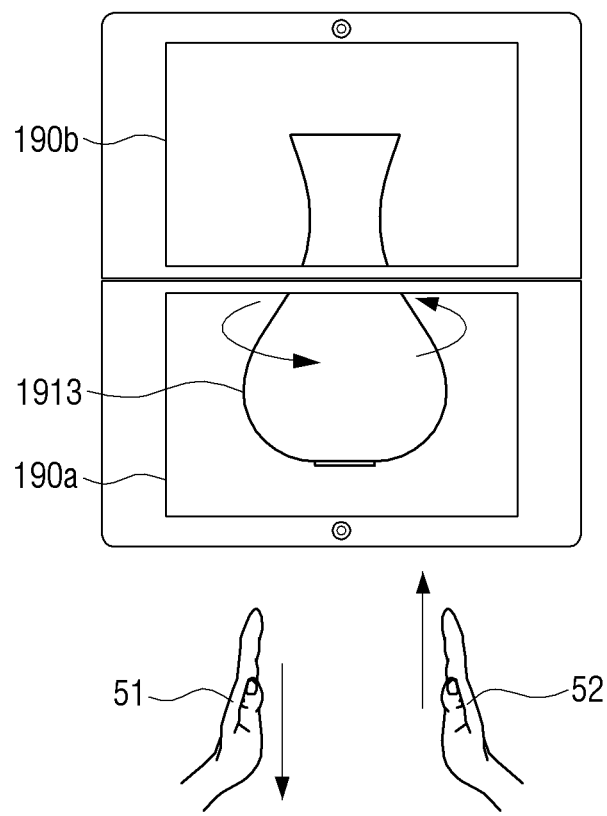
(2)
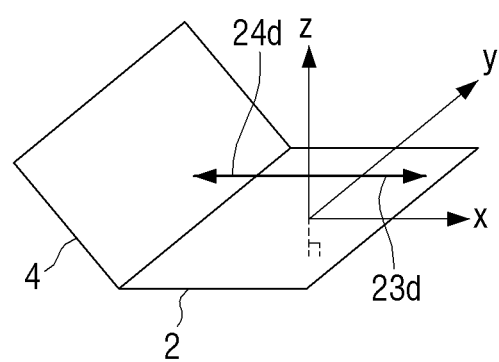

FIG. 26
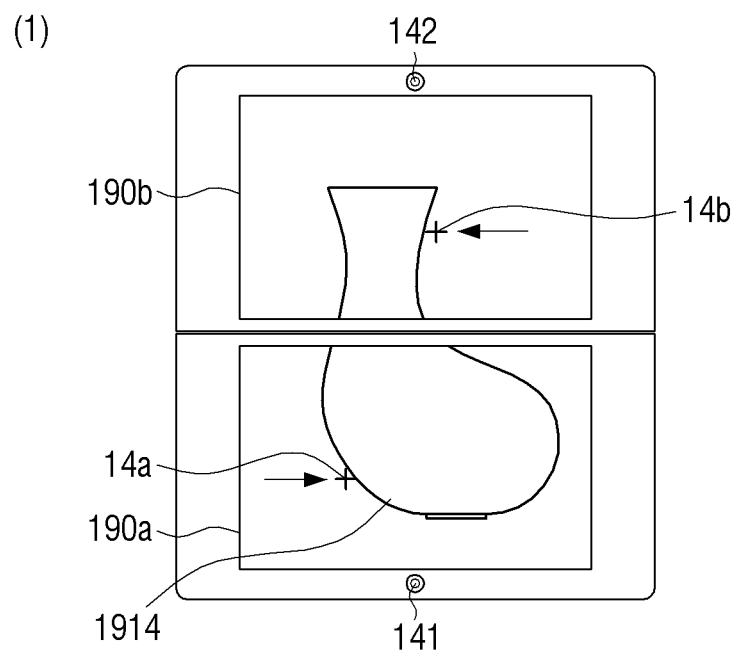
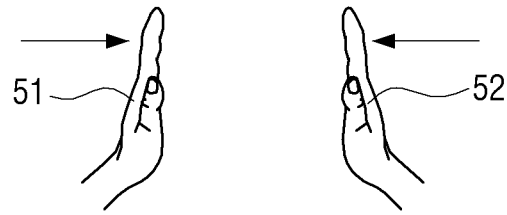
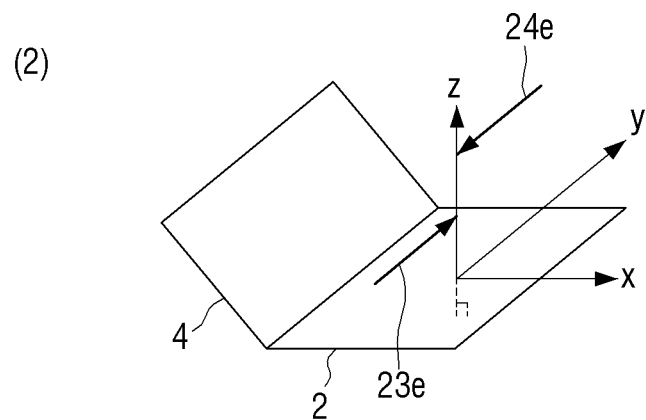

FIG. 27
(1)
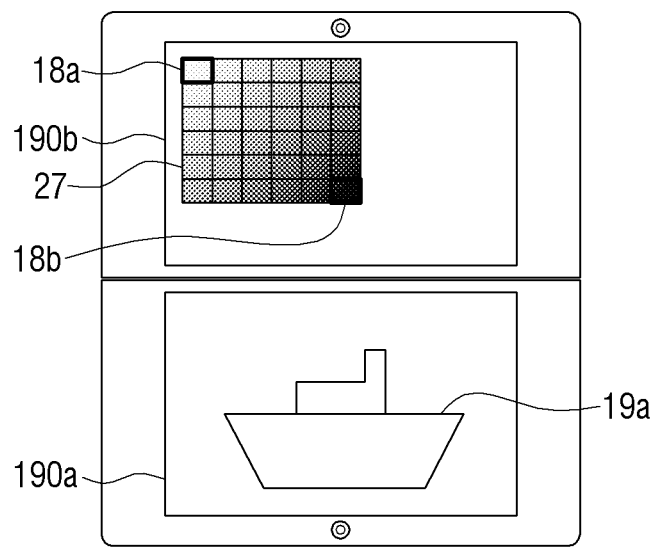
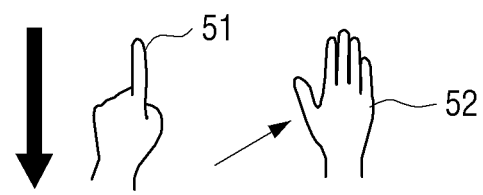
(2)
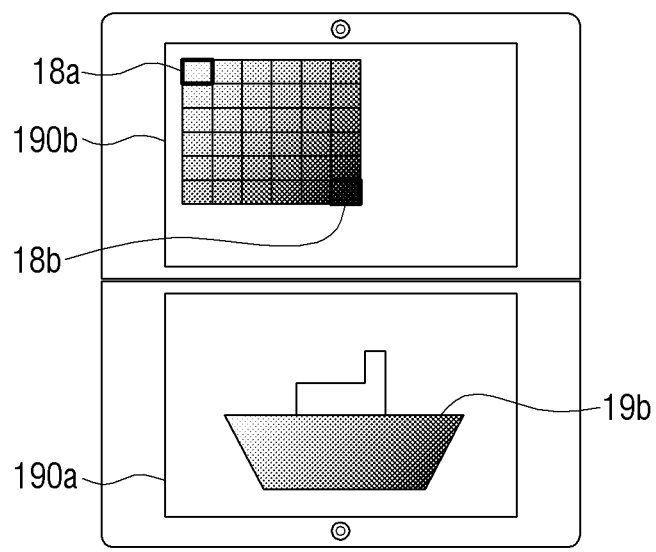

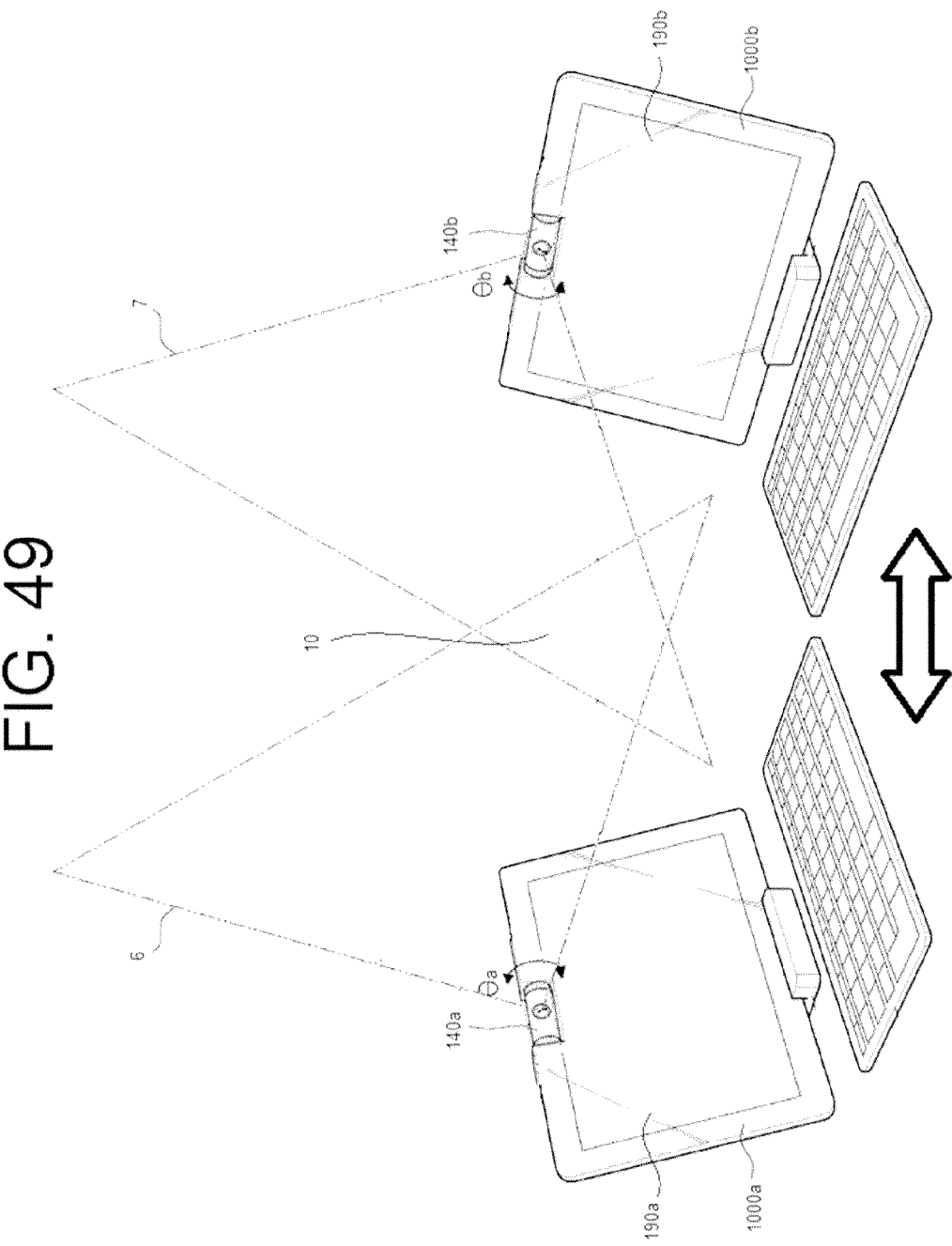

MULTI DISPLAY DEVICE AND CONTROL METHOD THEREOF

CROSS-REFERENCE TO RELATED APPLICATIONS

This application claims priority under 35 U.S.C. §119 from Korean Patent Application No. 10-2012-0112681, filed on Oct. 10, 2012 in the Korean Intellectual Property Office, the disclosure of which is incorporated herein by reference in its entirety.

BACKGROUND OF THE INVENTION

1. Field of the Invention

Devices and methods consistent with what is disclosed herein relate to a multi display device and a control method thereof, and more particularly, to a multi display apparatus which displays a plurality of task screens through a plurality of displays and controls operations according to user's gestures, and a control method thereof.

2. Description of the Related Art

Various types of display devices are available nowadays. These display devices can be installed with various applications which are executed in response to a user's selection. A user can control an electronic apparatus through an input device, while viewing through the display device the operation of the application currently implemented on the electronic apparatus. A portable electronic device designed to be carried around by a user generally requires a touch screen-type user interface (UI) due to limited size thereof. Accordingly, various forms of graphical user interfaces (GUI), operable by touches of a user, are provided.

The GUIs are provided in optimized forms to enable a user to recognize the operations of the currently-running application intuitively, and control the corresponding device easily and rapidly. Accordingly, various GUI methods are developed according to forms of applications or display devices.

However, the conventional user interface is mostly generated for a display device which employs one display unit only. Accordingly, a UI method that is suitable for a multi display device having a plurality of display units has a long way to go.

Meanwhile, the advanced technologies related to a central processor unit (CPU) or software have enabled a multi display device to provide a plurality of task screens on which one or a plurality of applications are displayed. The plurality of task screens are provided through one or more touch screens which are physically or graphically divided from one another.

Therefore, a controlling technology is necessary, which can enable a user to use a multi display device more intuitively and easily while the multi display device provides a plurality of task screens thereon.

SUMMARY OF THE INVENTION

Additional features and utilities of the present general inventive concept will be set forth in part in the description which follows and, in part, will be obvious from the description, or may be learned by practice of the general inventive concept.

Exemplary embodiments of the present general inventive concept provide a multi display device which is controllable with a spatial gesture, and a control method thereof.

Exemplary embodiments of the present general inventive concept provide a multi display apparatus which may include a first body including a first display, a second body including a second display, a hinge to connect the first and second bodies to each other, a first imaging unit provided on the first body and having a first recognition range, a second imaging unit provided on the second body and having a second recognition range, and a controller to recognize a user's gesture using a plurality of images photographed at the first and second imaging units, and perform a corresponding control operation in response to the recognized user gesture, the controller recognizing the user's gesture within an overlapping range between the first recognition range and the second recognition range, using a direction of movement of a user object moving in the first recognition range and a direction of movement of the user object moving in the second recognition range.

The controller may detect an angle between the first and second bodies with reference to the hinge, and activate the first and second imaging units when the detected angle is within a preset angle range.

The controller may recognize the user's gesture three-dimensionally.

The controller may recognize the user's gesture as a stereo image.

When the user object moves, thus forming one successive pattern, the controller may successively perform a plurality of control operations corresponding to respective user's gestures forming the successive pattern.

The user's gesture may include one of a single finger gesture, a two finger gesture, a multi finger gesture, a palm gesture, a multi palm gesture, a fist gesture, and a multi fist gesture.

The controller may perform an operation of selecting an icon, when recognizing a grip gesture with respect to the icon displayed on the first or second display.

Exemplary embodiments of the present general inventive concept also provide a control method of a multi display apparatus including a first body having a first display, a second body having a second display, and a hinge which connects the first and second bodies to each other, the method including photographing a user object, using a first imaging unit provided on the first body and a second imaging unit provided on the second body, recognizing a user's gesture within an overlapping range between a first recognition range of the first imaging unit and a second recognition range of the second imaging unit, using a plurality of images of the user object photographed by the first and second imaging units, respectively, to determine a direction of movement of the user object moving in the first recognition range and a direction of movement of the user object moving in the second recognition range, and performing a corresponding control operation in response to the recognized user's gesture.

The recognizing the user's gesture may include detecting an angle between the first and second bodies with reference to the hinge, and activating the first and second imaging units when the detected angle is within a preset angle range.

The user's gesture may be recognized three-dimensionally.

The user's gesture may be recognized as a stereo image.

When the user object moves, thus forming one successive pattern, the performing the control operation may include successively performing a plurality of control operations corresponding to respective user's gestures forming the successive pattern.

The user's gesture may include one of a single finger gesture, a two finger gesture, a multi finger gesture, a palm gesture, a multi palm gesture, a fist gesture, and a multi fist gesture.

The performing the control operation may include performing an operation of selecting an icon, when a grip gesture with respect to the icon displayed on the first or second display is recognized.

A non-transitory computer-readable medium may contain computer-readable codes as a program to execute the control method.

Exemplary embodiments of the present general inventive concept also provide a multi display apparatus, including a plurality of displays, a first imaging unit having a first recognition range, a second imaging unit having a second recognition range, and a controller to determine a user gesture based on the images of a first user object captured by the first and second imaging units in a gesture recognition area where the first and second recognition ranges overlap, and to perform a command operation corresponding to the determined user gesture.

The first user object may include at least one of a user's hand, a user's face, a user's eye, or a stylus pen.

The user gesture may correspond to a movement of a first user object determined by the controller based on the plurality of images of the first user object captured by the first and second imaging units.

The plurality of displays may be connected to one another by a flexible connector.

The multi display apparatus may further include a sensor to determine an orientation of the plurality of displays relative to each other. The controller may perform a command operation corresponding to the determined user gesture and the determined orientation of the plurality of displays.

The first and second imaging units may capture a plurality of images of a plurality of user objects, and the controller may determine the user gesture based on the plurality of images of the plurality of user objects captured by the first and second imaging units.

The command operation may include transferring content from a first one of the plurality of displays to a second one of the plurality of displays.

The content may include an application executable by the controller, the application being executed after it is transferred to the second one of the plurality of the displays.

At least one of the first and second recognition ranges may be adjusted independently of an orientation of the displays.

At least one of the plurality of displays may be a touch screen.

The touch screen may be configured to accept input from the first user object when the first user object approaches within a predetermined distance from the touch screen.

The plurality of displays may be connected wirelessly to each other and the controller.

Exemplary embodiments of the present general inventive concept also provide a control method of a multi display apparatus having a plurality of displays, the method including capturing a plurality of images of a first user object within a first recognition range, capturing a plurality of images of the first user object within a second recognition range, determining a user gesture within a gesture recognition area where the first and second recognition ranges overlap, based on the captured images of the first user object, and performing a command operation corresponding to the determined user gesture.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 5 to 7 illustrate a method of recognizing a motion at a multi camera, according to an exemplary embodiment of the present general inventive concept;

FIGS. 16 to 20 illustrate a user interface (UI) changed in response to a single gesture, according to an exemplary embodiment of the present general inventive concept;

FIGS. 21 to 27 illustrate a user interface (UI) changed in response to multi gesture, according to an exemplary embodiment of the present general inventive concept;

FIG. 49 illustrates two display devices connected wirelessly according to another exemplary embodiment of the present general inventive concept.

DETAILED DESCRIPTION OF THE PREFERRED EMBODIMENTS

Figure 1:
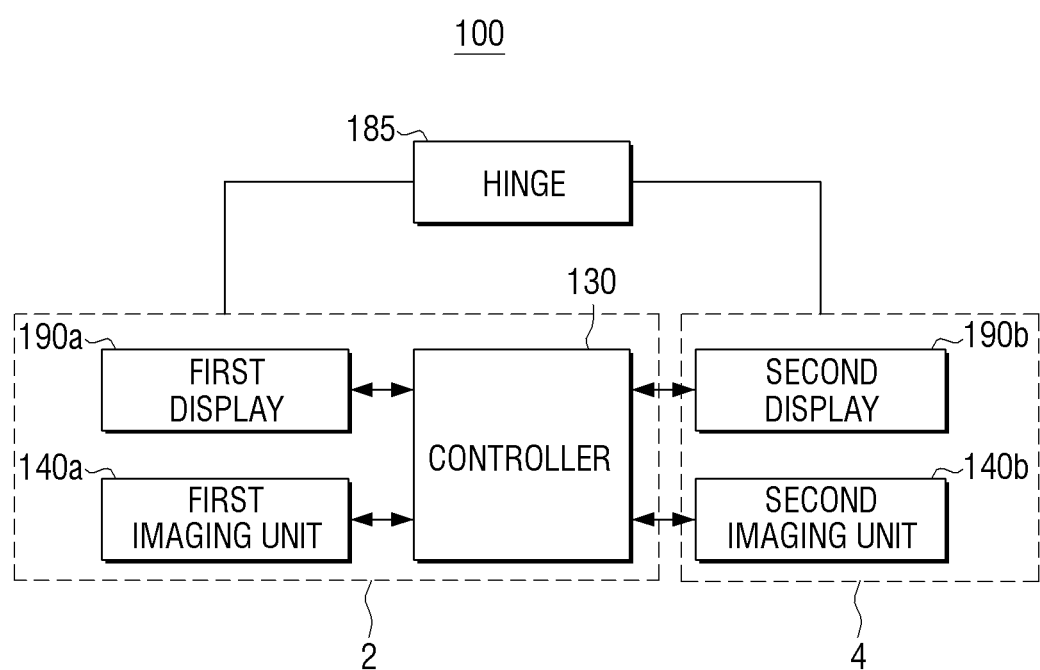
FIG. 1 is a block diagram illustrating a multi display apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, the same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present general inventive concept can be carried out without those specifically defined matters. Also, well-known functions or constructions are not described in detail since they would obscure the invention with unnecessary detail.

As used herein, a 'multi display apparatus' refers to an apparatus including one or more displays, to implement an application or display contents, an example of which includes a tablet personal computer (PC), a notebook, a laptop computer, a portable multimedia player (PMP), a personal digital assistance (PDA), a smart phone, a mobile phone, or a digital frame. One or more of the displays may be touch screens, depending on the exemplary embodiment of the present general inventive concept.

FIG. 1 is a block diagram illustrating a multi display apparatus 100 according to an exemplary embodiment of the present general inventive concept.

Referring to FIG. 1, the multi display apparatus 100 may include a first body 2, a second body 4, and a hinge 185. The first body 2 may include a controller 130, a first imaging unit 140a, and a first display 190a. The second body 4 may include a second imaging unit 140b, and a second display 190b. Depending on need, the controller 130 may be included in the second body 4, or alternatively, a plurality of controllers 130 may be included in both of the first and second bodies 2, 4.

The first and second bodies 2, 4 may be connected via the hinge 185. The first and second bodies 2, 4 may be rotated about the hinge 185. Accordingly, the first and second displays 190a, 190b may be open, with rear sides thereof being in contact with each other. Alternatively, depending on the structure of the hinge 185, the first and second displays 190a, 190b may be open completely, i.e., the angle of the hinge is 180°. The various forms of the first and second bodies 2, 4 open with reference to the hinge 185 will be explained below.

The controller 130 may display various screens using one or more of the first and second displays 190a, 190b. The first and second displays 190a, 190b may together display one screen thereon, i.e., they may display portions of a single screen too large to fit on one of the first or second displays 190a 190b. The first and second displays 190a, 190b may also display different screens from each other. The controller 130 may display various screens by selectively activating the first and second displays 190a, 190b according to various conditions including an application being implemented, type of contents, or selection made by the user. FIG. 1 illustrates a 'dual display apparatus' which has two displays 190 (i.e., first and second displays 190a, 190b) therein. However, considering that there may be two or three or more displays 190 depending on exemplary embodiments of the present general inventive concept, the display apparatus according to an exemplary embodiment of the present general inventive concept will be hereinbelow referred to as a 'multi display apparatus' 100.

The first and second imaging units 140a, 140b may be provided in the first and second bodies, 2, 4, respectively. Each of the first and second imaging units 140a, 140b may respectively include a camera (141, 142, illustrated in FIG. 2). The cameras 141, 142 may each include a lens and an image sensor (not illustrated).

A universal lens, a wide-angle lens, or a zoom lens may be used in each camera 141, 142. The first and second imaging units 140a, 140b may be implemented as the cameras 141, 142 with the same kind of lens, but may have different types of lenses, depending on needs.

The controller 130 controls an operation of the multi display apparatus 100 according to various user manipulation including, such as, a user touch, a selection on a button 161 (illustrated in FIG. 39) provided on the first and second bodies 2, 4, a user gesture, or voice. For example, a power button (not illustrated) may be provided on the first and second bodies 2, 4, in which case turn-on or turn-off of the multi display apparatus 100 may be implemented according to a selection made with respect to the power button. In another example, a menu (not illustrated) may be indicated on the first and second displays 190a, 190b, in which case an operation corresponding to a specific menu may be implemented as a user touches the specific menu.

In a user gesture recognition mode, the controller 130 may recognize a user gesture using a plurality of images captured at the first and second imaging units 140a, 140b, respectively. Referring to FIG. 1, a plurality of imaging units 140a, 140b may be mounted on different bodies 2, 4 from each other, and may photograph a subject (e.g., user's hand, face, or other input device) from different angles. When the imaging units 140a, 140b photograph a user object 51 (illustrated in FIG. 5) at different angles from each other, not only a simple two-dimensional motion, but also three-dimensional motion may be detected. As a result, more user gestures can be recognized, and a resultant recognition result is more accurate. The meaning of the expression 'user object 51' may be defined as a means to input a command to the multi display apparatus 100, and an example thereof may be part of user's body such as a hand, or an external device such as a pen 51a.

The controller 130 may recognize the user gesture by comprehensively considering a plurality of images captured at the first and second imaging units 140a, 140b. A method of recognizing the user gesture by comprehensively considering a plurality of images will be explained below.

When the user gesture is recognized, the controller 130 performs an operation corresponding to the user gesture. That is, the controller 130 may implement various operations including, for example, executing an application, selecting various icons, moving a cursor, finishing an application, changing a mode, or executing a function. Alternatively, the controller 130 may implement a screen-related operation of exchanging screens between the first and second displays 190a, 190b, expanding a screen displayed on one of the first and second displays 190a, 190b, so that the screen is not displayed on both the first and second displays 190a, 190b, or reducing or removing the screen. Operations corresponding to the respective user gestures may be previously set and stored at a storage 170 (illustrated in FIG. 39).

Additionally, the controller 130 may detect an angle between the first and second bodies 2, 4 and inform the detected angle to the user, and implement an operation matching the detected angle.

The various operations of the controller 130 will be explained below, after explanation about external structure of a multi display apparatus 100 according to an exemplary embodiment of the present general inventive concept.

Figure 2:
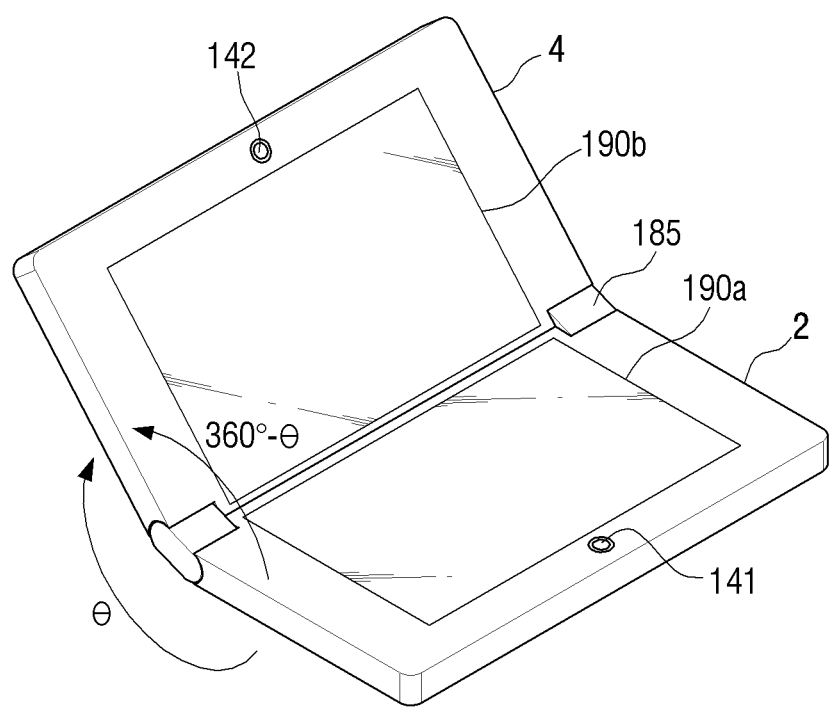
FIG. 2 is a perspective view illustrating a multi display apparatus having two cameras, according to an exemplary embodiment of the present general inventive concept.

FIG. 2 is a perspective view illustrating a multi display apparatus 100 having two cameras 141, 142, according to an exemplary embodiment of the present general inventive concept.

Referring to FIG. 2, the first and second bodies 2, 4 of the multi display apparatus 100 may be connected via the hinge 185 and moveable with respect to each other. The angle between the first and second bodies 2, 4 may be a random angle between 0 to 360 degrees. A first camera 141 may be arranged on an edge area of the first body 2, i.e., at a center portion of an edge area opposite to the hinge 185. A second camera 142 may be arranged on an edge area of the second body 4, i.e., at a center portion of the edge area opposite to the hinge 185.

When a gesture recognition mode is activated, the controller 130 may photograph a subject using the first and second cameras 141, 142, determine a user gesture using the photographed result, and perform an operation corresponding to the user gesture. The gesture recognition mode may be activated when a user manipulates buttons 161 (illustrated in FIG. 39), when one of the bodies 2, 4 rotates relative to the other, or when a specific gesture is recognized.

For example, in an exemplary embodiment of the present general inventive concept of changing to the gesture recognition mode in response to a body rotation, when the user rotates one or more of the first and second bodies 2, 4 so that the angle therebetween increases to more than a predetermined angle, the controller 130 may operate in the gesture recognition mode. As a result, the user may be able to control the operation of the multi display apparatus 100 with his gestures.

The angles of photography by the first and second cameras 141, 142 may differ, depending on the angle (i.e., 360-Θ) between the first and second bodies 2, 4. A manufacturer may previously set and store a recognition angle, by considering an angle at which the user's gesture can be more efficiently recognized, or a posture that the user most frequently has when using the multi display apparatus 100, etc. The controller 130 may automatically operate in gesture recognition mode, when the angle (360Θ) between the first and second bodies 2, 4 is within a preset recognition angle range. In one exemplary embodiment of the present general inventive concept, the multi display apparatus 100 may operate in the gesture recognition mode, when the angle (360-Θ) between the first and second bodies 2, 4 is between 60 and 150 degrees.

The multi display apparatus 100 may alarm the user when reaching an angle for gesture recognition mode. In one exemplary embodiment of the present general inventive concept, the user may be aware of the gesture recognition mode, when the hinge 185 is open to reach a limit at which the gesture recognition mode starts, as a protrusion or a stopper is clicking in.

In another exemplary embodiment of the present general inventive concept, the user may be aware of the gesture recognition mode, as the controller 130 generates an alarm sound or visual message at an angle limit at which the gesture recognition mode starts. The alarm sound may include for example a beep, melody or voice.

In yet another exemplary embodiment of the present general inventive concept, the multi display apparatus 100 may operate in gesture recognition mode irrespective of the angle, i.e., when the user touches a gesture recognition mode menu (not illustrated) on the displays 190a, 190b, or when the user presses a gesture recognition mode key (not illustrated) on the first or second body 2, 4.

The user's motion within a recognition range 6, 7 of the cameras 141, 142 is required, in order for the multi display apparatus 100 to recognize the user's gesture. The 'user's motion' as used herein may include for example a motion of user's hand or pen as perceived through the first or second camera 141, 142.

As explained above, in various exemplary embodiments of the present general inventive concept, the first and second cameras 141, 142 may be turned off or inactivated before the gesture recognition mode is implemented, and then activated as the gesture recognition mode is implemented.

Meanwhile, the gesture recognition mode may be performed when a specific gesture is recognized. In this exemplary embodiment of the present general inventive concept, the first and second cameras 141, 142 are always activated. The controller 130 may continuously monitor the user's gesture as captured through the first and second cameras 141, 142, and automatically change to the gesture recognition mode when recognizing a specific gesture, such as, for example, user's hand or finger pushing toward the direction of the screen. An operation may not be implemented in response to a user gesture if the specific gesture is not made, in which case the operation is implemented only in response to a touch, button manipulation, or voice manipulation.

Figure 3:
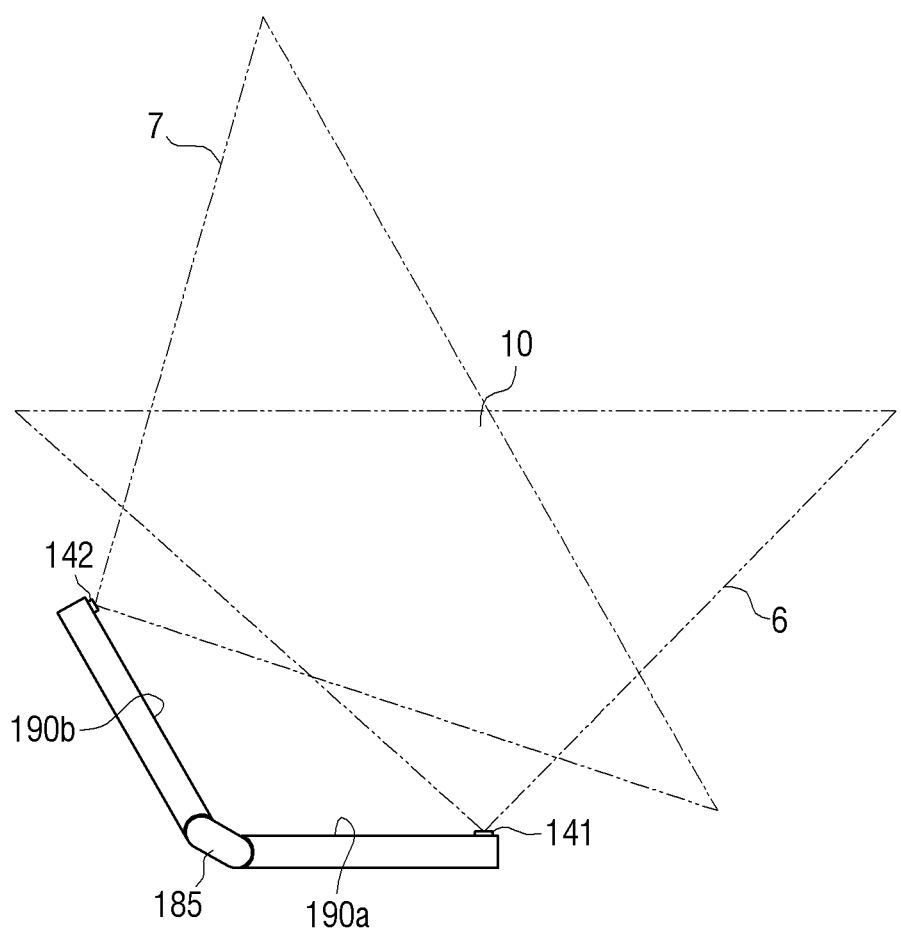
FIGS. 3 to 4 illustrate a range of recognizing gesture, according to various exemplary embodiments of the present general inventive concept.
Figure 4:
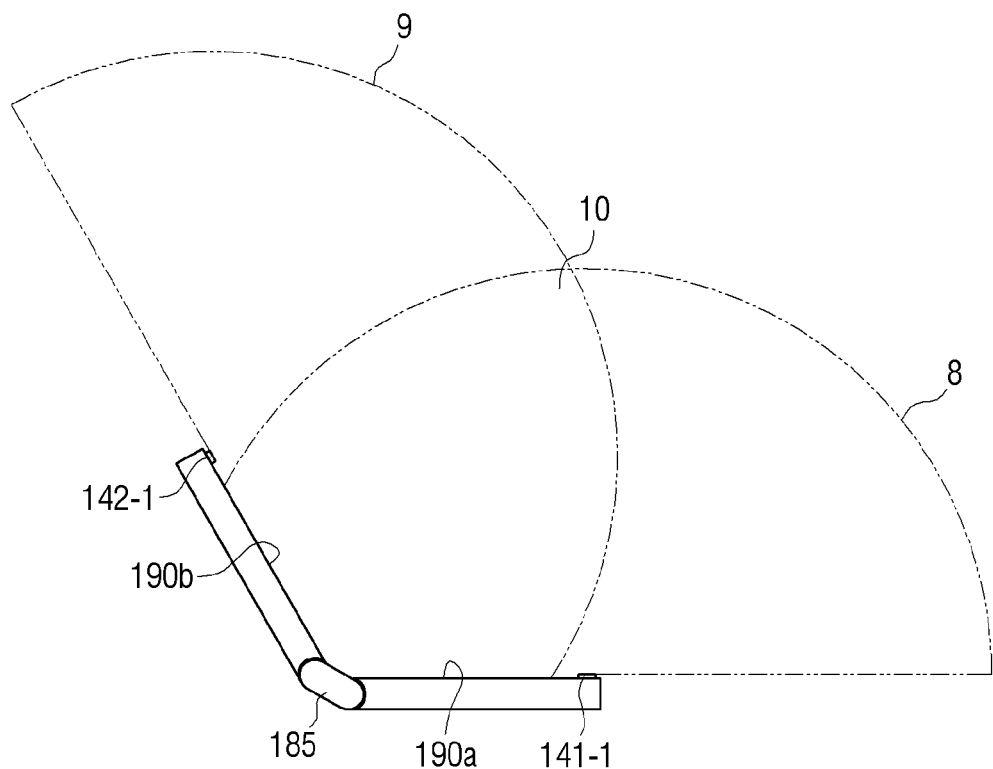

FIGS. 3 to 4 illustrate a range of gesture recognition according to various exemplary embodiments of the present general inventive concept.

FIG. 3 illustrates gesture recognition ranges 6, 7 when general cameras 141, 142 are arranged in the multi display apparatus 100. The first and second cameras 141, 142 are provided to the first and second bodies 2, 4. Each camera 141, 142 may have a predetermined view angle. The 'view angle' refers to a horizontal or vertical angle of view that can be included in a predetermined screen at photographing. When the first and second cameras 141, 142 are general cameras that use standard lenses, the view angle may be approximately 45 degrees. It is also important that the 3-dimensional shape of the user object 51 or user motion is recognized, to ensure that the 3D gesture is recognized accurately. Accordingly, the overlapping part between recognition range 6 of the first camera 141 and recognition range 7 of the second camera 142 is set as the gesture recognition area 10.

The overlapping part between the respective recognition ranges 6, 7 of the first and second cameras 141, 142 is maintained constantly, even when the angle between the first and second bodies 2, 4 changes. However, the distance between the multi display apparatus 100 and the area of gesture recognition may vary according to the angle between the first and second bodies 2, 4.

In another exemplary embodiment of the present general inventive concept, the first and second cameras 141, 142 of the multi display apparatus 100 may have zoom lenses (not illustrated). As explained above, distance to the gesture recognition ranges 6, 7 may vary depending on the angle between the first and second bodies 2, 4. Accordingly, the camera 141 or 142 having the zoom lens may maintain a constant recognition distance from the user object 51, using zoom function.

FIG. 4 illustrates gesture recognition ranges 8 and 9, when wide angle cameras 141-1 and 141-2 are arranged in the multi display apparatus 100. The 'wide angle camera' refers to a camera that includes lenses with wider field of view than general cameras. A representative example of a wide angle camera is fisheye lens. Referring to FIG. 4, first and second cameras 141-1, 142-1 having wide angle lenses may be included in the first and second bodies 2, 4, respectively. FIG. 4 also illustrates respective recognition ranges 8, 9 of the first and second cameras 141-1, 142-1 of the multi display apparatus 100. The first and second cameras 141-1, 142-1, being wide angle cameras, have wider recognition ranges 8, 9 than those recognition ranges 6, 7 of the cameras 141, 142 illustrated in FIG. 3. For example, when the first and second cameras 141-1, 142-1 are fisheye lens cameras, the first and second cameras 141-1, 142-1 each have a view angle of 180 degrees. Accordingly, when wide angle cameras 141-1, 142-1 are implemented, the multi display apparatus 100 may ensure a wider gesture recognition area 10 than when general cameras 141, 142 are implemented. It will be understood that cameras 141-1 and 142-1 are substantially identical to cameras 141, 142, with the exception of using wide angle lenses. Accordingly, exemplary embodiments of cameras 141, 142, discussed below, may also be applied to cameras 141-1, 142-1.

As illustrated in FIGS. 3 and 4, the first and second bodies 2, 4 are rotated about the hinge to have a predetermined angle therebetween, only at such a situation the camera recognition ranges 6, 7 overlap to create a gesture recognition area 10. Accordingly, on certain occasions, such as when the multi display apparatus 100 is closed or open by 180 degrees, user gesture recognition may be impossible or unnecessary. In these occasions, at least one camera 141, 142 may be inactivated to save power consumption. The 'inactivation' may refer to an operation of shutting off electricity to turn off a camera 141 or 142, or closing a lens cover. For example, in a closed state, both the cameras 141, 142 may be inactivated, while when the multi display apparatus 100 is open so that the cameras 141, 142 are apart from each other by more than a preset angle, all or one of the cameras 141, 142 may be activated. The 'activation' may refer to an operation of re-supplying to turn on the camera 141 or 142, or opening the lens cover.

In the gesture recognition mode, the multi display apparatus 100 may generally activate the two cameras 141, 142 arranged at the first and second bodies 2, 4, respectively. When there is a user's certain motion in the gesture recognition range 6 or 7, the multi display apparatus 100 perceives this and performs a corresponding operation. A method of the multi display apparatus 100 recognizing the user gesture will be explained below.

FIGS. 5 to 7 illustrate a method of recognizing a motion at multiple cameras 141, 142, according to an exemplary embodiment of the present general inventive concept.

A plurality of frame images is necessary, in order for the controller 130 to detect movement of a user object 51. In the exemplary embodiments of the present general inventive concept illustrated in FIGS. 5-7, three such frame images are captured. However, when photographing a moving object, the shape of the object may be captured blurred, i.e., a 'blurring phenomenon' may occur. Accordingly, at least 5 to 6 frame images may be necessary.

Referring to view (1) of FIG. 5, one user object 51 moves from left to right in the gesture recognition area 10 (illustrated in FIGS. 3 and 4). The first and second cameras 141, 142 capture the motion of the user object 51. The three images 71a, 71b, 71c on the upper half of view (2) of FIG. 5 represent the images captured at the first camera 141, while the three images 72a, 72b, 72c on the lower half of view (2) of FIG. 5 represent the images captured at the second camera 142.

The first camera 141 captures images of the user object 51 from a lower direction. The first image 71a of the first camera 141 captures a moment that the user object 51 starts to move, and shows the user object 51 at the left side of the screen. The second image 71b shows the user object 51 at the center portion of the screen. The third image 71c shows the user object 51 on the right side of the screen. Likewise, the second camera 142 captures images of the user object 51 from a front direction. The first image 72a of the second camera 142 captures a moment the user object 51 starts to move, and has the user object 51 present on the left side of the screen. The second image 72b shows the user object 51 at the center portion of the screen. The third image 72c shows the user object 51 on the right side of the screen.

The controller 130 of the multi display apparatus 100 detects the shape of motion of the user object 51 and recognizes a gesture, using at least three images. Upon recognizing the gesture, a corresponding operation is performed according to the recognized gesture.

In another exemplary embodiment of the present general inventive concept, the first camera 141 may mainly recognize the user's gesture, while the second camera 142 may secondarily recognize the depth of the user's gesture. The 'depth' as used herein refers to a distance to a predetermined plane or point. The second camera 142 may be a depth camera, measuring the distance between the user object 51 and the second camera 142. Alternatively, the roles of the first and second cameras 141, 142 may be exchanged.

Referring to view (1) of FIG. 6, one user object 51 moves in a direction towards the multi display apparatus 100. The first and second cameras 141, 142 capture the motion of the user object 51.

As illustrated in view (2) of FIG. 6, the first image 75a of the first camera 141 captures a moment the user object 51 starts to move, and has the user object 51 present on a lower portion of the screen, while the first image 76a of the second camera 142 has the user object 51 present in a small shape at the center portion of the screen. The second image 75b of the first camera 141 has the user object 51 at the center portion of the screen, while the second image 76b of the second camera 142 has the user object 51 in a slightly increased size at the center portion of the screen. The third image 75c of the first camera 141 has the user object 51 present up to the upper end of the screen, while the third image 76c of the second camera 142 has the user object 51 in still increased size at the center portion of the screen.

Accordingly, using the shape and motion of the user object 51 as captured through the first camera 141, and the shape and motion of the user object 51 as captured through the second camera 142, the controller 130 may recognize the spatial gesture of the user object 51. The multi display apparatus 100 performs a corresponding operation in response to the recognized gesture.

The multi display apparatus 100 illustrated in FIG. 6 recognizes the motion of the user object 51 using a plurality of cameras 141, 142 arranged on different parts of the bodies 2, 4, and accordingly, can determine a 3-dimensional gesture. That is, the second camera 142 captures images of the user object 51 from a front direction (FIG. 6) and detects motion which is parallel to the second display 190b, while the first camera 141 captures images of the user object 51 from a lower direction and can detect motion which is perpendicular to the second display 190b. The controller 130 may recognize the user's three-dimensional gesture by combining the photographed results of the cameras 141, 142. Accordingly, the user's gestures are more accurately matched with the control operation, and the recognition rate of gestures is increased.

FIG. 7 illustrates another method of recognizing a user's gesture as a stereo image.

FIGS. 5 to 6 illustrate the first and second cameras 141, 142 arranged so that one is in the front of the user object 51 and the other is on a lower side. Accordingly, with respect to the cameras 141, 142, one camera recognizes a user's motion as vertical and horizontal motion, while the other camera recognizes the user's motion as depth motion. On the other hand, FIG. 7 illustrates that the first and second cameras 141, 142 may recognize the user's motion as the same motion with opposite orientations. That is, the incoming images of the user's motion to two parallel cameras 141, 142 are the 'stereo images'.

Referring to view (1) of FIG. 7, one user object 51 moves to the direction of the multi display apparatus 100. The first and second cameras 141, 142 capture the motion of the user object 51. However, the motion of the user object 51 as captured through the cameras 141, 142 is different from that illustrated in FIGS. 5 to 6.

Referring to view (2) of FIG. 7, the first image 77a of the first camera 141 captures the moment the user object 51 starts to move, and has the user object 51 present at a center of the right end of the screen, while the first image 78a of the second camera 142 has the user object 51 at a center of the left end of the screen. The second image 77b of the first camera 141 has the user object 51 present between the right side and the center of the screen, while the second image 78b of the second camera 142 has the user object 51 present between the left side and the center of the screen. The third image 77c of the first camera 141 has the user object 51 present until the left end of the screen, while the third image 78c of the second camera 142 has the user object 51 present until the right end of the screen.

Accordingly, the controller 130 detects the shape and movement of the user object 51 as captured through the first camera 141 and the shape and movement of the user object 51 as captured through the first camera 142, and recognizes the spatial gesture of the user object 51 using the detected results. The multi display apparatus 100 performs a corresponding operation in response to the gesture as recognized.

Although FIGS. 5 to 7 illustrate a method of recognizing a motion when there is one user object 51, the same is equally applicable to when there are two or more user objects 51.

Figure 8:
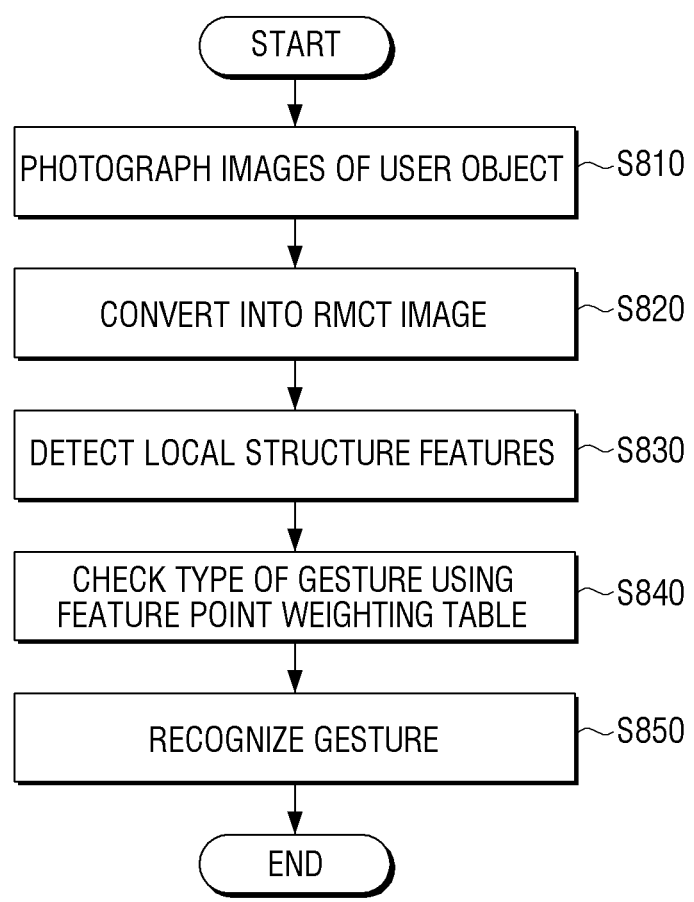
FIG. 8 is a flowchart illustrating a method of recognizing a gesture shape according to an exemplary embodiment of the present general inventive concept.

FIG. 8 is a flowchart illustrating a method of recognizing a gesture shape, according to an exemplary embodiment of the present general inventive concept.

The method of recognizing a gesture shape may include photographing images of a user object 51 through at least one of the first and second cameras at operation S810, converting the photographed images to revised modified census transform (RMCT) images at operation S820, detecting local structure features at operation S830, confirming a type of gesture using a feature point weighting table at operation S840, and recognizing a gesture at operation S850.

Photographing images of the user object 51 at operation S810 may include photographing the images of the user object 51 using at least one of the first and second cameras 141, 142. The converting into RMCT images at operation S820 may involve conversion of images based on the correlation of the surrounding pixels and mean value at 3×3 local area. The detecting of the local structure features at operation S830 may include detecting local structure features of the images converted by RMCT. The confirming the type of gesture using the feature point weighting table at operation S840 may include confirming the type of gesture having a matching feature, using the detected entire structure features and the feature point weighting table. The recognizing the gesture at operation S850 may include recognizing the user object 51's shape as the confirmed gesture, when the gesture having the matching feature is confirmed, so that the multi display apparatus 100 performs the corresponding operation.

Various Exemplary Embodiments of Gesture Recognition

Figure 9:
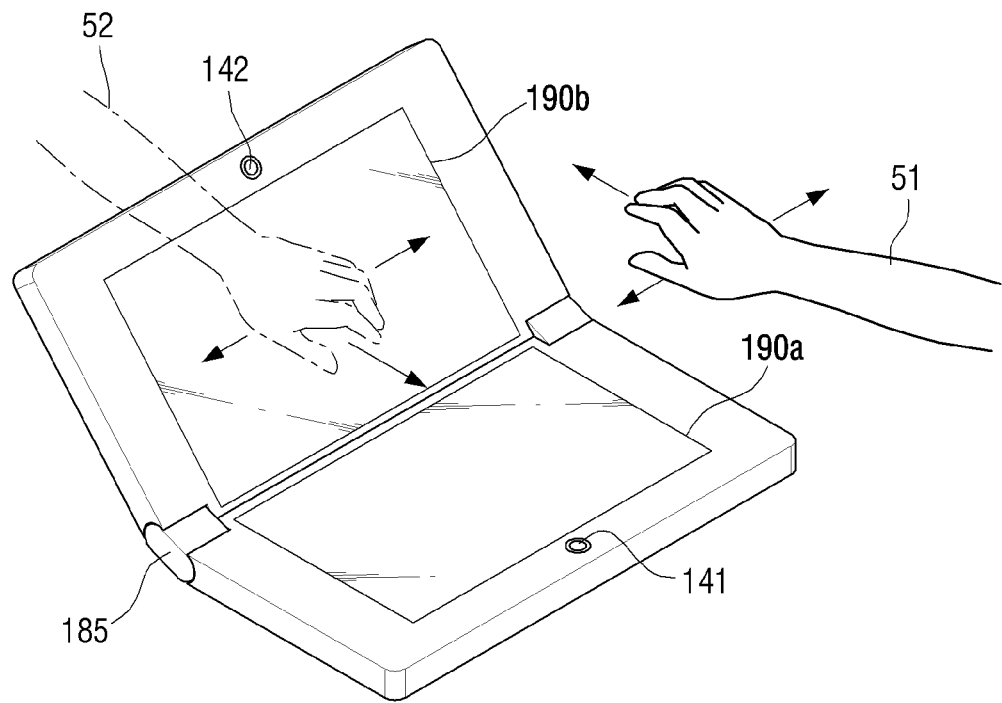
FIGS. 9 to 10 illustrate an operation on a single gesture recognition mode, according to an exemplary embodiment of the present general inventive concept.
Figure 10:
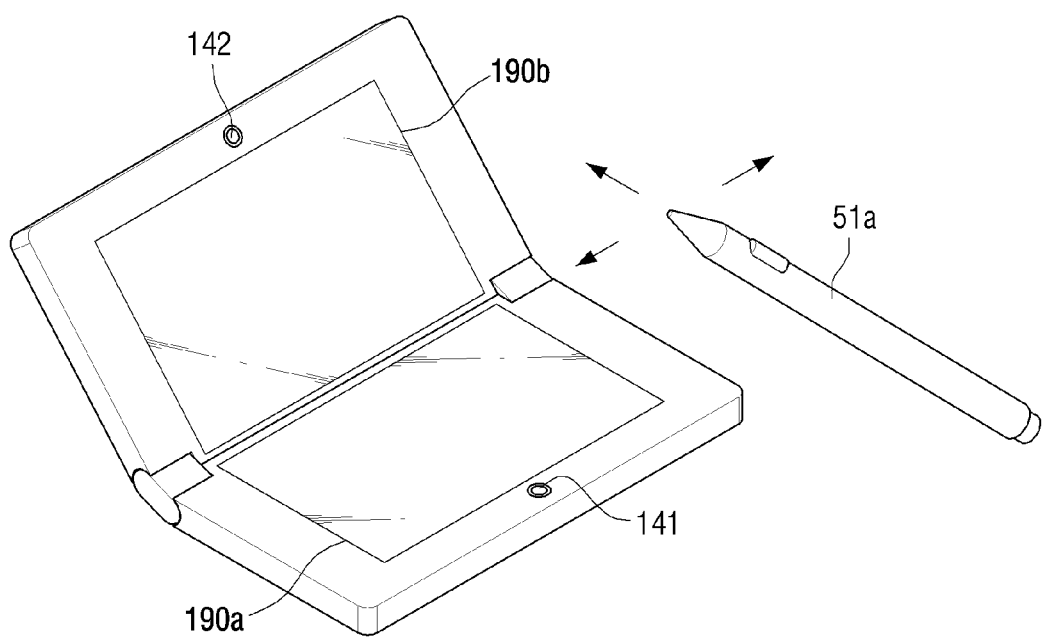

FIGS. 9 to 10 illustrate operation of a single gesture recognition mode, according to an exemplary embodiment of the present general inventive concept.

The 'single gesture recognition mode' as used herein refers to a recognizing the movement of only one user object 51 as a means of spatial gesture. For example, the multi display apparatus 100 may randomly recognize one hand of the user as the user object 51 and recognize only the motion of the recognized hand to be the spatial gesture. In this case, the multi display apparatus 100 does not recognize a gesture of other hands which are captured at the cameras 141, 142. Accordingly, the single gesture recognition mode can provide normal gesture recognition even when an interrupt is generated due to an object that is not recognized as the user object 51.

Referring to FIG. 9, the user object 51 recognized by the multi display apparatus 100 moves in the gesture recognition area 10. The multi display apparatus 100 may recognize a gesture by detecting shape or motion of the user object 51 as captured through the first and second cameras 141, 142 and perform the corresponding operation.

Figure 39:
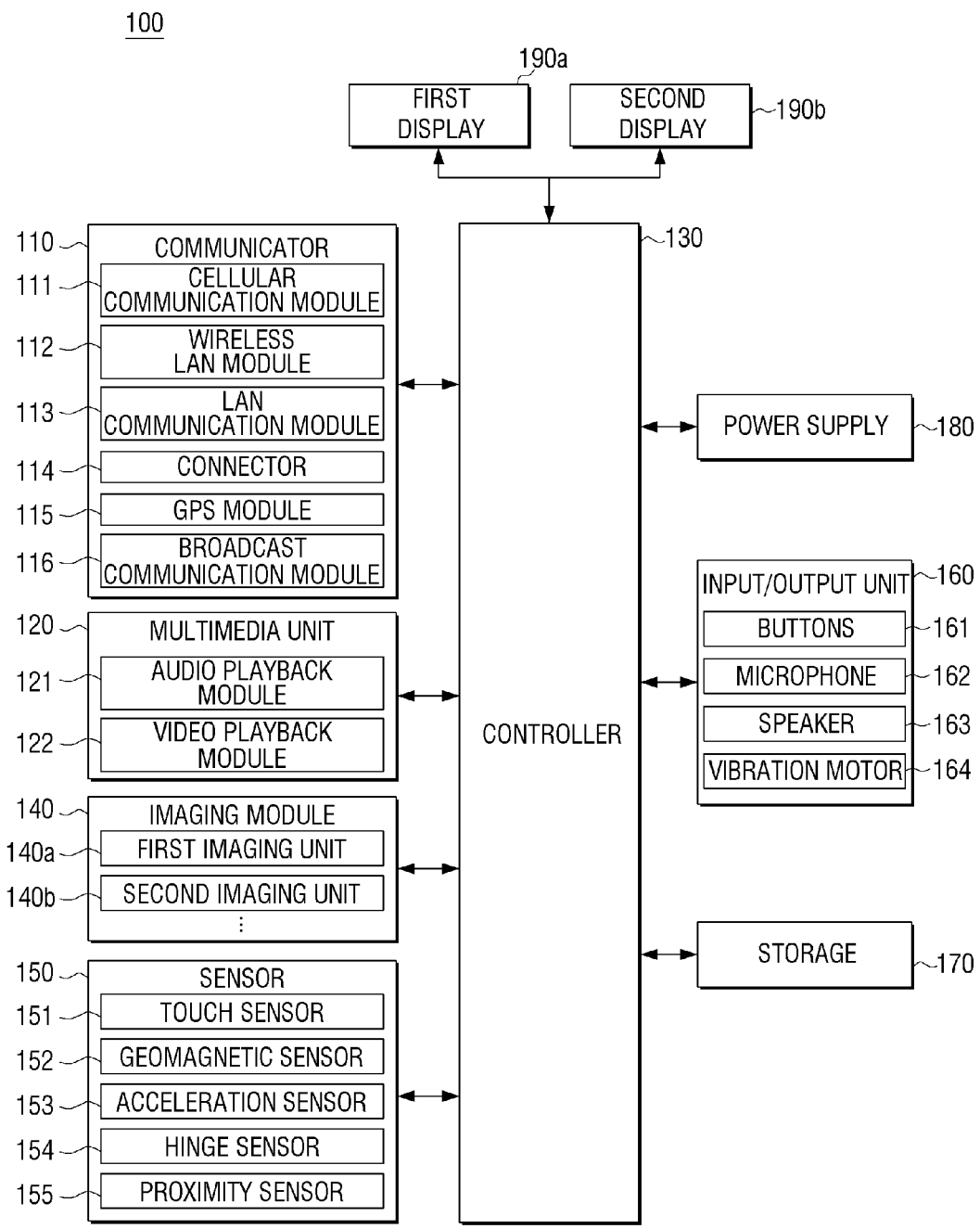
FIG. 39 is a detailed block diagram illustrating a multi display apparatus according to an exemplary embodiment of the present general inventive concept.

In one exemplary embodiment of selecting single gesture recognition mode, the user may select the single gesture recognition mode in a gesture recognition menu, using a touch screen or a button 161 (illustrated in FIG. 39). In another exemplary embodiment, when a gesture recognition mode is implemented, the single gesture recognition mode may be selected when one user object 51 maintains a predetermined shape for a predetermined time. For example, when the user holds one hand toward the second camera 142 for five seconds, the operation may start in the single gesture recognition mode. In the above example, the display 190a or 190b may indicate that the operation starts in single gesture recognition mode or request the user to confirm that the operation can start in the single gesture recognition mode. Alternatively, an audio output such as a speaker (not illustrated) may output a beep, melody, or voice information to inform the user that the operation starts in single gesture recognition mode.

In the single gesture recognition mode, since the multi display apparatus 100 can recognize only one user object 51, the operation is not influenced by an interrupt of other user objects. For example, the user may have one user object 51 be recognized, and continue with making gestures, during which a second user object 52 may enter the gesture recognition area 10. The second user object 52 may be for example the user's other hand, or a hand of a second user. However, since the multi display apparatus 100 in the single gesture recognition mode recognizes only one user object 51 as the gesturing means, the multi display apparatus 100 is not influenced even when the second user object 52 makes gesture that is recognizable in the gesture recognition area 10.

Referring to FIG. 10, in another exemplary embodiment of the present general inventive concept, a pen 51a is implemented as the user object 51. The means of inputting gestures into the multi display apparatus 100 may alternatively be a user's hand or others. The pen 51a may be a simple-structured one without any specific function, or so structured to include therein coils (not illustrated) to perform proximity sensing, or various other additional functions.

The multi display apparatus 100 may not distinguish the user's hand, pen, etc., in recognizing the one input means. Alternatively, the multi display apparatus 100 may recognize the pen 51a's shape using the camera 141 or 142 as explained above and distinguish the pen 51a from the user's hand in performing recognition.

The user may have the multi display apparatus 100 recognize gestures using their own hand, and then use the pen 51a as a gesturing means, or vice versa. In such an example, the multi display apparatus 100 may indicate through the display 190a or 190b that the input means is changed and the input means is newly recognized, when the input means is changed. Alternatively, instead of indicating information, the multi display apparatus 100 may indicate that the input means is changed, by changing the shape or color of the user interface (UI) object such as a pointer displayed on the display. Alternatively, without giving any information or changes, the multi display apparatus 100 may internally recognize the change in the input means.

The method of recognizing the gesture and perform the corresponding operation at the multi display apparatus 100 have been explained above with reference to FIG. 9, and so will not be repeated herein.

Figure 11:
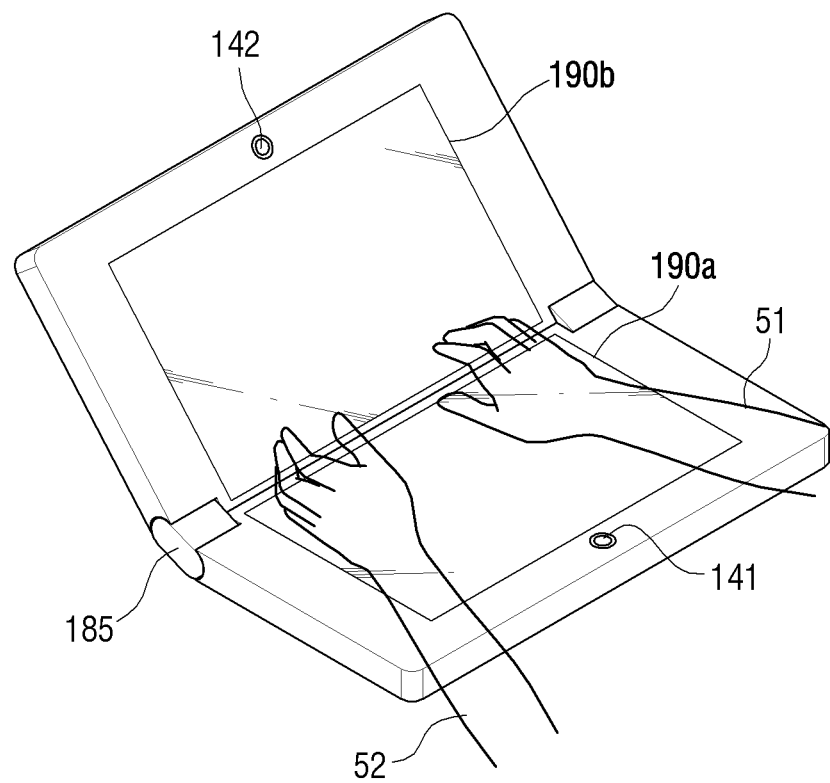
FIGS. 11 to 12 illustrate an operation on a multi gesture recognition mode, according to an exemplary embodiment of the present general inventive concept.
Figure 12:
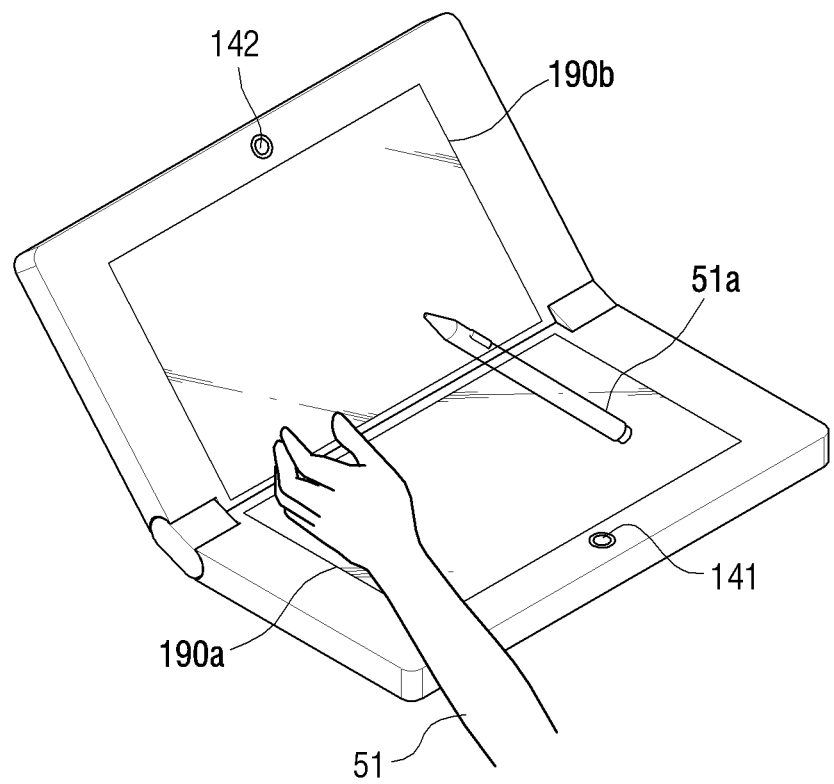

FIGS. 11 to 12 illustrate an operation in the multi gesture recognition mode, according to an exemplary embodiment of the present general inventive concept.

The 'multi gesture recognition mode' refers to the multi display apparatus 100 recognizing motions of at least two user objects 51, 52 as the means of spatial gesturing. By way of example, the multi display apparatus 100 may recognize both hands of the user as the user objects 51, 52 and thus recognize the spatial gestures based on the motions of the two hands. In such an example, the gesture recognition is possible even when the two hands cross each other.

Referring to FIG. 11, the two user objects 51, 52 move constantly in the gesture recognition area 10. The multi display apparatus 100 detects the motions of the two user objects 51, 52 as captured through the first and second cameras 141, 142, recognizes gestures and performs corresponding operation in response to the gestures.

Referring to FIG. 12, one user object 51 may be the user's hand 54, and the other may be the pen 51a. In the multi gesture recognition mode, the user object 51 may be user's two hands, or the pen 51a and one of the user's hands, or two pens 51a. The method of recognizing a gesture and performing the corresponding operation at the multi display apparatus 100 have been explained above.

Figure 13:
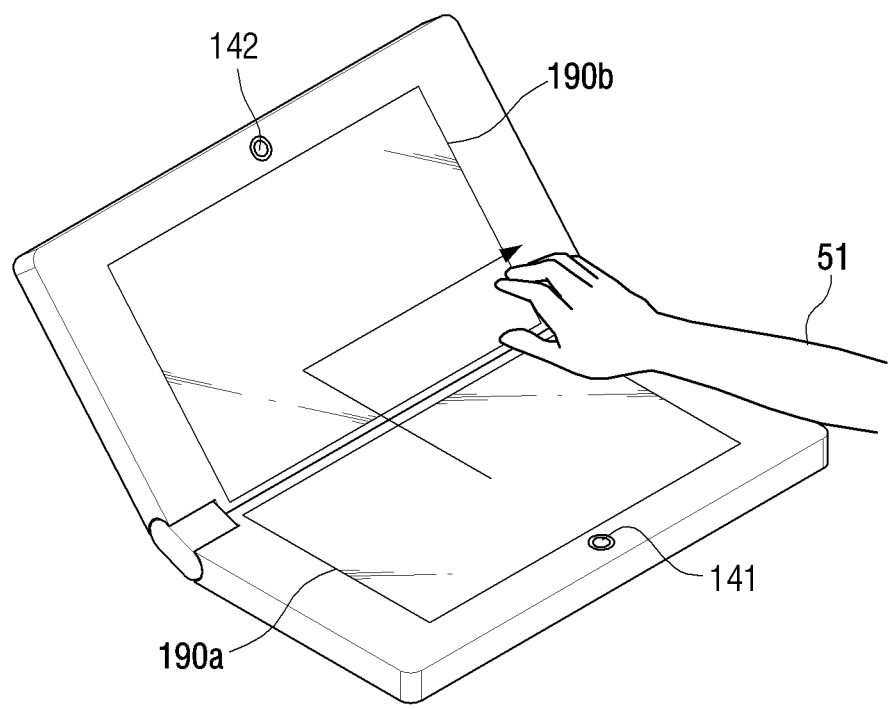
FIG. 13 illustrates a method of recognizing a continuous gesture, according to an exemplary embodiment of the present general inventive concept.

FIG. 13 illustrates a method of recognizing successive gestures, according to an exemplary embodiment of the present general inventive concept.

The 'successive gesture' as used herein refers to one continuous gesture that integrates two gestures such as a select gesture and a move gesture. Since the first and second cameras 141, 142 are three-dimensionally arranged, the multi display apparatus 100 is capable of recognizing the successive gesture.

Referring to FIG. 13, the user object 51 moves towards the second camera 142 and then moves to the right. Various commands may be matched to the user gesture. In one example, a gesture that the user object 51 moves towards the second camera 142 may correspond to a command to select an icon, and a gesture that moves to the right may correspond to a command to move to the right. In this example, a successive gesture of the user object 51 as the one illustrated in FIG. 13 corresponds to a command to select and move an icon, and accordingly, the multi display apparatus 100 may perform an operation of selecting an icon and an operation of moving the same successively. That is, when the user object 51 moves, constructing one successive pattern, the controller 130 may successively perform a plurality of control operations corresponding to the respective user gestures constituting the successive pattern.

Figure 14:
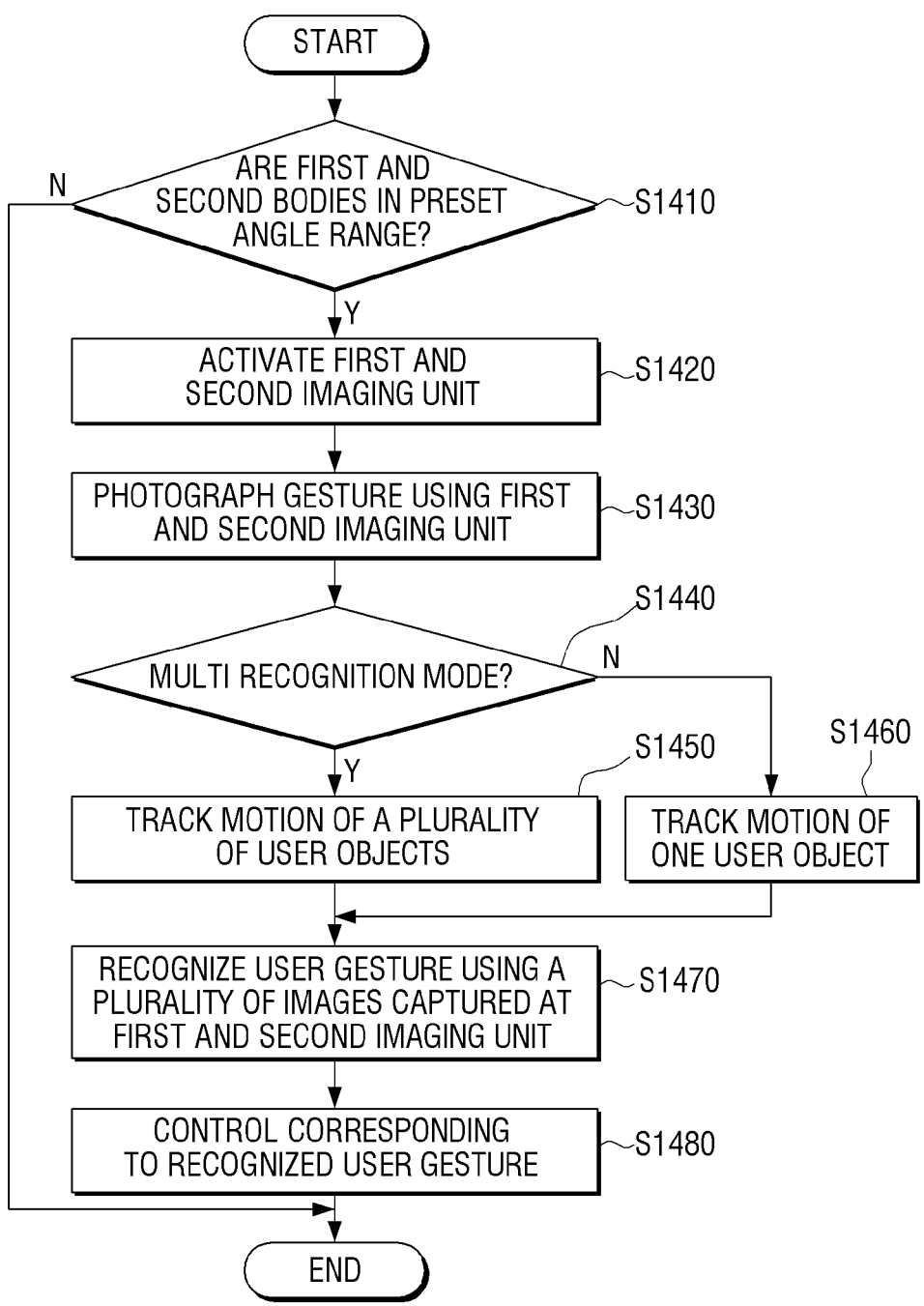
FIG. 14 is a flowchart illustrating a control method of a multi display apparatus, according to an exemplary embodiment of the present general inventive concept.

FIG. 14 is a flowchart illustrating a control method of the multi display apparatus 100, according to an exemplary embodiment of the present general inventive concept.

Referring to FIG. 14, at operation S1410, the multi display apparatus 100 detects an angle between the first and second bodies 2, 4 with reference to the hinge 185 and determines whether the first and second bodies 2, 4 are within a preset angle range. If the first and second bodies 2, 4 are not within the preset angle range (S1410-N), the control method ends. If the first and second bodies are within the preset angle range (S1410-Y), the control method proceeds to operation S1420, where the first and second imaging units 140a, 140b are activated. To be specific, the first and second imaging units 140a, 140b are turned on from the turn-off states, respectively. At operation S1430, when the first and second imaging units 140a, 140b are activated, images are photographed with the respective imaging units 140a, 140b.

As explained above, the multi display apparatus 100 recognizes a user gesture by comprehensively using a plurality of images captured through the respective imaging units 140a, 140b. In one example, the multi display apparatus 100 may operate in one of multi gesture recognition mode and single gesture recognition mode.

At operation S1440, the user may select whether to use the multi gesture recognition mode, i.e., the user may select one of the multi gesture recognition mode and single gesture recognition mode. When the multi gesture recognition mode is selected (operation S1440-Y), at operation S1450, motion of the plurality of user objects 51 moving in the first and second recognition ranges 6 and 7 are tracked so that the user gesture is recognized. On the contrary, when the single gesture recognition mode is selected (operation S1440-N), at S1460, the motion of one user object 51 moving in the first and second recognition ranges 6 and 7 is tracked so that the user gesture is recognized. That is, it is possible to recognize the user gesture three-dimensionally in the overlapping range between the first and second recognition ranges 6 and 7, using the direction of the motion of the user object 51 moving in the first recognition range 6 to be photographed by the first imaging unit, and the direction of the motion of the user object 51 moving in the second recognition range 7 to be photographed by the second imaging unit.

When the user does not select between the multi and single gesture recognition modes, a default recognition mode may be implemented automatically.

At operation S1470, the multi display apparatus 100 may recognize a user gesture, using a plurality of images captured at the first and second imaging units 140a, 140b, according to one of the multi gesture recognition mode and the single gesture recognition mode. At operation S1480, when the user gesture is recognized, the multi display apparatus 100 performs a control operation corresponding to the user gesture as recognized.

Figure 15:
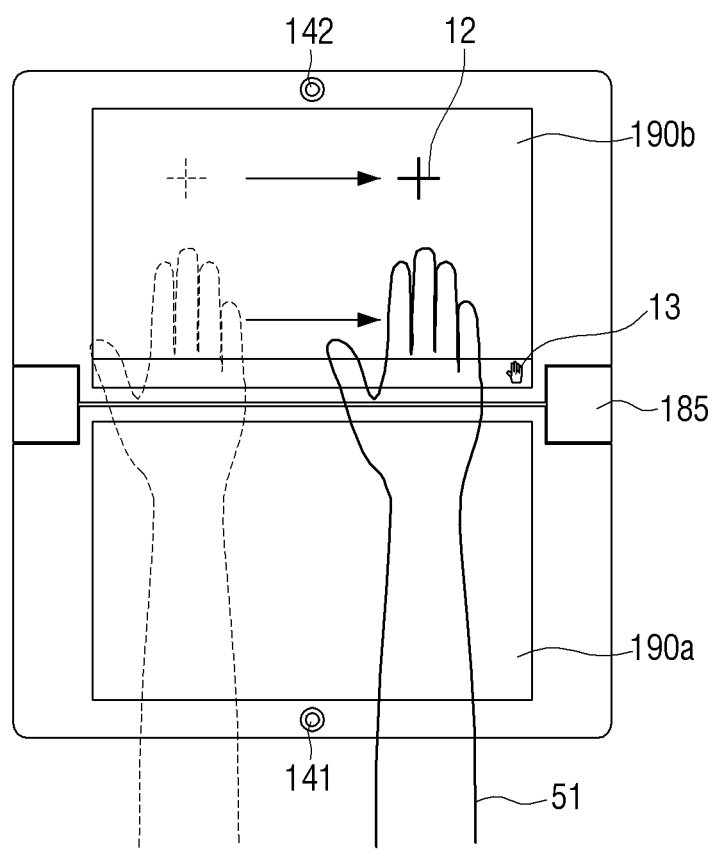
FIG. 15 illustrates a screen on a gesture recognition mode, according to an exemplary embodiment of the present general inventive concept.

FIG. 15 illustrates a gesture recognition mode screen, according to an exemplary embodiment of the present general inventive concept.

FIG. 15 particularly illustrates the single gesture recognition mode screen. To enable the user to perceive that the operation is in the gesture recognition mode, the multi display apparatus 100 may display a hand-shaped icon 13 on the status display window of the second display 190b. The icon 13 may have another shape, provided that it enables a viewer to perceive the gesture recognition mode, or text (not illustrated) such as 'gesture' or 'G' may be displayed instead of the icon 13. The icon 13 or the text may be displayed at a random location on the first or second display 190a, 190b. Alternatively, the icon 13 or text may be displayed at an area of the first and second bodies 2, 4 other than the display, using, for example, a light emitting diode (LED) (not illustrated).

One user object 51 may move in the gesture recognition area 10. The first and second cameras 141, 142 may capture the motion of the user object 51 for the purpose of gesture recognition, but the first and second displays 190a, 190b display general content such as home, menu or icons. Accordingly, considering that the user may not easily perceive the location of the user object 51's motion on the displays 190a, 190b, a pointer 12 corresponding to the motion of the user object 51 may be indicated. As illustrated, the pointer 12 may be provided in the form of a cross, arrow, hand, or various others. Alternatively, the user may select a shape randomly. The user is thus allowed to intuitively recognize the gestures, as the pointer 12 moves from left to right when the user object 51 moves from left to right.

In the multi gesture recognition mode, there may be two or more pointers 12 corresponding to the number of user objects 51.

Inputting commands by the user to the multi display apparatus 100 using gestures according to various exemplary embodiments of the present general inventive concept have been explained so far. Hereinbelow, changing screens in accordance with the gesture according to various exemplary embodiments of the present general inventive concept will be explained. Changing user interface (UI) based on gestures according to various exemplary embodiments FIGS. 16 to 20 illustrate change of user interface (UI) in response to a single gesture, according to an exemplary embodiment of the present general inventive concept.

In one exemplary embodiment of the present general inventive concept, a gesture in the space is recognized as an input command, using a camera 141 or 142, so that the multi display 100 apparatus performs corresponding operation. However, the gesture in the space may be mapped to the conventional gestures for convenience of user.

Touch Gesture Types

In one exemplary embodiment of the present general inventive concept, a 'touch gesture' as used herein may encompass all types of user gestures that directly contact or approach to the proximity of a touch screen (not illustrated) to allow the multi display apparatus 100 to perceive the same. By way of example, the above may be a user's movement to select one or a plurality of successive locations on a touchscreen, using left and right hand fingers (to be specific, index fingers), thumbs or an object detectable by the touchscreen (e.g., stylus pen 51a). The touch gesture will be explained in detail below with reference to the following table.

TABLE 1

| | Type | Mark |
|---|---|---|
| Single Finger Gesture | Tap | |
| | Touch & Hold | |
| | Double Tap | |
| | Drag | |
| | Drag & Drop | |
| | Flick | |

Table 1 particularly explains the gesture type made with one finger.

Referring to Table 1, the gesture type using one finger may include tap, touch & hold, double tap, drag, drag & drop and flick. The 'tap' refers to the user's motion of gently pressing on touchscreen and discontinuing it. The 'touch & hold' refers to the user's motion of touching for a long period of time. The 'double tap' refers to the user's motion of fast tapping twice. The 'drag' refers to the user's motion of dragging in one direction, and the 'drag & drop' refers to the user's motion of pressing an object on the touchscreen and then dragging it from one location to another, and the 'flick' refers to the user's motion of fast dragging.

TABLE 2

| | Type | Mark |
|---|---|---|
| Two Finger Gesture | Two finger Tap | |
| | Touch & Spread | |
| | Pinch Out | |
| | Pinch In | |
| | Two finger Drag | |
| | Cross Two Finger | |
| | Touch & Rotate | |

Table 2 explains gesture types made with two fingers.

Referring to Table 2, gesture types made with two fingers include two finger tap, touch & spread, pinch out, pinch in, two finger drag, cross two finger, or touch & rotate. The 'two finger tap' refers to user's motion of concurrently tapping with two fingers, the 'touch & spread' refers to user's motion of pressing the touchscreen concurrently with two hands, with one finger moving linearly while the other fixed in position. The 'pinch out' refers to the user's motion of pressing touchscreen with two fingers concurrently and then dragging in opposite directions, and the 'pinch in' refers to the user's motion of pressing touchscreen with two fingers concurrently and then dragging the fingers toward each other. The 'two finger drag' refers to the user's motion of dragging two fingers to the same direction, while the 'cross two finger' refers to the user's motion of dragging two fingers toward each other until the fingers cross each other and then move away. The 'touch & rotate' refers to the user's motion of pressing the touchscreen concurrently with two fingers and then rotating the fingers relative to one another to define a circular path.

TABLE 3

| | Type | Mark |
|---|---|---|
| Multi Finger Gesture | Three finger touch | |
| | Four finger touch | |
| | Five finger touch | |
| Palm | Palm | |

Table 3 explains gesture types made with two or more fingers and a palm.

Referring to Table 3, the gesture types made with two or more fingers include three finger touch, four finger touch or five finger touch. Further, it is possible to make gestures such as tap, drag or rotate as listed in Tables 1 and 2, using two or more fingers.

Spatial Gesture Types

Addition to the gestures explained above, a spatial gesture set may be defined in one exemplary embodiment of the present general inventive concept as follows.

TABLE 4

| Name | Motion | Corresponding command |
| --- | --- | --- |
| Shake | Wave palm left and right | To the next/cancel |
| Left | Open palm to left & move to left | Turn page to left |
| Right | Open palm to right & move to right | Turn page to right |
| Grip | Close fist | Select or fix contents/UI |
| Navigate | Fist & move | Move selected content |
| Pinch | Spread out or in with two hands | Expand/Reduce screen |

TABLE 5

| Name | Motion | Corresponding command |
| --- | --- | --- |
| Tap | Touch with fingers | Select |
| Touch & Move | Touch with fingers & move | Select & move |
| Double Tap | Two touches with fingers | Select & execute |
| Rotate | Draw a circle with fingers | Play back music content |
| Pinch | Spread out/in two fingers | Expand/Reduce screen |

Table 4 lists an example of a basic set among the spatial gestures, and Table 5 lists an example of a finger set among the spatial gestures.

As explained above, the user gesture may be any of single finger gesture, two finger gesture, multi finger gesture, palm gesture, multi palm gesture, fist gesture, or multi fist gesture.

However, the spatial gesture set as explained above are only one of the exemplary embodiments of the present general inventive concept, and the names, motions or corresponding commands may be defined otherwise. Further, the corresponding command may vary to suit respective contents, even when the same gesture is made. Likewise, other gesture sets may be added. User convenience is provided when the touch gesture set, and 2D and 3D gesture sets as the spatial gestures are combined similarly or identically. Depending on needs, the multi display apparatus 100 may include a gesture set setting menu to enable a user to set a unique gesture set and use the same.

Hereinbelow, changing screens according to various user gestures as explained above will be explained.

FIG. 16 illustrates user interface changed in response to a left gesture. The left gesture particularly flicks a user object 51 to the left.

FIG. 16 exclusively illustrates features related to the left gesture, while specific apparatus construction and screen construction are omitted for convenience of explanation. Referring to FIG. 16, counters 1405 and 1406, respectively displayed on the first and second displays 190a and 190b, indicate the page of the screen, and thus indicates the current page No. of the screen. Referring to view (1) of FIG. 16, the first display 190a displays the first page 1410, while the second display 190b displays the second page 1420. One user object 51 opens a hand to the side and moves from right to left. The traveling area of the user object 51 is included in the gesture recognition area 10.

As the user object 51 moves, the first and second cameras 141, 142 photograph the same, and the controller 130 recognizes a left gesture by detecting the movement of the user object 51. An operation of moving page to left is performed in response, as the controller 130 recognizes the left gesture. Referring to view (2) of FIG. 16, the third page 1411 and the fourth page 1421, which are the pages next to the first and second pages 1410, 1420, are displayed on the first and second displays 190a, 190b.

Referring to FIG. 16, when a gesture is perceived which flicks the user object 51 to the right, two pages that precede the currently-displayed page are displayed on the first and second displays 190a, 190b. That is, the above-described process of advancing from pages 1 and 2 to pages 3 and 4 is reversed.

Figure 17:
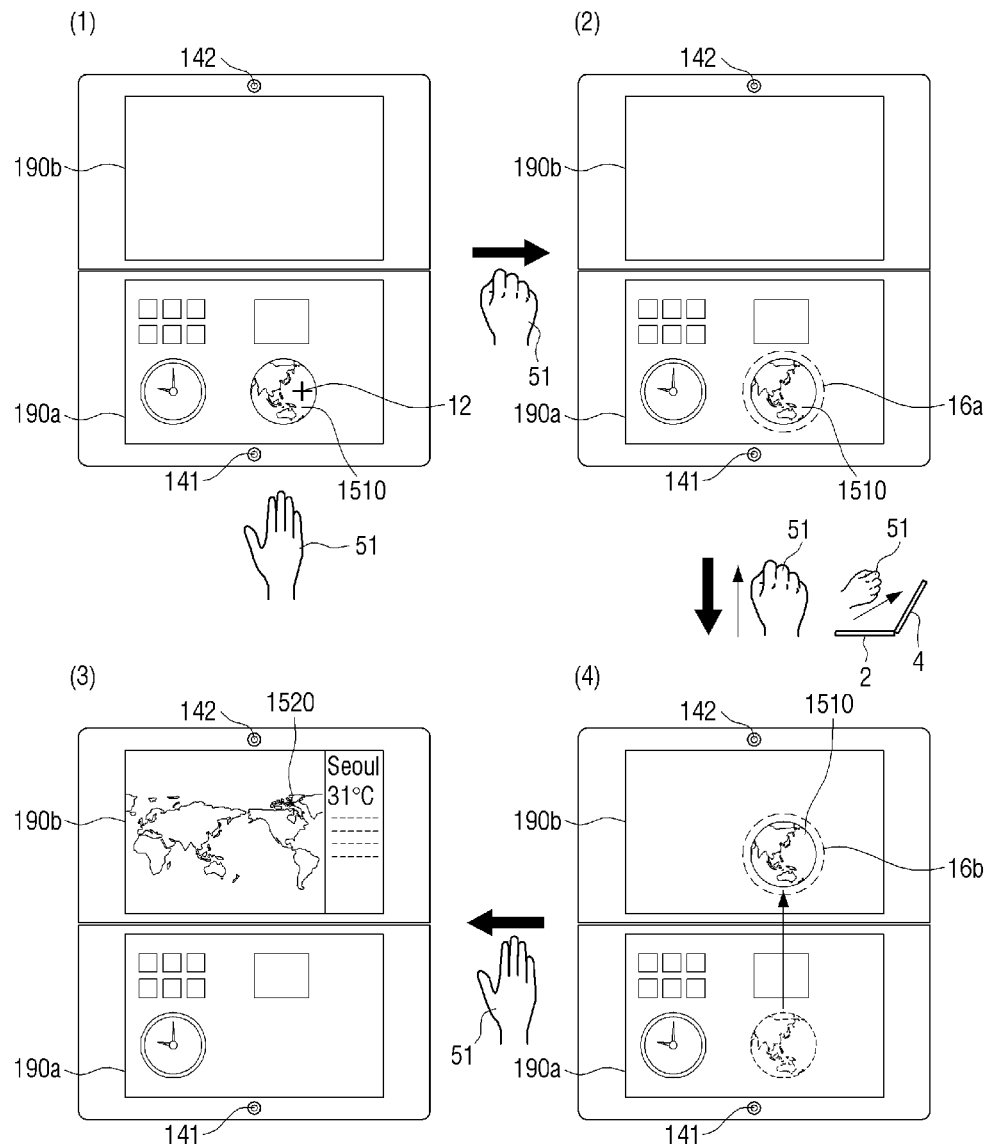

FIG. 17 illustrates a user interface (UI) changed in response to grip and navigate gestures.

The 'grip' gesture refers to a motion of clenching a fist. In response to the grip gesture, a UI object (e.g., icon, folder, etc.) is selected. In view (1) of FIG. 17, the first camera 141 photographs a user object 51, which changes from the spreading hand to a fist. The second camera 142 photographs the user object 51 changing from the end of the hand to a fist. The controller 130 analyzes the change in the user object 51 as photographed at the first and second cameras 141, 142 and recognize a grip gesture.

The 'navigate' gesture may refer to a motion of clenching a fist and moving. The selected UI object is moved to a location according to the displacement of the user object 51, in response to the navigate gesture. As explained above, the controller 130 may analyze the photographed images of the first and second cameras 141, 142 and recognize the navigate gesture. It will be understood that various other gestures, such as those listed in Tables 4 and 5, may be used as a 'navigate' gesture, depending on the exemplary embodiment of the present general inventive concept.

Referring to view (1) of FIG. 17, the first display 190a may have several application icons, widgets, and menus, such as for example a global time menu 1510. The user object 51 prepares for spatial gesturing. The first and second cameras 141, 142 photograph motion of the user object 51, and the controller 130 detects the photographed motion and recognizes the gesture. The pointer 12 corresponding to the user object 51 moves on a screen of one of the displays 190a or 190b, in accordance with the motion of the user object 51. For example, when the user object 51 spreads out a hand and moves in the gesture recognition area 10, the pointer 12 also moves on the screen in accordance with the motion of the user object 51. Accordingly, the user may move to a desired icon or menu, by checking the motion of the pointer 12. Referring to view (1) of FIG. 17, the pointer 12 moves in accordance with the movement of the user object 51 and is placed on the global time menu 1510. At this time, the user object 51 makes a grip gesture, i.e., clenches a fist. The grip gesture may select content, such as an icon. In FIG. 17, the global time menu 1510 is used as an example of such content which is selected. It will be understood that any icon or other content displayed on the first or second display 190a or 190b may be selected in a similar fashion as described in FIG. 17 with regard to the global time menu 1510. It will also be understood that other gestures may be used to select content, depending on the exemplary embodiment of the present general inventive concept.

Referring to view (2) of FIG. 17, the controller 130 recognizes the grip gesture and performs menu select operation in response to the grip gesture. Accordingly, the global time menu 1510 is selected. To ensure that the select operation is intuitively recognizable to the user, the controller 130 may display a boundary 16a in a predetermined color around the global time menu 1510. In another example, the color of the selected content may be changed, or the content may be displayed as if it pops forward or dented backward. Alternatively, the pointer 12 may be provided in the shape of a hand, in which case the pointer 12 may be changed to a fist upon selection of a menu, to ensure that the user perceives the same.

At this state, the user object 51 executes a navigate gesture. As noted above in regard to view (1) of FIG. 17, the 'navigate' gesture may refer to a motion of clenching a fist and moving to a predetermined direction. The navigate gesture can move the selected content in a predetermined direction.

Referring to view (3) of FIG. 17, the user object 51 keeps clenching a fist and diagonally moves from the first body 2 to the second body 4. According to the movement of the user object 51, the global time menu 1510 also moves from the first display 190a to the second display 190b. To ensure that the user perceives the grip gesture, the boundary 16b around the global time menu 1511 may be maintained as long as the grip is maintained.

When the global time menu 1510 moves to the second display 190b, the user object 51 makes a gesture to execute the content, such as for example hand-spreading.

Referring to view (4) of FIG. 17, the controller 130 recognizes the gesture as a command to execute the content, and thus displays information 1520 corresponding to the selected content on the second display 190b. In the case of the global time menu 1510, the controller 130 displays information 1520 of a specific region along with global map, on the second display 190b.

FIG. 18 illustrates the user interface changed in response to a rotate gesture.

In the exemplary embodiment of the present general inventive concept illustrated in view (1) of FIG. 18, a music list 1605 is displayed on the first display 190a. The music list 1605 may be displayed in the form of one or more CD cases rotating three-dimensionally, as illustrated in view (1) of FIG. 18. In another example, the music list 1605 may be displayed in the form of CD titles, or thumbnail images of CD cases. The user object 51 may rotate the music list 1605 using gestures, for example a left or right gesture. When CD 1610 including music that the user intends to play is selected on the first display 190a in response to the gestures of the user object 51, the user may move the CD 1610 including music to the second display 190b using for example the grip and navigate gesture with the user object 51. The corresponding operation of the multi display apparatus 100 to the grip and navigate gesture has been explained above with reference to FIG. 17, and so will not be repeated herein.

The CD 1610 including music, moved from the first display 190a, is displayed on the second display 190b as an icon 1620, and a progress bar 1630 is displayed, indicating status of music playing. Depending on need, i.e., when one CD includes a plurality of music files therein, a process of selecting one music file may be performed in a similar fashion to the method of selecting a CD, described above.

Following the selection process described above in regard to view (1) of FIG. 18, the user may make another gesture with the user object 51 to play the selected music. For example, the user may make a rotation gesture, i.e., draw a circle with the user object 51.

Referring to view (2) of FIG. 18, the multi display apparatus 100 recognizing the rotation gesture of the user object 51 may play the music displayed on the second display 190b and indicate the state of progress on the progress bar 1631.

Figure 19:
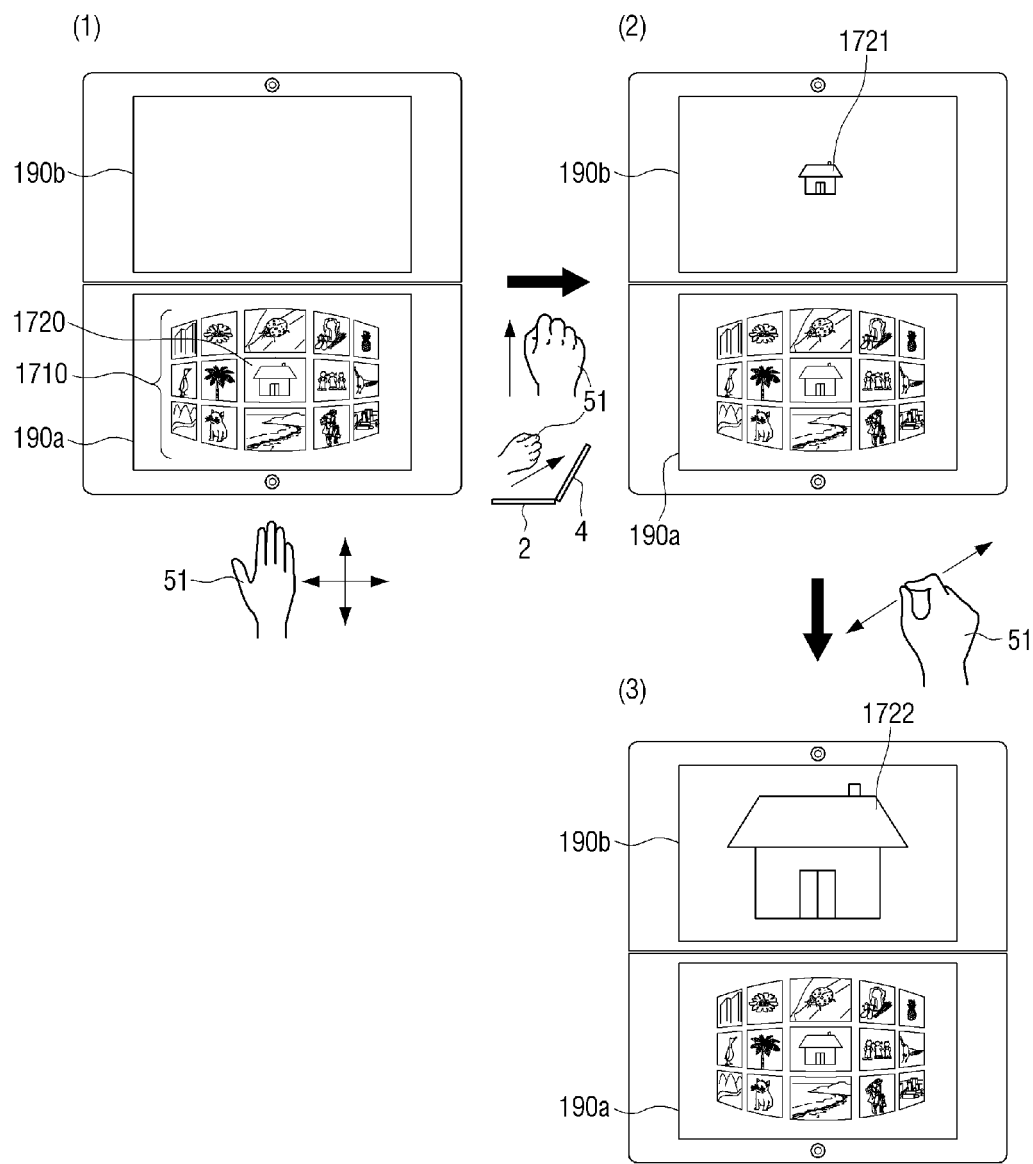

FIG. 19 illustrates the user interface changed in response to pinch gesture.

Referring to view (1) of FIG. 19, an image list 1710 is present on the first display 190a. The image list 1710 may be displayed as if it is rotated three-dimensionally. In another example, only the image names may be displayed, or thumbnail images may be displayed on a plane.

The image list 1710 is rotatable in response to the gesture of the user object 51 which may unfold the palm and move up and down, left and right. As explained above, different reaction commands may be issued in response to the same gesture to suit the type of the implemented contents. The first display 190a may exclusively display the image list 1710 in a 3D manner, from which the largest image 1720 at a center of the image list 1710 is displayed in a selectable form. Accordingly, a gesture of the user object 51, such as for example an unfolded palm up and down, and left and right, may correspond to a command to rotate the image list 1710.

The user object 51 may make a grip gesture and a navigate gesture of moving from the first body 2 to the second body 4, so that the largest image 1720 displayed at the center of the first display 190a is moved to the second display 190b, similarly to the method described above with regard to FIGS. 17 and 18.

Referring to view (2) of FIG. 19, the largest image 1720 at the center of the first display 190a is moved to the second display 190b, making image 1721 on the second display 190b.

The user object 51 may expand or reduce the image 1721 on the second display 190b with a pinch gesture. The 'pinch' gesture refers to a motion of opening or closing two fingers horizontally or vertically from or to each other.

Referring to view (3) of FIG. 19, in response to a pinch zoom-in gesture of the user object 51, the controller 130 may expand the image 1721 on the second display 190b, to form image 1722. Alternatively, the image 1721 may be reduced in response to the user object 51's pinch zoom-out gesture.

FIG. 20 illustrates the user interface changed in response to a touch & move gesture of the user object 51. Among the spatial gesture set, the touch gesture refers to a motion of the user object 51 approaching the displays 190a, 190b, and this does not refer to direct touching on the displays 190a, 190b. However, considering similar motion to direct touching, this will be simply referred to as 'touch gesture' for convenience of explanation.

Referring to view (1) of FIG. 20, a screen is displayed on the uprightly-positioned multi display apparatus 100, with an e-book 2001 executed thereon. The first display 190a displays a left-side page of the e-book 2001, while the second display 190b displays right-side page of the e-book 2001.

To turn a page of e-book 2001 from right to left side, the user object 51 makes a touch gesture in the gesture recognition area 10 of the cameras 141 and 142, and the moves from right to left. The controller 130 recognizes the touch and move gesture and performs a corresponding command.

Referring to view (2) of FIG. 20, the first and second displays 190a and 190b display two pages next to the previously-displayed pages which appear as a result of turning the right-side page to the left. To ensure that more realistic effect is given, a visual effect of a paper book page turning over may be provided.

FIGS. 21 to 27 illustrate user interface changed in response to multi gestures, according to an exemplary embodiment of the present general inventive concept.

The multi gesture may refer to the above-mentioned gestures respectively made by the user object 51, or one gesture made by two user objects 51 and 52.

FIG. 21 illustrates a user interface changed in response to a pinch gesture. In the multi gesture recognition mode, at least two user objects 51, 52 may be used as the tools of gesture recognition. Referring to view (1) of FIG. 21, an image 1810 is present at a predetermined area on the first display 190a.

For convenience of explaining gesture motions, directions are defined as below. An X-axis direction extends perpendicular from the hinge 185 and parallel to the first body 2 of the multi display apparatus 100, a Y-axis direction extends along the hinge 185 from one hinged end of the first body 2 of the multi display apparatus 100 to the other hinged end of the first body 2, and a Z-axis direction extends upward perpendicularly from the first body 2.

The first user object 51 gestures clenching a fist to express a grip gesture, and the second user object 52 clenches a fist and moves to a certain direction on right-upper direction of the Y-Z plane. The controller 130 recognizes the gestures of the first and second user objects 51, 52 and performs corresponding operation.

Referring to view (2) of FIG. 21, the controller 130 perceives an image expansion gesture, when a grip gesture of the first user object 51, and a grip gesture and a gesture to expand to a predetermined direction 22 on the Y-Z plane of the second user object 52, are made. An example of the predetermined direction 22 is illustrated in view (3) of FIG. 21. Accordingly, the image 1810 present at a predetermined area on the first display 190a is expanded to the entire area 1811 of the first and second displays 190a and 190b.

FIGS. 22 to 26 illustrate the screen with a three-dimensional image 1910 is displayed thereon, changed in response to multi gestures.

Figure 22:
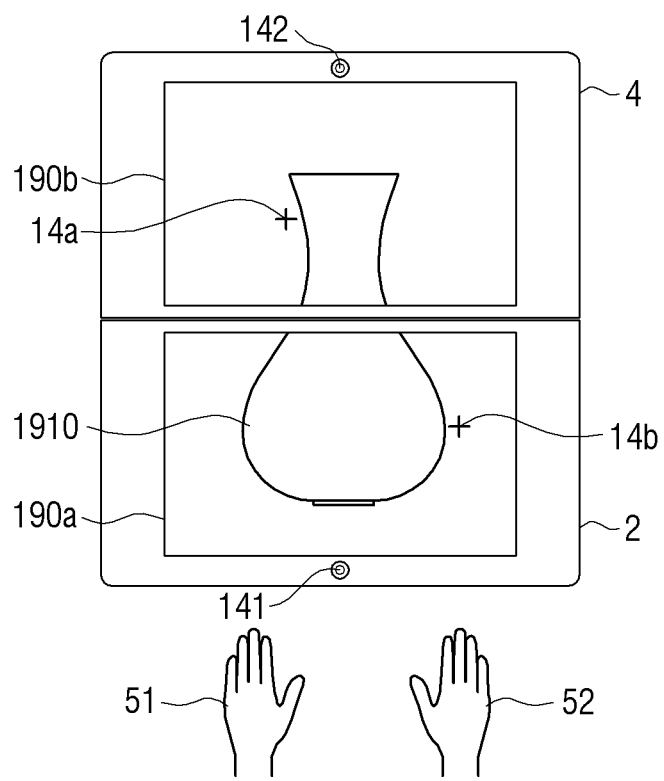

Referring to FIG. 22, one three-dimensional image 1910 is displayed as one whole screen on the first and second displays 190a, 190b. The first and second cameras 141, 142 are arranged in the first and second bodies 2, 4, respectively. The motions of the two user objects 51, 52 in the gesture recognition area 10 are photographed at the first and second cameras 141, 142, and the controller 130 recognizes the gestures. Depending on cases, three or more user objects may be used as the gesturing tools in the multi gesture recognition mode.

In the multi gesture recognition mode, again, the controller 130 may display corresponding pointers 14a, 14b to ensure that the user perceives the locations on the displays 190a, 190b that correspond to the motions of the user objects 51, 52. The number of pointers may correspond to the number of user objects so that the pointers may correspond to the user objects, respectively. The pointers 14a, 14b move on the screen in accordance with the motions of the user objects 51, 52, respectively. By way of example when the user objects 51, 52 open toward the direction of the displays 190a and 190b and move within the gesture recognition area 10, the pointers 14a, 14b also move on the screen according to the user objects 51, 52.

Referring to view (1) of FIG. 23, the first user object 51 makes a fist to express grip gesture, and the second user object 52 unfolds the hand and moves in a predetermined direction 24b (i.e., right-upper side) of the Y-Z plane.

View (2) of FIG. 23 illustrates the predetermined direction 24b to which the second user object 51 moves.

The controller 130 recognizes the gestures of the first and second user objects 51, 52 and performs a corresponding operation. That is, the controller 130 recognizes pinch zoom-in gesture, when the first user object 51 makes the grip gesture and the second user object 52 makes a gesture of moving to a predetermined direction 24b on the Y-Z plane. Accordingly, the three-dimensional image 1910 on the first and second displays 190a, 190b as illustrated in FIG. 22 is expanded in response to the pinch zoom-in gesture, generating expanded three-dimensional image 1911, illustrated in view (1) of FIG. 23.

Referring to view (1) of FIG. 24, the first user object 51 makes a fist to express a grip gesture, and the second user object 52 unfolds the hand, and moves from the first display 190a to the front of the user, while drawing a circle.

View (2) of FIG. 24 illustrates a direction in which the second user object 52 moves. The second user object 52 moves in a predetermined direction 24c on the X-Y plane, while drawing a circle.

The controller 130 recognizes the gestures of the first and second user objects 51, 52 and performs a corresponding operation. That is, the controller 130 recognizes a rotate gesture of the three-dimensional image 1912, when the first user object 51 makes the grip gesture and the second user object 52 makes a gesture of moving to the predetermined direction 24c on the X-Y plane, while drawing a circle. Accordingly, the three-dimensional image 1910 on the first and second displays 190a, 190b as illustrated in FIG. 22 rotates by 90 degrees about the Y-axis, so that the upper portion of the three-dimensional image 1910 is displayed on the first and second displays 190a, 190b, generating rotated three-dimensional image 1912, illustrated in view (1) of FIG. 24.

Referring to view (1) of FIG. 25, the first user object 51 opens hand to a side and moves to the direction of the user, while the second user object 52 opens hand to a side and moves to the direction toward the multi display apparatus 100.

View (2) of FIG. 25 illustrates the directions the first and second user objects 51 and 52 move. The first user object 51 moves in the X-axis direction 23d, while the second user object 52 moves opposite to the direction of the first user object 52, i.e., in the −X-axis direction 24d.

The controller 130 recognizes the gestures of the first and second user objects 51, 52 and performs corresponding operation. That is, the controller 130 recognizes the gestures of the first user object 51 and the second user object 52 as a command to rotate the three-dimensional image 1910, illustrated in FIG. 22, counter-clockwise. Accordingly, in response to the recognized gesture, the controller 130 rotates the three-dimensional image 1910 of the first and second displays 190a, 190b counter-clockwise, generating the rotated three-dimensional image 1913, illustrated in view (1) of FIG. 25.

Referring to view (1) of FIG. 26, the first user object 51 opens hand to a side and moves to the right, while the second user object 52 opens hand to a side and moves to the left. The first pointer 14a corresponding to the first user object 51 is placed on the first display 190a, while the second pointer 14b corresponding to the second user object 52 is placed on the second display 190b. That is, the first pointer 14a is placed at a left-lower area of the three-dimensional image 1910 illustrated in FIG. 22, while the second pointer 14b is placed at a right-upper area of the three-dimensional image 1910.

View (2) of FIG. 26 illustrates directions the first and second user objects 51, 52 move. The first user object 51 moves to Y-axis direction 23e, while the second user object 52 moves to −Y-axis direction 24e.

The controller 130 recognizes the gestures of the first and second user objects 51, 52 and performs corresponding operation. That is, the controller 130 recognizes the gestures of the first and second user objects 51, 52 as a command to exert force on the three-dimensional image 1910. Accordingly, in response to the recognized gesture, the left-lower area of the three-dimensional image 1910 is subject to rightward force, while the right-upper area is subject to leftward force, so that shape changes, generating the changed three-dimensional image 1914, illustrated in view (1) of FIG. 26.

FIG. 27 illustrates use of multi gestures in another exemplary embodiment of the present general inventive concept.

Referring to view (1) of FIG. 27, the first display 190a displays a drawing image 19a. The second display 190b displays a tool set 27 from which colors are selectable. The first user object 51 may use a spatial gesture, i.e., uses a tap gesture to select a first color 18a and a second color 18b from the tool set 27. The tap gesture refers to a motion of touching in the space with the user object 51, which may be a finger. To un-select the first color 18a, the user may make a tap gesture for the first color 18a once again. Accordingly, when two colors 18a and 18b are selected, the second user object 52 places a pointer on an area 19a that he intends to color. The first user object 51 may then select a gesture to color or color menu, while the second user object 52 faces a hand to the direction of the first display 190a and moves slowly from left to right.

View (2) of FIG. 27 illustrates a result of making the above-mentioned gesture. The controller 130 recognizes the gestures of the first and second user objects 51, 52 and performs a corresponding operation. That is, the controller 130 may color, by gradation, the desired coloring area 19a based on the two selected colors 18a, 18b in response to the gesture of the second user object 52, generating colored area 19b.

Various exemplary embodiments of the multi display apparatus 100 to recognize spatial gestures using cameras 141, 142 and performing corresponding operations have been explained so far. Generally, the multi display apparatus 100 may recognize user gestures using two cameras 141, 142 arranged at the first and second bodies 2, 4, respectively. However, one will understand that two or more cameras may also be provided and at various other locations, depending on exemplary embodiments of the present general inventive concept.

Various Exemplary Embodiments of Camera Arrangement

Figure 28:
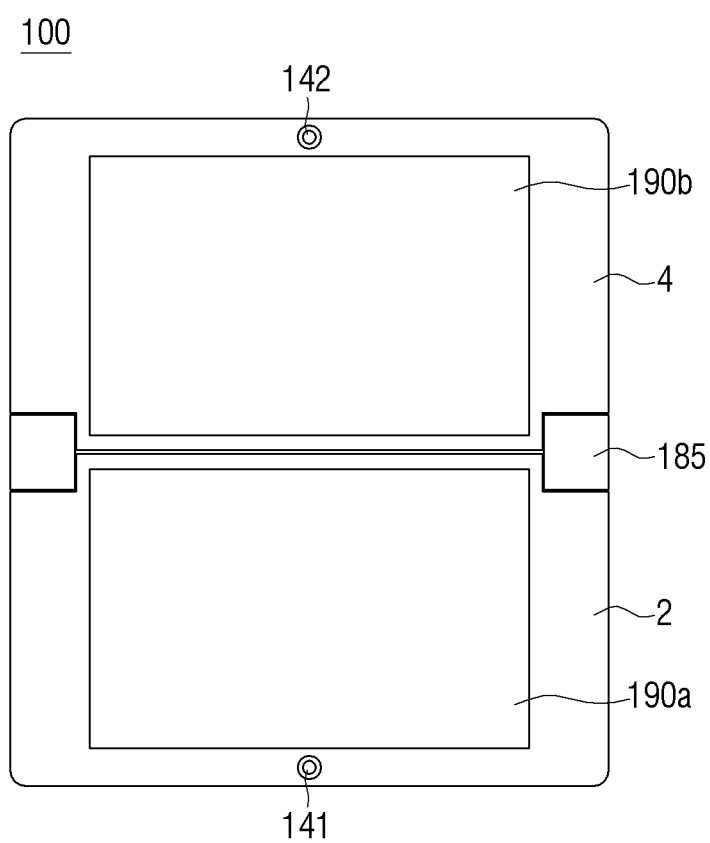
FIGS. 28 to 32 illustrate an arrangement of cameras of a multi display apparatus, according to various exemplary embodiments of the present general inventive concept.
Figure 29:
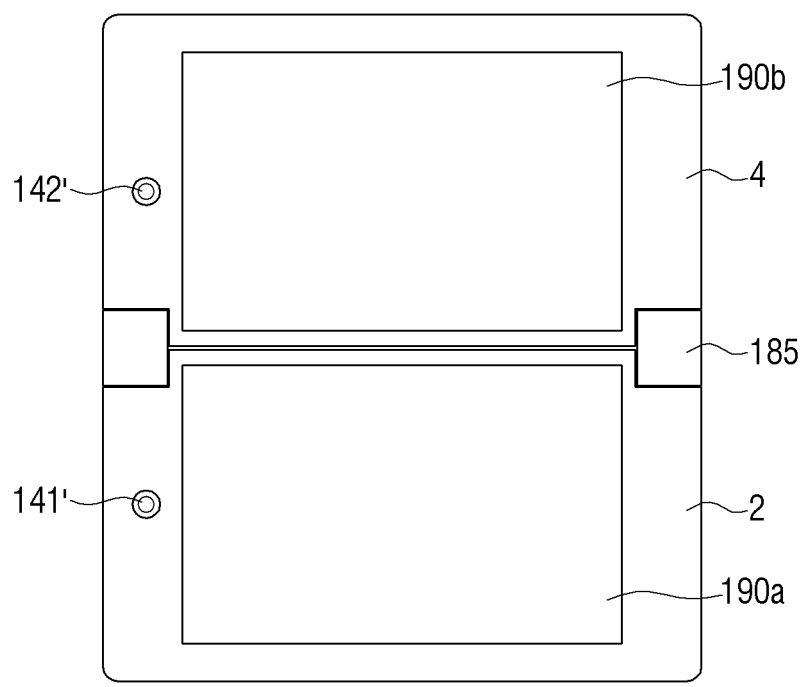

FIGS. 28 to 29 illustrate an example of arranging two cameras 141, 142 of the multi display apparatus 100 according to various exemplary embodiments of the present general inventive concept. That is, FIGS. 28 to 29 show the multi display apparatus 100 from a front direction. Components other than cameras 141, 142 are omitted in the drawings for better understanding of the camera arrangement.

First, referring to FIG. 28, the multi display apparatus 100 may include first and second bodies 2, 4, in which the first body 2 may include a first display 190a and the second body 4 may include a second display 190b. The first and second bodies 2, 4 may be connected via the hinge 185 and moveable with respect to each other. The first camera 141 may be arranged on an edge area of the first body 2, i.e., at a center portion of an edge area opposite to the hinge 185. The second camera 142 may be arranged on an edge area of the second body 4, i.e., at a center portion of the edge area opposite to the hinge 185.

Next, referring to FIG. 29, an alternative camera arrangement will be explained. For convenience of explanation, it is assumed that the user is facing the multi display apparatus 100. The first camera 141' may be arranged on a center surface of the left edge area of the first body 2, while the second camera 142' may be arranged on a center surface of the left edge area of the second body 4. In another exemplary embodiment of the present general inventive concept, the first and second cameras 141' and 142' may be arranged on the center plane of the right edge areas of the first and second bodies 2, 4, respectively. In yet another exemplary embodiment of the present general inventive concept, the first and second cameras 141' and 142' may be arranged at the corners of the first and second bodies 2, 4. As illustrated for example in FIG. 19, the multi display apparatus 100 may be used in the horizontal direction. However, the multi display apparatus 100 may also be used in the vertical direction, as illustrated for example in FIG. 20.

When the first and second cameras 141', 142' are arranged on left or right edge areas of the first and second bodies 2, 4, the user may use their left or right hand as the user object 51 to make gestures, while touching the touch screen with their other hand, which can be a convenient command inputting process to the multi display apparatus 100.

Figure 30:
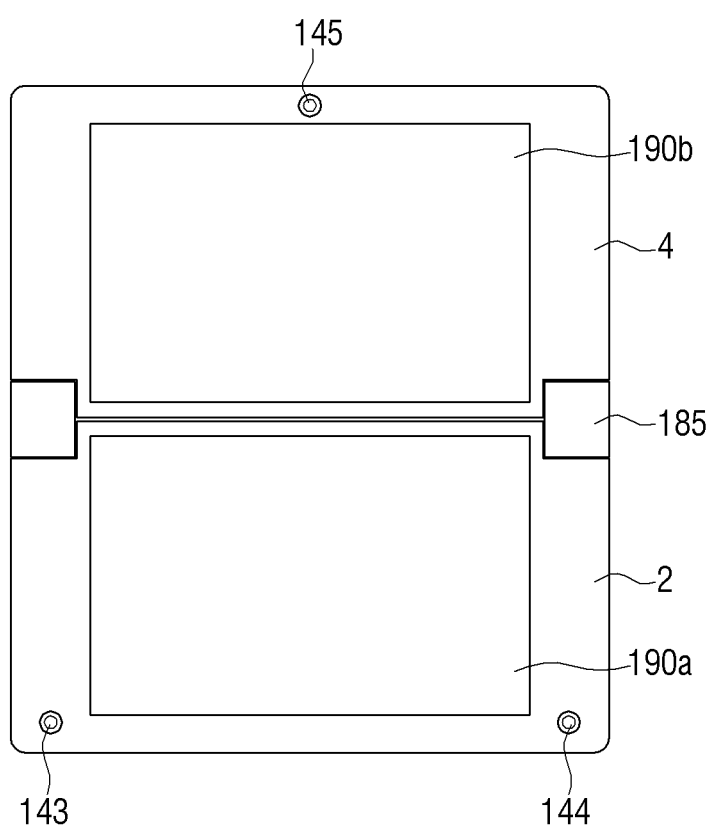
Figure 31:
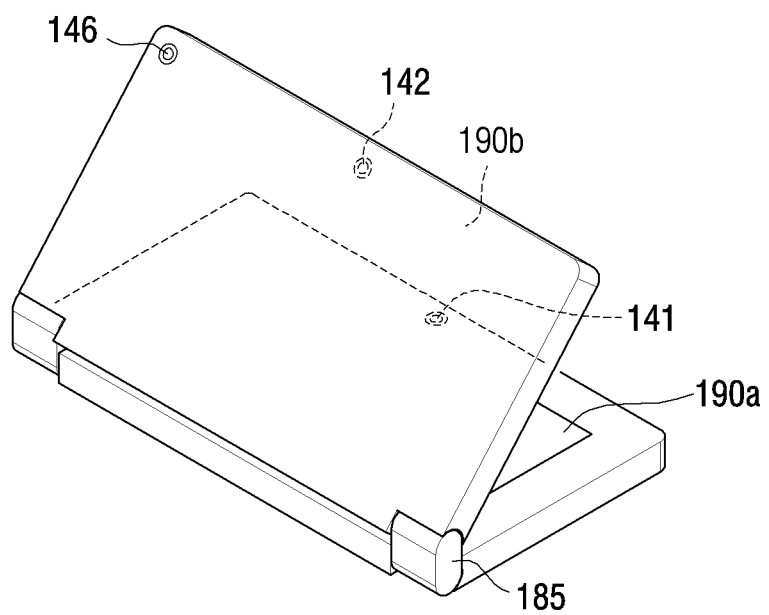
Figure 32:
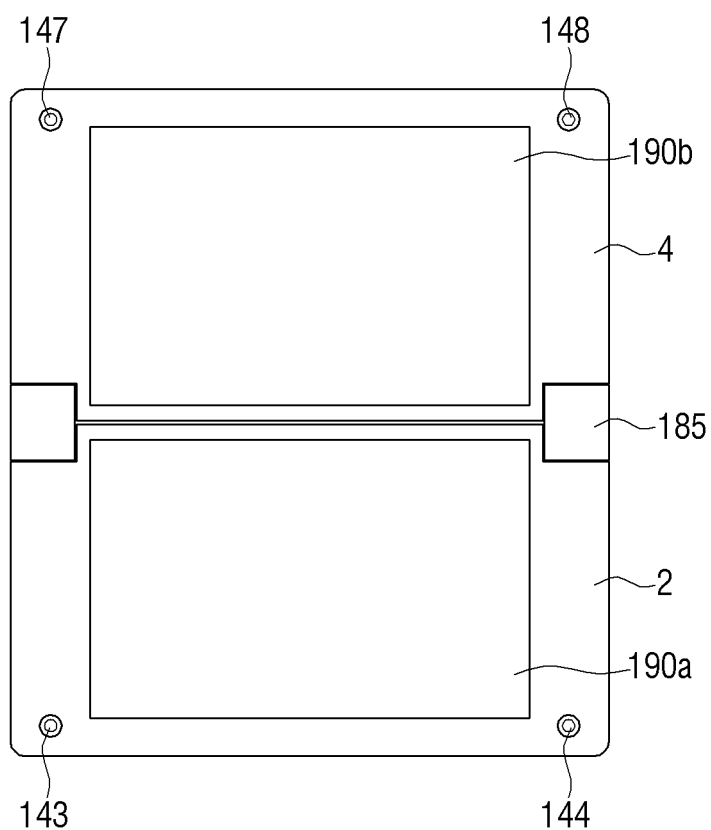

FIGS. 30 to 32 illustrate a multi display apparatus 100 having three or more cameras 141 through 149, according to various exemplary embodiments of the present general inventive concept.

FIG. 30 illustrates a multi display apparatus 100 having three cameras 143, 144, and 145, according to an exemplary embodiment of the present general inventive concept. Referring to FIG. 30, the first and second cameras 143, 144 may be arranged on the same surface of the first body 2 as the first display 190a, while the third camera 145 may be arranged on the same surface of the second body 4 as the second display 190b. The first and second cameras 143, 144 may be arranged at two corners that do not adjoin the hinge 185, and the third camera 145 may be arranged on the center of the edge area of the second body 4 opposite to the hinge 185. Depending on exemplary embodiments of the present general inventive concept, one camera may be arranged at the first body 2, while there may be two cameras arranged at the second body 4.

FIG. 31 illustrates a multi display apparatus 100 having three cameras 141, 142, and 146, according to another exemplary embodiment of the present general inventive concept. Referring to FIG. 31, the first camera 141 may be arranged on the same surface of the first body 2 as the first display 190a, while the second camera 142 may be arranged on the same surface of the second body 4 as the second display 190b. The third camera 146 may be arranged on the opposite surface to the surface of the second body 4 on which the second display 190b is arranged. Although FIG. 31 illustrates the multi display apparatus 100 having the first and second cameras 141, 142 arranged on the center of the edge area opposite the hinge 185, this is only one of exemplary embodiments of the present general inventive concept. Accordingly, the first and second cameras 141, 142 may be arranged at the center of one of the edges of the first and second bodies 2, 4, or at corner area that does not adjoin the hinge 185. Likewise, the third camera 146 may be arranged at a corner area of one side of the second body 4 opposite to the second display 190b, but not limited thereto. Accordingly, the third camera 146 may be arranged at an opposite corner area or at a center of the edge area of the second body 4 that does not adjoin the hinge 185.

FIG. 32 illustrates a multi display apparatus 100 having four cameras 143, 144, 147, and 148, according to an exemplary embodiment of the present general inventive concept. Referring to FIG. 32, the first and second cameras 143, 144 may be arranged on two corner areas of the edge areas of the first body 2 which do not adjoin the hinge 185, while the third and fourth cameras 147, 148 may be arranged on two corner areas of the edge areas of the second body 4 that do not adjoin the hinge 185. However, the positions of the first to fourth cameras 143, 144, 147, and 148 are not limited to the specific examples illustrated in FIG. 32. Accordingly, the cameras 143, 144, 147, and 148 may be arranged on random position of the edge areas on the same side as the first and second displays 190a and 190b of the first and second bodies 2, 4, or on random positions on opposite sides to the first and second displays 190a, 190b.

Three or more multi cameras may be arranged, in which case two cameras may be used for gesture recognition, while the remaining cameras may be used for other purposes such as image photography or video photography.

Figure 33:
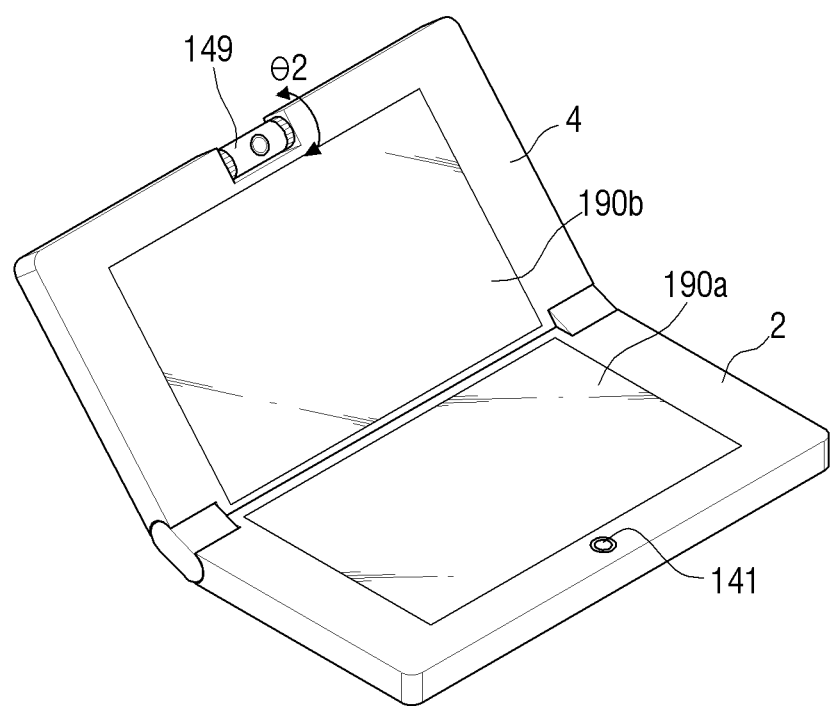
FIG. 33 illustrates a multi display apparatus having a rotatable camera, according to an exemplary embodiment of the present general inventive concept.

FIG. 33 illustrates a multi display apparatus 100 having a rotatable camera 149, according to an exemplary embodiment of the present general inventive concept.

Referring to FIG. 33, a first camera 141 may be arranged at a center of the edge area of the first body 2 opposite to the hinge 185, while the rotatable camera 149 may be arranged at a center of the edge area of the second body 4 opposite to the hinge 185. Accordingly, the rotatable camera 149 may be rotated within an angle range (θ2).

The user may himself rotate the rotatable camera 149 (i.e., manual rotation), or the rotatable camera 149 may rotate according to a preset condition and a preset value (i.e., automatic rotation). Alternatively, both the manual and automatic rotations may be implemented together. The rotatable camera 149 may rotate to the opposite side of the second body 4 as the second display 190b, or may be manually rotatable to photograph external images, or automatically rotatable to the same side of the second body 4 as the second display 190b or manually rotatable for the purpose of spatial gesture recognition.

The 'spatial gesture' refers to a predetermined motion of the user object 51 in a space that causes the multi display apparatus 100 to operate, without requiring physical contact such as a touch on a touch screen or pressing on a button 161. The term '3D gesture' refers to a three-dimensional motion, which is one type of the spatial gesture, recognized as an input gesture to cause the multi display apparatus 100 to operate.

In one exemplary embodiment of the 3D gesture recognition, the rotatable camera 149 may automatically rotate to ensure optimum recognition range for the recognition of a 3D gesture. By way of example, the multi display apparatus 100 may request a user to open his hand to the camera 141, upon entering into the gesture recognition mode. When the user opens his hand toward the camera 141, the multi display apparatus 100 rotates the rotatable camera 149 and detects optimum recognition range within the overlapping recognition range between the first camera 141 and the rotatable camera 149. When the optimum recognition range is detected, an alarm may sound or an indication may be displayed on a display 190a or 190b to notify the user that the operation enters the gesture recognition mode.

In a second exemplary embodiment of the 3D gesture recognition, the multi display apparatus 100 may store optimum angle (θ2) information of the rotatable camera 149 to a storage 170 (illustrated in FIG. 39) or the like, in relation to the angle of the first and second bodies 2, 4, in advance. When the user uses gesture recognition mode, the multi display apparatus 100 detects the angle between the first and second bodies 2, 4, and may adjust the angle of the rotatable camera 149 using the preset angle information of the rotatable camera 149 corresponding to the detected angle.

In a third exemplary embodiment of the 3D gesture recognition, when the multi display apparatus 100 enters gesture recognition mode, the screen photographed at the first camera 141 and the rotatable camera 149 is displayed on the first and second displays 190a, 190b. The user may view the photographed screen displayed on the first and second displays 190a, 190b and adjust the angle of the rotatable camera 149 manually. In this example, information about availability of gesture recognition may be additionally displayed on the first or second display 190a, 190b.

FIGS. 28 to 33 illustrate a multi display apparatus 100 having different numbers of cameras and different camera arrangements. The number of cameras may not be limited to any specific exemplary embodiment of the present general inventive concept illustrated herein. Likewise, the arrangement of each camera may not be limited to any specific arrangement explained above.

FIGS. 28 to 33 illustrate a multi display apparatus 100 which recognizes spatial gestures including 3D gesture using at least two cameras arranged at the first and second bodies 2, 4, respectively, according to an exemplary embodiment of the present general inventive concept. However, other exemplary embodiments of the present general inventive concept are possible. For example, one of the cameras may be used for gesture recognition, while the rest of the cameras may be used for other purposes, such as image photography or video photography.

The user may input a command by touching a touch screen, as well as making a spatial gesture, when the multi display apparatus 100 is equipped with the touch screen and the multi display apparatus 100 operates in spatial gesture recognition mode.

The multi display apparatus 100 may include a display apparatus having physically or graphically divided first and second displays 190a, 190b, and may support various screen modes as those illustrated in FIGS. 34 to 38 by utilizing the two displays 190a, 190b.

FIGS. 34 to 38 illustrate screen modes appearing according to relative angle (θ) between the first and second bodies 2, 4 of the multi display apparatus 100, according to an exemplary embodiment of the present general inventive concept.

The relative angle (θ) is an angle of rotation of the second body 4 rotated to a predetermined direction (e.g., counter-clockwise direction) with respect to the first body 2.

To be specific, the relative angle (θ) may be detected, using a hinge sensor (154, illustrated in FIG. 39) embedded in the hinge 185. The hinge sensor 154 may include any of a hall sensor, pressure sensor, inductive sensor, electric contact sensor, and optical sensor, to detect movement and relative position of the hinge 185, and this may recognize the relative angle (θ). Further, the relative angle (θ) may be recognized by means other than the hinge sensor 154, for example, by detecting positions of the first and second bodies 2, 4 with a geomagnetic sensor or acceleration sensor (not illustrated).

Figure 34:
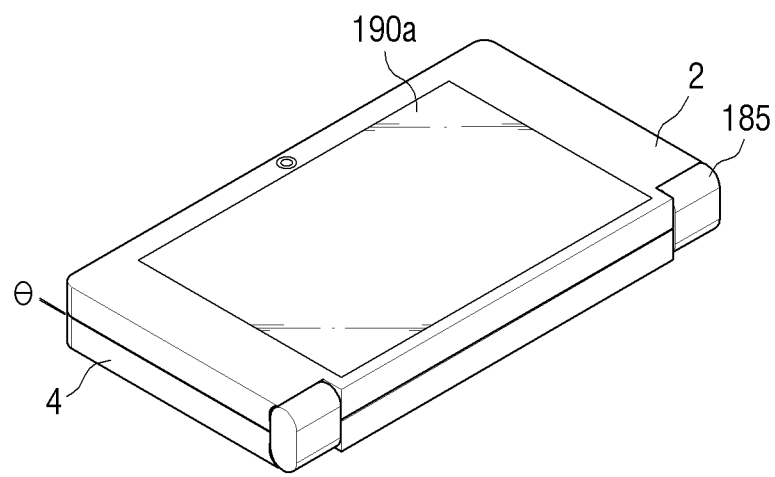
FIGS. 34 to 38 illustrate screen modes implemented in accordance with relative angles between first and second bodies of a multi display apparatus, according to an exemplary embodiment of the present general inventive concept.

FIG. 34 is a perspective view illustrating the multi display apparatus 100 in a folded state. Referring to FIG. 34, the first and second displays 190a, 190b on the first and second bodies 2, 4 faces each other, with the first and second bodies 2, 4 contacting each other. That is, the second display 190b is placed opposite to the first display 190a. The user may not be able to see the second display 190b at the opposite side, when he sees the first display 190a. That is, the user is able to see only one display. The relative angle (θ) at this time is defined as about 0 (zero) degrees. Referring to FIG. 34, the situation where the displays are folded can be referred to as a 'single mode'. In one example, the multi display apparatus 100 is recognized to be in the single mode, when the relative angle between the first and second bodies 2, 4 is between about 0 and about 60 degrees. The single mode may be particularly advantageous for the multi display apparatus 100 in locked state where the apparatus 100 is not usable, or for call application to make calls on a telephone network. In a single mode, the first display 190a on the front may display the screen that implements at least one application, while the second display 190b at the back may be turned off. Certain applications may require use of an option menu or other menu, thus requiring the second display 190b at the back to turn on.

Figure 35:
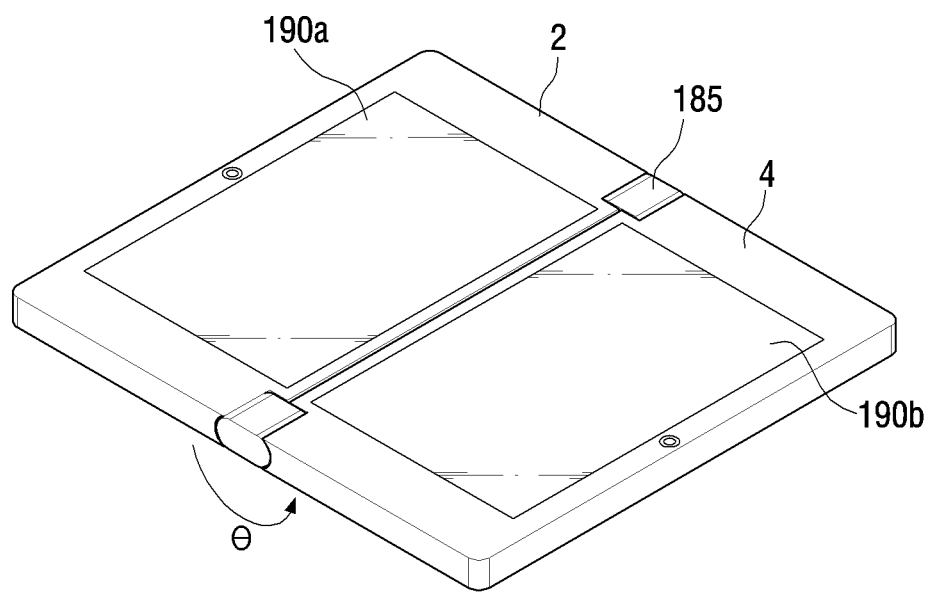

FIG. 35 illustrates the 'unfolded' state (hereinbelow, 'expanding mode') where the first and second bodies 2, 4 are parallel to each other at relative angle (θ) of 180 degrees or near 180 degrees. In one example, when the relative angle between the first and second bodies 2, 4 is in a range of about 175 to about 185 degrees, the multi display apparatus 100 may consider that the first and second bodies 2, 4 are unfolded. The expanding mode may provide various view modes, by, for example, displaying two screens implementing two applications on two displays 190a, 190b, respectively, or displaying two screens implementing one application widely over two displays 190a, 190b. When no application is implemented in any of the displays 190a and 190b, that display(s) may display a home screen. The expanding mode may be particularly advantageous in an application such as e-book or video player application.

Figure 36:
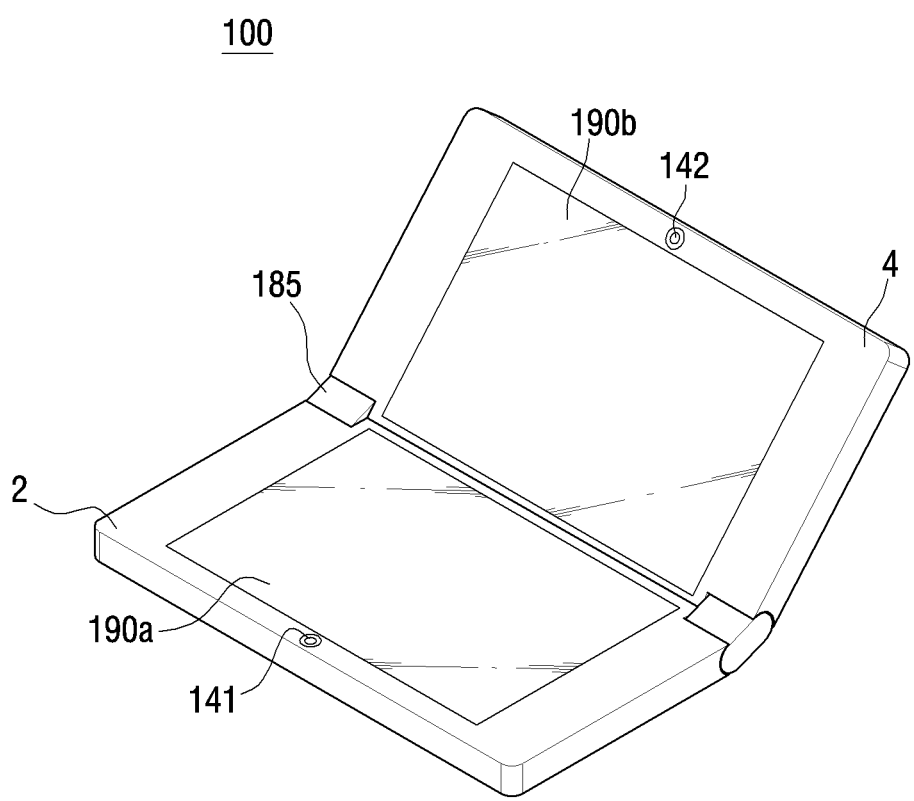

FIG. 36 illustrates a situation in which the relative angle (θ) of the second body 4 with respect to the first body 2 exceeds about 180 degrees, i.e., that the two displays 190a, 190b are slightly folded inward (hereinafter, 'tool kit mode'). In one example, when the relative angle between the first and second bodies 2, 4 ranges between about 185 and about 265 degrees, this is recognized to be the tool kit mode. The 'tool kit mode' is thus when the two displays 190a, 190b are slightly folded to face inward and particularly advantageous when the multi display apparatus 100 is used similarly as a notebook. In one example, various work environments may be provided, so that, for example, one display 190a may display an operating screen, while the other display 190b may display tools such as a keyboard. The multi display apparatus 100 in tool kit mode may operate in spatial gesture recognition mode.

Figure 37:
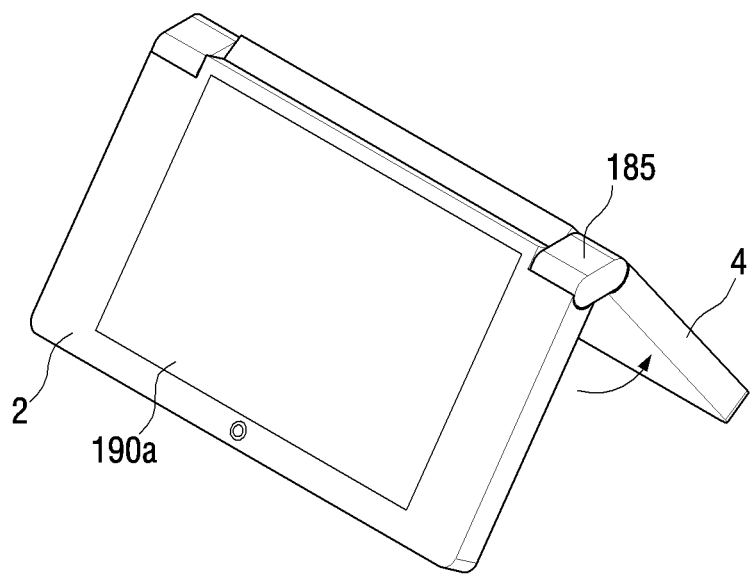

FIG. 37 illustrates that the relative angle (θ) of the second body 4 with respect to the first body 2 is less than about 180 degrees, i.e., when the two displays 190a, 190b are almost folded outwardly to opposite directions (hereinafter, 'standing mode'). In one example, when the relative angle between the first and second bodies 2, 4 ranges between 30 and 90 degrees, the multi display apparatus 100 recognizes the standing mode. The 'standing mode' is when the two displays 190a, 190b are folded, facing outside, in which case the multi display apparatus 100 can be placed upright on a floor in a rectangular posture, advantageously for use as a digital watch or frame, or for an extended period of displaying content, such as watching of personal broadcast, movies, or videos.

In another example, the 'standing mode' may be used for an application that requires cooperation or interaction among two or more users, such as, for example, a telephone conference, collaborative game, etc. Certain applications may require that in the standing mode, the work screen be displayed on the first display 190a in front only, in which case the second display 190b may be turned off. Certain applications may require use of option menus, in which case the second display 190b at the back may be turned on.

Figure 38:
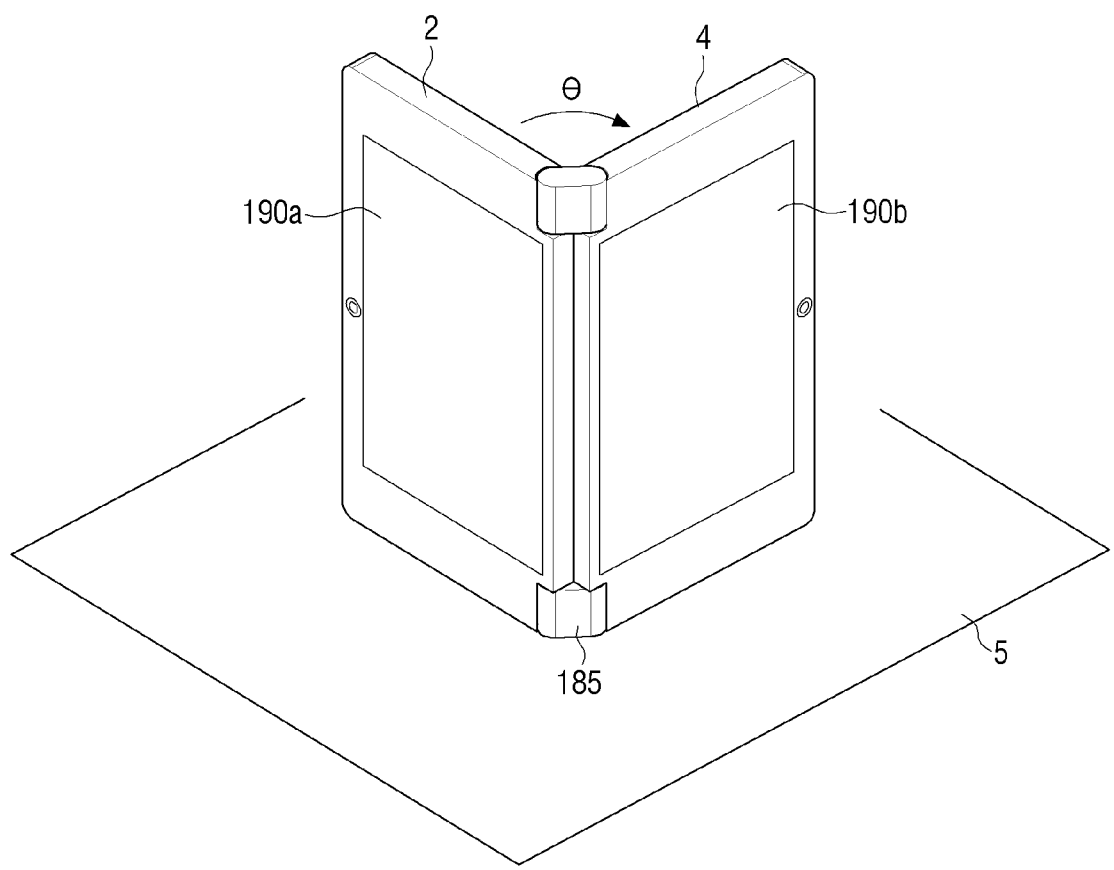

FIG. 38 illustrates the standing mode of FIG. 37 in another exemplary embodiment of the present general inventive concept, in which the multi display apparatus 100 stands upright with the hinge partially contacting a floor surface 5 (hereinafter, 'vertical view mode'). In the vertical view mode, the relative angle (θ) between the first and second bodies 2, 4 ranges between about 30 and about 90 degrees, and it is recognized to be the vertical view mode when the multi display apparatus 100 is determined to be standing upright by the acceleration sensor.

To be specific, the acceleration sensor may detect the rotation of the multi display apparatus 100. The acceleration sensor may detect change between a vertical view mode in which the first and second displays 190a, 190b of the multi display apparatus 100 are arranged on the left and right sides of the multi display apparatus 100, and a horizontal view mode in which the first and second displays 190a, 190b are arranged on the upper and lower sides of the multi display apparatus 100.

The vertical view mode may be implemented in an application such as a telephone conference or multi video player, at which it is necessary to provide different images to two or more users.

FIG. 39 is a block diagram illustrating a structure of a multi display apparatus 100 according to an exemplary embodiment of the present general inventive concept.

The multi display apparatus 100 may be connected to an external device (not illustrated) using at least one of cellular communication 111, wireless LAN module 112 and LAN communication module 113, and connector 114. The 'external device' as used herein may include at least one of mobile phone, smartphone, tablet PC, computer server and digital TV.

Referring to FIG. 39, the multi display apparatus 100 includes two displays 190a and 190b. Although there are two displays 190a, 190b illustrated in FIG. 39, it will be understood that three or more displays may be adequately implemented.

In one exemplary embodiment of the present general inventive concept, the multi display apparatus 100 may include a communicator 110, a multimedia unit 120, a controller 130, an imaging module 140, a sensor 150, an input/output unit 160, a storage 170, a power supply 180, and first and second displays 190a, 190b.

The communicator 110 may include a cellular communication module 111, a wireless LAN module 112, a LAN communication module 113, a connector 114, a global positioning system (GPS) module 115, and a broadcast communicating module 116. It will be understood that the communicator 110 may not include some or all of these components, or alternatively may include additional components, depending on the exemplary embodiment of the present general inventive concept.

The cellular communication module 111 adopts wireless access technology according to cellular communication protocol under control of the controller 130, to connect the multi display apparatus 100 to connect to an external device (not illustrated), such as a base station of a cellular system, via at least one or a plurality of antennas (not illustrated).

Further, the cellular communication module 111 transmits and receives a wireless signal carrying a voice call, telephony, short messaging service (SMS) message or multimedia messaging service (MMS) message to or from another communicable device (not illustrated) such as a mobile phone, a smartphone, or a tablet PC or the like that has telephone numbers inputted to the multi display apparatus 100.

Further, the communicator 110 may include at least one of the wireless LAN module 112 and the LAN communication module 113. For example, the communicator 110 may include the wireless LAN module 112 only, or include LAN communication module 113 only, or include both the wireless LAN module 112 and the LAN communication module 113.

The wireless LAN module 112 may access the internet at a location provided with wireless access point (AP, not illustrated) under control of the controller 130. The wireless LAN module 112 supports the wireless LAN specification (IEEE802.11x) of the IEEE.

The LAN communication module 113 is for wireless LAN communication between the multi display apparatus 100 and an external device (not illustrated) under control of the controller 130. The LAN communication may include for example Bluetooth, or infrared data association (IrDA).

The connector 114 provides various interfaces with the multi display apparatus 100, such as, for example, USB 2.0, USB 3.0, HDMI, or IEEE 1394.

The connector 114 may be used as an interface between the multi display apparatus 100 and an external device or a power source (not illustrated). Under control of the controller 130, data stored at the storage 170 of the multi display apparatus 100 may be transmitted to the external device or the data may be received from the external device via the wired cable connected to the connector 114. The power may be inputted from the power source via the wired cable connected to the connector 114, or battery (not illustrated) may be charged.

The GPS module 115 receives geomagnetic wave from a plurality of GPS satellites (not illustrated) in the earth's orbit, and may calculate the location of the multi display apparatus 100 using time of arrival between the GPS satellites (not illustrated) and the multi display apparatus 100 and GPS parameters.

The broadcast communication module 116 may receive a broadcast signal (e.g., TV broadcast signal, radio broadcast signal or data broadcast signal) transmitted from a broadcasting station via a broadcast communication antenna (not illustrated) and additional broadcast information (e.g., electric program guide (EPS), or electric service guide (ESG)).

The multimedia unit 120 includes an audio playback module 121 and a video playback module 122.

The audio playback module 121 may play back a digital audio file (e.g., file extension mp3, wma, ogg or way) either stored or received under control of the controller 130. The video playback module 122 supports various forms of codec to playback a digital video file. That is, a video file is played back with a pre-stored codec which is suitable for the video file intended to be played. Further, the audio playback module 121 or the video playback module 122 of the multimedia unit 120 may be included in the controller 130.

The controller 130 may include a CPU 131 (illustrated in FIG. 40), a read-only memory (ROM) 137 (illustrated in FIG. 40) recording therein a control program to control the multi display apparatus 100, and a random access memory (RAM) 135 (illustrated in FIG. 40) recording therein a signal or data incoming outside the multi display apparatus 100 or used as a memory area during operations performed at the multi display apparatus 100. The CPU may include at least one from among a single core processor and multi core processors (such as a dual core processor, a triple core processor, and a quad core processor, for example). The CPU, ROM and RAM may be interconnected with each other via an internal system bus 139 (illustrated in FIG. 40).

The controller 130 controls the communicator 110, the multimedia unit 120, the imaging module 140, the sensor 150, the input/output unit 160, the storage 170, the power source 180, and the first and second displays 190a, 190b.

The imaging module 140 may include at least one of a first imaging unit 140a and a second imaging unit 140b, illustrated for example in FIG. 1. Although FIG. 39 only illustrates the first and second imaging units 140a, 140b, depending on exemplary embodiments of the present general inventive concept, additional imaging units may be added.

The imaging module 140 may include at least one of the first and second imaging units 140a, 140b to photograph still image or motion images, under control of the controller 130. Depending on needs, several imaging units 140a, 140b may be added. The first and second imaging units 140a, 140b may be provided in the body of the multi display apparatus 100, or connected to the multi display apparatus 100 with a separate connecting means (not illustrated). At least one of the first and second imaging units 140a, 140b may include an auxiliary light source (e.g., a flash (not illustrated)) to provide luminosity necessary for the photographing.

In one exemplary embodiment of the present general inventive concept, the first imaging unit 140a may be arranged on a front side of the multi display apparatus 100, while the second imaging unit 140b may be arranged on a rear side of the multi display apparatus 100. In another exemplary embodiment of the present general inventive concept, the first and second imaging units 140a, 140b may be placed in the proximity to each other (e.g., at an interval greater than 1 cm, and less than 8 cm) to photograph still or motion 3D images. In yet another exemplary embodiment of the present general inventive concept, the first imaging unit 140a may be arranged on the first body 2, while the second imaging unit 140b may be arranged on the second body 4.

The imaging module 140 may include a lens and an image sensor (not illustrated). General lens such as universal lens, wide-angle lens, or zoom lens may be used. The first and second imaging units 140a, 140b may include lenses which are generally identical to each other, but are not limited thereto. Accordingly, the imaging units 140a, 140b may have different lenses from each other depending on needs.

The image sensor may include complementary metal oxide semiconductor (CMOS) and a charge coupled device (CCD). The first and second imaging units 140a, 140b may include generally one type of image sensors, but not limited thereto. That is, the first and second imaging units 140a, 140b may include a combination of different types of image sensors. For example, both the first and second imaging units 140a, 140b may use CMOS or CCD, or alternatively, the first imaging unit 140a may use CMOS, while the second imaging unit 140b may use CCD.

The imaging module 140 may transmit the images captured through at least one of the first and second imaging units 140a, 140b to the controller 130. The controller 130 detects the motion or shape of the user based on analysis on the images, and performs corresponding control operation according to the detected motion or shape. In one example, the 'user's motion' may include a motion made by the user's hand and detected through the first or second imaging unit 140a, 140b. The 'user's shape' may refer to a facial profile of the user which is detected through the first or second imaging unit 140a, 140b.

In yet another exemplary embodiment of the present general inventive concept, the multi display apparatus 100 may detect the user's motion using another means such as an infrared detector (not illustrated) and implement or control an application in response to the motion.

The sensor 150 may include a touch sensor 151, a geomagnetic sensor 152, an acceleration sensor 153, a hinge sensor 154, or a proximity sensor 155.

The touch sensor 151 detects a touch of the user made with respect to the displays 190a and 190b. The touch sensor 151 may be categorized into a capacitive sensor or a resistive sensor, depending on a manner of detecting the user's touch. According to an exemplary embodiment of the present general inventive concept, the touch sensor 151 may be implemented in both manners, respectively. The touch sensor 151 may include a display along with a display panel. This will be explained in detail below with reference to the drawings.

The touch sensor 151 enables a user to input a command indicated on a display screen by pressing touch screens corresponding to displays 190a, 190b with a body part or other detectable input means. The touch sensor 151 may utilize capacitive change, resistance change, or luminosity change.

The geomagnetic sensor 152 may detect an azimuth by detecting geomagnetism. Accordingly, the geomagnetic sensor 152 recognizes the direction of the multi display apparatus 100. The acceleration sensor 153 measures dynamic force such as acceleration, vibration, or impact of an object by processing an output signal, and detects speed change or magnitude of force of the multi display apparatus 100. The hinge sensor 154 may detect an angle or movement of the hinge. The proximity sensor 155 may detect access of a user object 51 or 52 to the multi display apparatus 100.

Although not illustrated in FIG. 39, the sensor 150 of the multi display apparatus 100 may include additional types of sensors, such as at least one of a gravity sensor which detects a direction of gravity, a gyro sensor which implements rotation to a conventional acceleration sensor and thus is able to recognize a total of 6 axes, an orientation sensor which automatically detects vertical and horizontal frames of content such as an image and automatically rotates and aligns the content, an illuminance sensor which detects an amount of light near the multi display apparatus 100, an altitude measuring sensor which measures atmospheric pressure, an RGB sensor which detects a color of an object, a distance measuring sensor which detects a distance using ultrasound or infrared ray, and a hall sensor which detects voltage change according to the magnitude of geomagnetism.

Each sensor of the sensor 150 detects the status, generates a detection signal and transmits the same to the controllers 130. The sensors of the sensor 150 may be added or removed, depending on performance required for the multi display apparatus 100.

The input/output 160 unit may include one or more buttons 161, a microphone 162, a speaker 163 and a vibration motor 164.

At least one button 161 may be provided on a front, a side or a rear side of the first or second body 2, 4 of the multi display apparatus 100, and implemented as a push type or touch type. The button 161 may include at least one of a power/lock button, volume button, menu button, home button, back button, and search button.

The microphone 162 may receive voice or sound and generates electric signal, under control of the controller 130.

Under control of the controller 130, the speaker 163 may output sound corresponding to various signals (e.g., wireless signal, broadcast signal, digital audio file, digital video file or photographing) of the cellular communication module 111, the wireless LAN module 112, the LAN module 113, the multimedia unit 120 or the imaging module 140, outside the multi display apparatus 100.

The speaker 163 may output sound (e.g., button operating sound or call connection sound) corresponding to a function as performed by the multi display apparatus 100. One or a plurality of speakers 163 may be formed at appropriate location(s) of the body of the multi display apparatus 100. In one example, the speaker 163 may include an internal speaker module arranged at a location suitable to access the user's ear during a telephone call, and an external speaker module having high enough output for use in playback of a file or viewing of a broadcast and being arranged at an appropriate location of the body of the multi display apparatus 100.

The vibration motor 164 may convert electric signal into mechanical vibration under control of the controller 130. For example, when the multi display apparatus 100 is in vibration mode, the vibration motor 164 operates in response to voice call received from another device (not illustrated). One or a plurality of vibration motors 164 may be formed inside the body of the multi display apparatus 100. The vibration motor 164 may operate in response to a user's touch gesture as detected at the first and second displays 190a, 190b, and a series of touch motions as detected at the first and second displays 190a, 190b.

The storage 170 may store various processed multimedia data, content data, or data received from external source.

That is, the storage 170 may store signals, information or data inputted or outputted in response to the operations of the cellular communication module 11, the wireless LAN module 112, the LAN communication module 113, the connector 114, the GPS module 115, the multimedia unit 120, the imaging module 140, the sensor 150, the input/output unit 160, and the first and second displays 190a, 190b, under control of the controller 130.

The storage 170 may store a control program to control the multi display apparatus 100, or more specifically, to control the controller 130 and applications. The expression "storage" as used herein may encompass a memory card (for example, an SD card, or a memory stick) mountable/removable to or from the ROM, RAM or multi display apparatus 100. The storage 170 may include a non-volatile memory, a volatile memory, a hard disk drive (HDD) or a solid state drive (SSD).

The power source 180 supplies electricity for use at the multi display apparatus 100. The power source 180 may be implemented in the form of a rechargeable battery, and may additionally include a voltage converter which converts externally-supplied power and feeds the converted power to the rechargeable battery.

The power source 180 may supply electricity to the multi display apparatus 100 in various modes including for example a maximum mode, a normal mode, a power-save mode, or standby mode, depending on power management control of the controller 130.

The first and second displays 190a, 190b may be connected to each other by a hinge 185. The first and second displays 190a, 190b display multimedia content, image, video, or text under control of the controller 130.

The first and second displays 190a, 190b are physically separated from each other. The displayed screens on the first and second displays 190a, 190b may be independently controllable from each other. For example, the first and second displays 190a, 190b may have individually-set resolutions from each other. Further, screen expansion, rotation, movement, or division may be individually performed on each of the first and second displays 190a, 190b.

The first and second displays 190a, 190b may display a single display screen, using a virtual integrated frame buffer.

The first and second displays 190a, 190b may be implemented as various display units such as, for example, liquid crystal display (LCD) panel, plasma display panel (PDP, organic light emitting diode (OLED), vacuum fluorescent display (VFD), field emission display (FED), or electro luminescence display (ELD).

The first and second displays 190a, 190b may be implemented as general display panels without touch input function, or implemented as touch display panels that can recognize user's manipulation using proximity sensor or touch sensor. When implemented as touch display panels, the first and second displays 190a, 190b may receive at least one touch gesture of the user which is made with the user object 51, such as the user's bodily part (e.g., fingers including thumb), or other detectable input means such as a stylus pen 51a.

The user interface may include a predetermined touch area, a soft key (not illustrated), and a soft menu (not illustrated). The first and second displays 190a, 190b may transmit an electronic signal corresponding to at least one touch gesture incoming through the user interface to the controller 130 via an LCD controller (not illustrated). Further, the first and second displays 190a, 190b may detect successive touching motions and transmit an electronic signal corresponding to successive or non-successive touching motion to the LCD controller.

The first and second displays 190a, 190b may implement resistive method, capacitive method, infrared method or acoustic wave method.

The first and second displays 190a, 190b may convert a signal on the user's motion as detected through the touch sensor into a digital signal (e.g., X and Y coordinates) and transmit the result to the controller 130. The controller 130 may perform controlling corresponding to the user's motion inputted through the first and second displays 190a, 190b, using the received digital signal. For example, in response to the user's motion, the controller 130 may cause the soft key displayed on the first and second displays 190a, 190b be selected, or an application corresponding to the soft key be executed.

The user gesture as explained above is not limited to a direct contact between the first and second displays 190a, 190b and the user's bodily part or touchable input means, but also includes a contactless way. The sensitivity in sensing the user's motion at the first and second displays 190a, 190b may be varied depending on performance or structure of the multi display apparatus 100.

Meanwhile, although the above exemplary embodiments of the present general inventive concept illustrate and explain that the first and second bodies 2, 4 of the multi display apparatus 100 are connected via the hinge 185, other examples are possible. Accordingly, the bodies 2, 4 of the multi display apparatus 100 may be connected via a flexible connecting portion (not illustrated), instead of the hinge 185.

Figure 40:
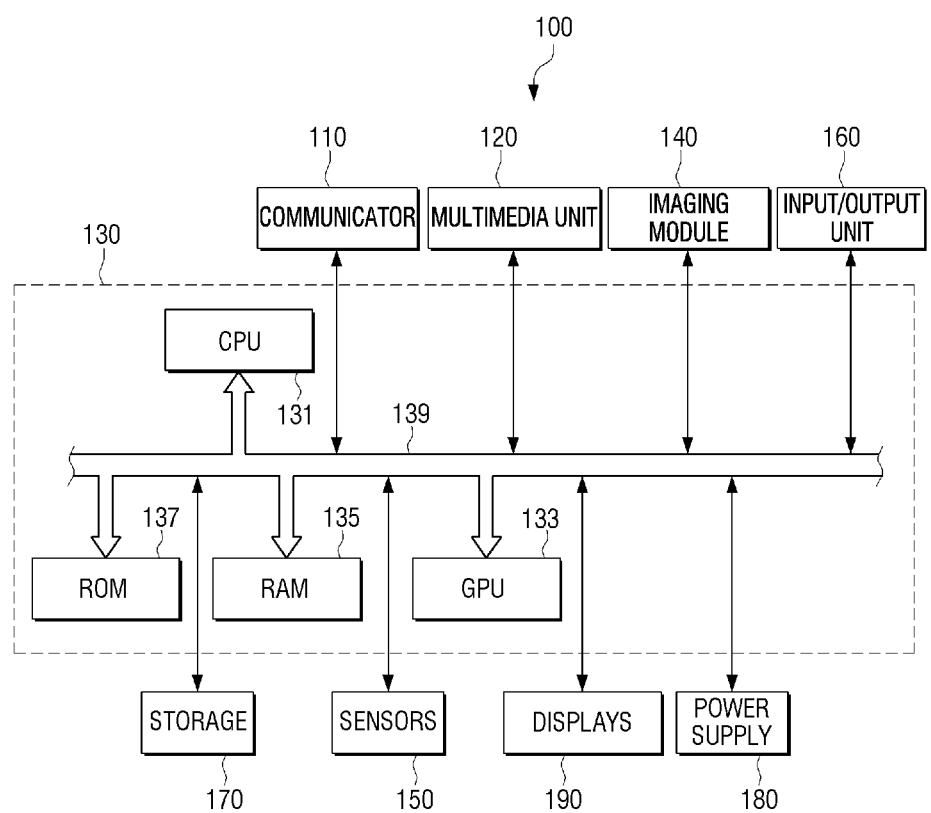
FIG. 40 is a detailed block diagram illustrating a multi display apparatus, according to various exemplary embodiments of the present general inventive concept.

FIG. 40 is a block diagram illustrating a structure of the multi display apparatus 100, according to various exemplary embodiments of the present general inventive concept.

Referring to FIG. 40, the multi display apparatus 100 may include a communicator 110, a multimedia unit 120, a controller 130, an imaging module 140, a sensor 150, an input/output unit 160, a storage 170, a power source 180, and a plurality of displays 190. Components that were already explained above with reference to FIG. 39 will be omitted for the sake of brevity, while the process of displaying will be explained in detailed below.

The CPU 131 retrieves data from the storage 170 (illustrated in FIG. 39) to the RAM 135, and transmits the data stored in the RAM 135 that needs graphic processing to a Graphics Processing Unit (GPU) 133. The CPU 131 receives the graphically-processed data from the GPU 133 and transmits the same to the LCD controller (not illustrated) connected to the system bus 139 so that an image is displayed on the display.

The CPU 131 temporarily stores the image data processed at the GPU 133 at a virtual frame buffer area which is allocated to a predetermined area of the RAM. The CPU 131 allocates virtual frame buffer area to support the maximum resolution (e.g., 102×600) of the display 190. When there are two displays 190a and 190b, the virtual frame buffer area may be allocated in the size of 1024×1200.

The CPU 133 inputs temporarily-stored data of the virtual frame buffer to the GPU 133 for digital signal processing.

The GPU 133 performs graphic processing on the inputted data under control of the CPU 131. To be specific, the GPU 133 may generate a screen that includes various objects including, for example, icons, images, or texts, using a calculator (not illustrated) and a renderer (not illustrated). The calculator may calculate attribute values such as coordinate values, shapes, sizes, or colors for the respective objects to be displayed according to layout of the screen. The renderer may generate screen of various layouts including therein objects, based on the attributes values calculated at the calculator. The screen generated at the renderer may be transmitted to the first and second displays 190a, 190b via the bus 139 to be either displayed on a display area or stored at the storage 170.

Figure 41:
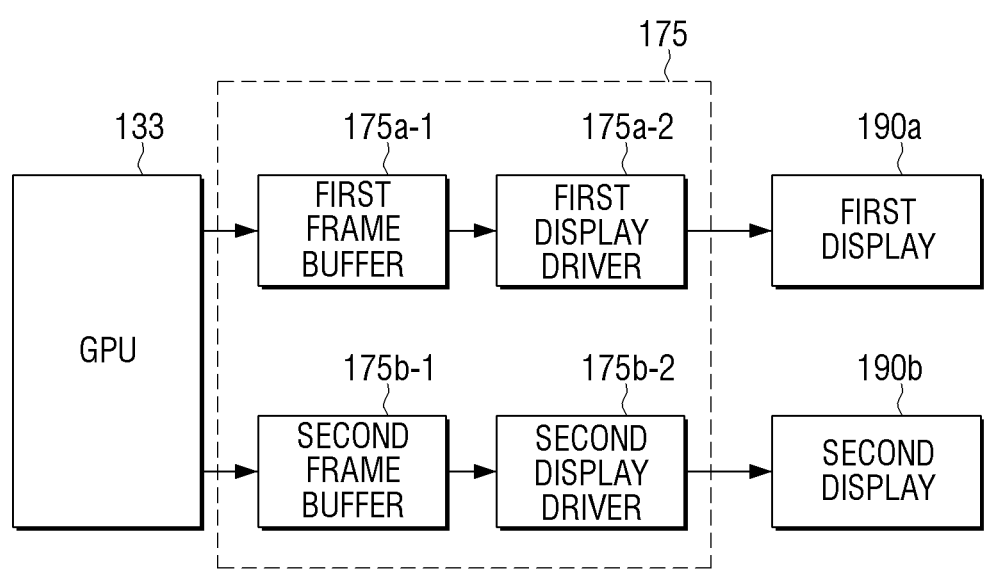
FIG. 41 is a detailed block diagram illustrating a multi display apparatus controlling an operation of each display using a plurality of frame buffers, according to an exemplary embodiment of the present general inventive concept.

The CPU 131 may control so that the graphically-processed data of the GPU 133 is displayed through at least one of the first and second displays 190a, 190b, or stored at the storage 170, or the processed data may be inputted to a display controller (175, illustrated in FIG. 41).

The GPU 133 may include a decoder, a renderer, or a scaler. Accordingly, the GPU 133 may decode the stored content, render the decoded content to construct a frame, and scale the size of the constructed frame to suit the display size according to control of a display controller 175. For an image to be displayed on only one of the first and second displays 190a, 190b, the image may be scaled to suit the size. For an image to be displayed on both displays 190a and 190b, the image is scaled to suit the overall display size. The GPU 133 may provide the processed frame to the display to be displayed.

Since the multi display apparatus 100 includes a plurality of displays 190, various screens are possible when the displays 190 are utilized. The basic detailed structure and operation of the multi display apparatus 100 will now be explained below with reference to certain exemplary embodiments of the present general inventive concept.

FIG. 41 is a block diagram illustrating a multi display apparatus 100 which controls the operation of the respective displays 190a, 190b using a plurality of frame buffers.

Referring to FIG. 41, the multi display apparatus 100 may include first and second displays 190a, 190b, and a display controller 175. The display controller 175 may be separately provided from the controller 130 of FIG. 39, or integrated into the controller 130.

Referring to FIG. 41, the display controller 175 may include a first frame buffer 175a-1, a first display driver 175a-2, a second frame buffer 175b-1, and a second display driver 175b-2.

The first frame buffer 175a-1 is provided to buffer image frames to be displayed on the first display 190a, while the second frame buffer 175b-1 is provided to buffer image frames to be displayed on the second display 190b.

For example, image frames digital signal processed at the GPU 133 may be stored in bitmap form in the first and second frame buffers 175a-1, 175b-1. In this example, the buffering regions of the respective frame buffers 175a-1, 175b-1 may be allocated to meet the maximum supportable pixel size by the respective displays 190a, 190b as possible. The first display driver 175a-2 analyzes the image frame stored at the first frame buffer 175a-1 and converts the same into a first image source signal. The first display driver 175a-2 provides the first image source signal to the first display 190a, and drives the first display 190a to display the image frame.

Likewise, the second display driver 175b-2 may analyze the image frame stored at the second frame buffer 175b-1 and convert the same into a second image source signal, and provide the same to the second display 190b to be displayed.

Figure 42:
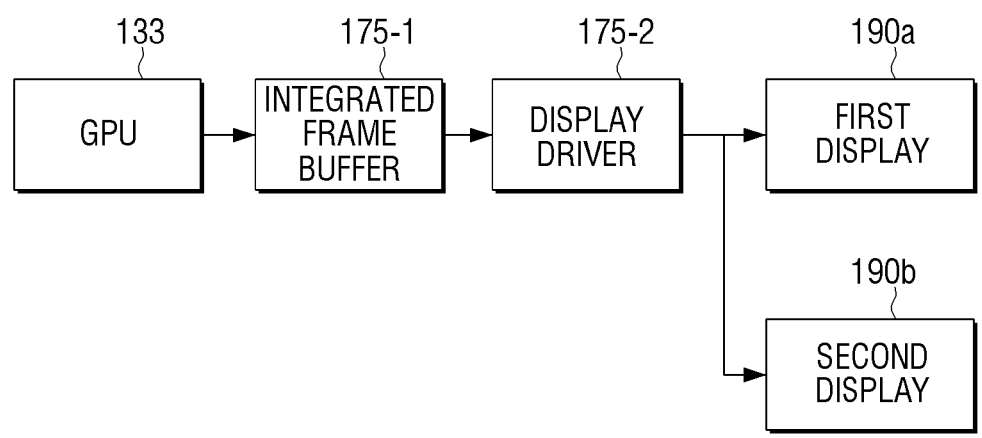
FIG. 42 is a block diagram illustrating a multi display apparatus controlling an operation of each display using an integrated frame buffer, according to an exemplary embodiment of the present general inventive concept.

Although FIG. 41 illustrates that the first and second frame buffers 175a-1, 175b-1 are separately provided to correspond to the respective displays 190a, 190b, in another exemplary embodiment of the present general inventive concept as the one illustrated in FIG. 42, one integrated frame buffer 175-1 may also be used.

FIG. 42 is a block diagram of a multi display apparatus 100 which controls operation of the respective displays 190 using one integrated frame buffer 175-1.

That is, FIG. 42 is a block diagram of a multi display apparatus 100 controlling operations of the respective displays 190, using an integrated frame buffer 175-1. When the frame buffer is implemented in the form of an integrated frame buffer 175-1, the size of the integrated frame buffer 175-1 may be so determined that the resolution exceeds the maximum resolution of the first and second displays 190a and 190b.

For example, when the first and second displays 190a and 190b display maximum 1024*800 resolution, the integrated frame buffer 175-1 may allocate a storage area to a frame buffer size that can display up to 1024*1600 resolution. The integrated frame buffer 175-1 may store at a first area a first image frame to be displayed on the first display 190a, and store at a second area a second image frame to be displayed on the second display 190b.

The display driver 175-2 may provide the first and second image frames to the first or second display 190a, 190b using the addresses of the first and second image frames stored at the integrated frame buffer 175-1 to thus drive the respective displays.

Figure 43:
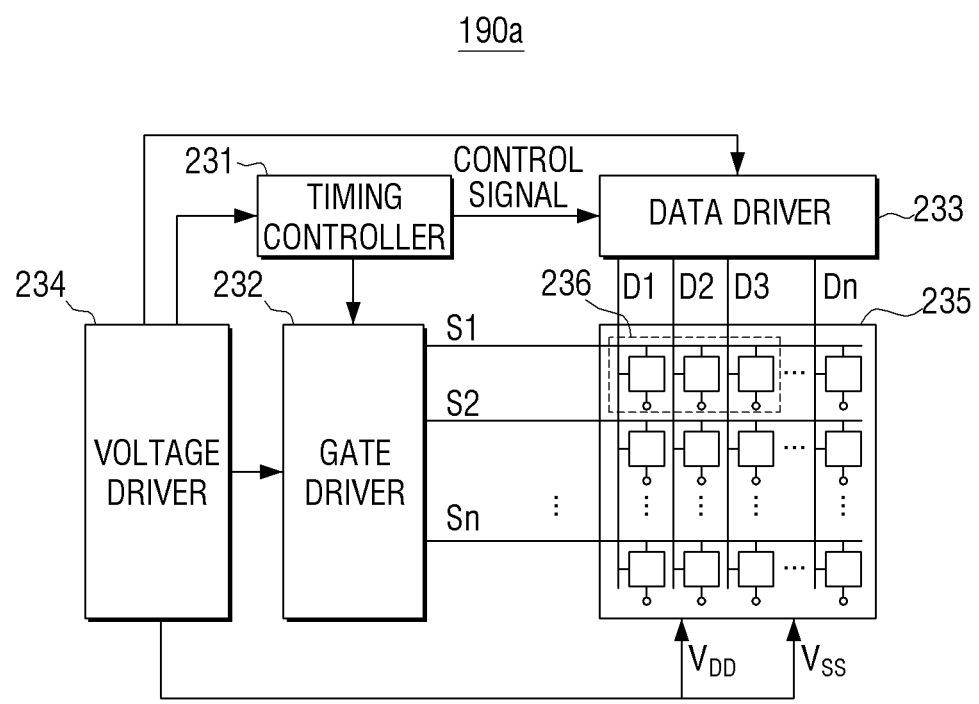
FIG. 43 is a view illustrating a structure of a first display among the two displays illustrated in FIG. 41.

FIG. 43 is provided to particularly explain a structure of the first display 190a among the two displays illustrated in FIG. 41.

FIG. 43 thus illustrates an example of the constitution of the display. For convenience of explanation, FIG. 43 illustrates the first display 190a only. However, it will be appreciated that the second display 190b may also be implemented in the same manner.

Referring to FIG. 43, the first display 190a may include a timing controller 231, a gate driver 232, a data driver 233, a voltage driver 234, and a display panel 235.

The timing controller 231 may receive an external signal such as a clock signal (DCLK), and horizontal and vertical synchronous signals (Hsync, Vsync) suitable for the resolution of the touch screen, generate a gate control signal (scan control signal), data control signal (data signal), and re-align the R, G, B data to supply the same to the data driver 233.

The timing controller 231 may generate a signal related to the gate control signal, which are, gate shift clock (GSC), a gate output enable (GOE), or a gate start pulse (GSP). Among these, GSC determines on/off time of the thin film transistor (TFT) connected to a light emitting device such as R, G, B organic light emitting diodes (OLED), GOE is the signal to control the output of the gate driver 232, and GSP is the signal that notifies the first driving line of the screen among one vertical synchronous signal.

Further, the timing controller 231 may generate signal related to the data control signal, which are a source sampling clock (SSC), a source output enable (SOE), or a source start pulse (SSP). Among these, SSC is used as a sampling clock to latch the data at the data driver 233, and this determines driving frequency of the data drive IC. SOE transmits the latched data to the display panel 235. SSP is a signal that indicates the time of latching or sampling the data during one horizontal synchronization period.

The gate driver 232 generates a scan signal, and is connected to the display panel 235 via scan lines (S1, S2, S3, . . . , Sn). The gate driver 232 applies the gate on/off voltage (Vgh/Vgl, not illustrated) provided from the voltage driver 234 to the display panel 235 according to a gate control signal generated at the timing controller 231. The gate on voltage (Vgh) is provided in sequence from a gate line 1 (GL1, not illustrated) to gate line N (GLn, not illustrated) to implement a unit frame image on the display panel 235.

The data driver 233 generates data signal and is connected to the display panel 235 via data lines (D1, D2, D3, . . . , Dn). The data driver 233 completes scaling in accordance with data control signal which is generated at the timing controller 231 and inputs RGB data of the image frame to the display panel 235. The data driver 233 converts the serial RGB image data provided from the timing controller 231 into parallel data, converts digital data to analog voltage, and provides the image data corresponding to one horizontal line to the display panel 235. This process is performed in sequence with respect to respective horizontal lines.

The voltage driver 234 generates driving voltages and transmits the same to the gate driver 232, the data driver 233, or the display panel 235, respectively. For example, commercial electricity (e.g., 110V or 220V AC) may be received from outside, in which case power voltage (VDD) necessary for the display panel 235 may be generated and provided accordingly, or ground voltage (VSS) may be provided. Further, gate on voltage (Vgh) may be generated and provided to the gate driver 232. Accordingly, the voltage driver 234 may include a plurality of voltage driven modules (not illustrated) which are individually driven from each other. The plurality of voltage driven modules may operate under control of the controller 130 to provide different voltages from each other, or the controller 130 may control the voltage driver 234 so that the plurality of voltage driven modules provide different driving voltages from each other according to preset information. For example, each of the plurality of voltage driven modules may provide different first voltages and the second default voltage, under control of the controller 130 and according to the preset information.

In one exemplary embodiment of the present general inventive concept, the voltage driver 234 may include a plurality of voltage driven modules (not illustrated) corresponding to a plurality of areas divided from the display panel 235, respectively. In this example, the controller 130 may control the plurality of voltage driven modules to provide different first voltages, i.e., different ELVDD voltages, depending on the screen information (or input image information) of the plurality of areas. Accordingly, it is possible to control the ELVDD voltage size, using the image signal inputted to the data driver 233. The screen information may include at least one of the brightness and grayscale information of the incoming image.

The display panel 235 may include one or more pixel areas 236. R, G, B light emitting elements such as OLEDs may be formed at the pixel areas 236 to define Red, Green, and Blue (R,G,B) colors in an image. On one area of the pixel area 236, i.e., on a corner of the pixel area 236 to be more specific, a switching device, i.e., a TFT (not illustrated) is formed. When the TFT turns on, grayscale voltage is provided from the data driver 233 to the respective R, G, B light emitting devices. The R, G, B light emitting devices may provide the light corresponding to the provided electricity, based on the grayscale voltage. That is, the R, G, B light emitting devices provide more light, as more electricity is provided.

Figure 44:
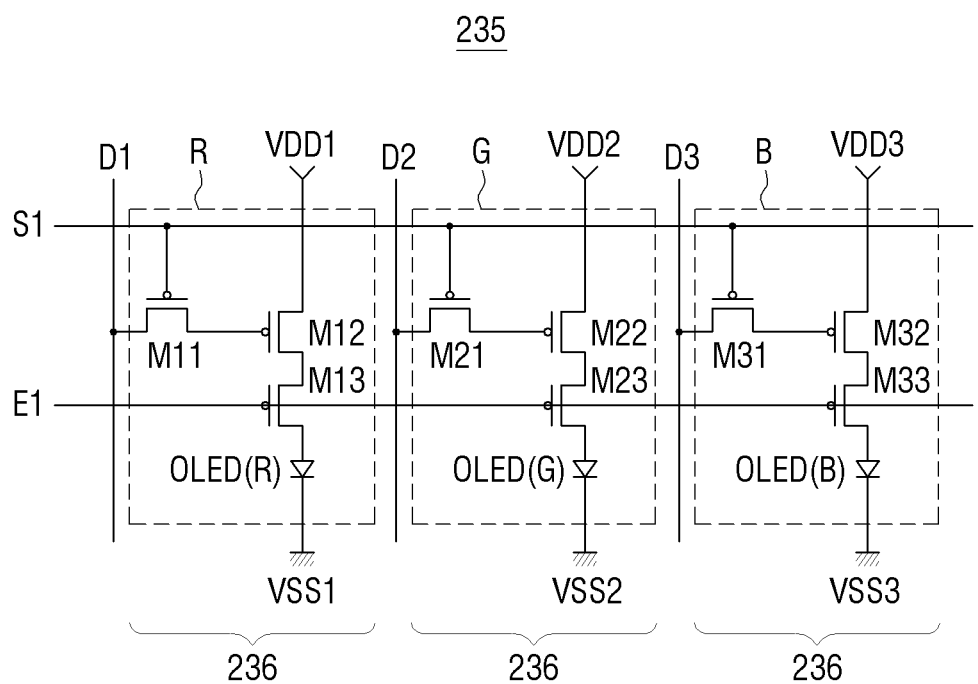
FIG. 44 is a view illustrating a circuit structure that constructs R, G, B pixels of a display panel illustrated in FIG. 43.

FIG. 44 is illustrating a circuit structure of the R, G, B pixel areas 236 of the display panel 235 illustrated in FIG. 43, specifically in the region denoted by the dotted box in FIG. 43.

Referring to FIG. 44, the display panel 235 includes three pixel areas 236 corresponding to R, G, and B. The R, G, B pixel areas 236 may include first switching elements (M11, M21, M31) operating in response to a scan signal provided through scan line S1, and a gate on voltage (Vgh), second switching elements (M12, M22, M32) outputting electric current based on the pixel values including varied high grayscale values as provided to the data lines (D1~Dn), and third switching elements (M13, M23, M33) which adjust the current amount provided from the second switching elements (M12, M22, M23) to the R, G, B light emitting devices in accordance with a control signal provided from the timing controller 231 through a line E1. The third switching elements (M13, M23, M33) may be connected to the organic light emitting diode (OLED) and supply electric current to the OLED. The OLED indicates a display which emits lights in itself by the light emitting principle of the electromagnetic field when electrical current flows to fluorescent or phosphorescent organic thin films. The anode of the OLED is connected to pixel circuit, while the cathode is connected to the corresponding VSS of the pixel area 236. The OLED constructed as above generates a predetermined brightness of light in response to the electric current supplied from the pixel circuit. The gate electrodes of the first switching elements (M11, M21, M31) are connected to the scan line (S1), while one of the source and drain electrodes is connected to the data line D1. Accordingly, the display panel 235 may be implemented as an active matrix organic light-emitting diode (AM-OLED) panel. However, an exemplary embodiment of the present general inventive concept is not limited to any of the specific exemplary embodiments explained above. Accordingly, the possibility of using a passive matrix organic light-emitting diode (PM OLED), which drives by simultaneous illumination of one line, is not excluded.

Although FIG. 44 illustrates OLED, one will understand that various display technologies such as liquid crystal display (LCD) panel, plasma display panel (PDP, vacuum fluorescent display (VFD), field emission display (FED), or electro luminescence display (ELD), for example, may also be used.

Figure 45:
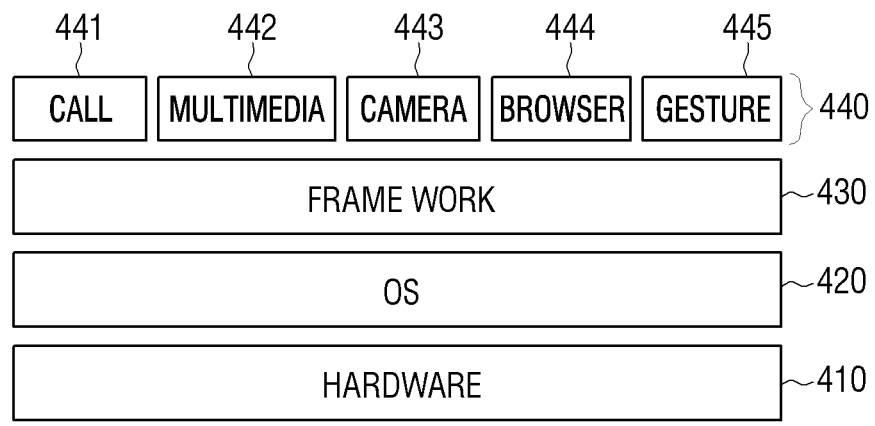
FIG. 45 is a view illustrating a system hierarchy structure of a multi display apparatus, according to an exemplary embodiment of the present general inventive concept.

FIG. 45 illustrates a hierarchical structure of a multi display apparatus system according to an exemplary embodiment of the present general inventive concept. The multi display apparatus 100 may include, in addition to hardware 410, a variety of software such as, for example, an operating system (OS, 420), a frame work 430, and an application layer 440 including applications such as a call application 441, a multimedia application 442, a camera application 443, a browser 444, or a gesture recognition application 445.

The hardware 410 may include various components as illustrated for example in FIGS. 39 and 40.

The OS 420 may control the overall operation of the hardware 410. That is, the OS 420 is on a layer to handle basic functions such as hardware management, memory and safety. The OS 420 may control the operation of the multi display apparatus 100 by driving modules such as a display driver 175-2 to drive the displays 190, a communication driver to transmit and receive data, a camera driver (not illustrated) to drive an imaging module 140, an audio driver (not illustrated) to drive an audio unit such as a speaker 163, or a power management module (not illustrated).

The frame work 430 is the upper layer to the OS 420. The frame work 430 plays a role of connecting the application layer 440 to the OS layer 420. That is, the frame work 430 includes a location manager (not illustrated), a notification manager (not illustrated), or a frame buffer (not illustrated) to display image on a display 190.

The application layer 440 is the upper layer to the frame work layer 430, and this implements various functions of the multi display apparatus 100. For example, the application layer 440 may include various application programs such as, for example, a call application 441, a multimedia application 442, a camera application 443, a browser application 444, and a gesture recognition application 445.

Figure 46:
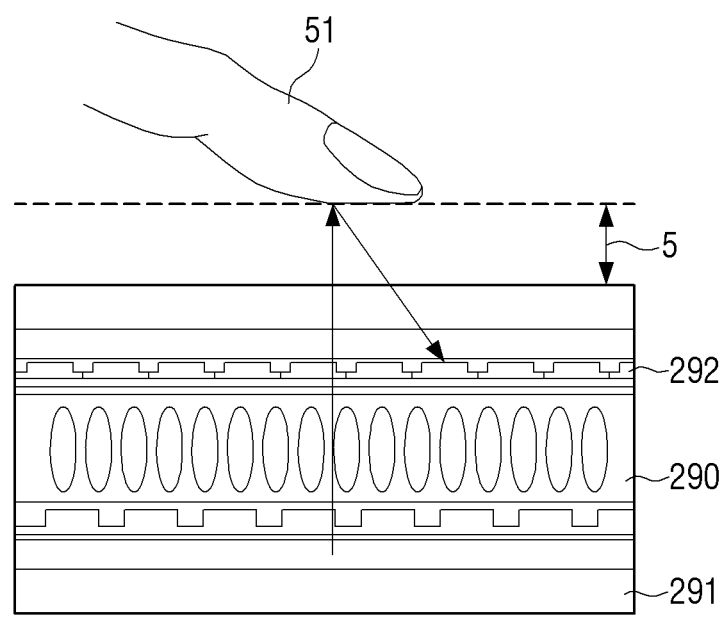
FIGS. 46 to 47 illustrate a method of detecting near touch.

FIG. 46 illustrates a method of detecting a proximate touch.

The user may input a control command to the multi display apparatus 100 in a proximate touching manner using a proximity sensor 155. The 'proximate touch' refers to a touch gesture that is recognized in response to a motion recognized within a predetermined effect recognition area of a space, without having direct touching on the touch screen.

Referring to FIG. 46, the display may include a display panel 290, and an infrared source 291 and an infrared sensor 292 to recognize a proximate touch. The infrared source 291 emits an infrared ray to a direction of the surface of the display panel 290. To be specific, the infrared source 291 may be arranged on a lower portion of the display panel 290 that displays images, and may emit an infrared ray to a direction of the surface of the display panel 290. A predetermined area that allows recognition of approach of the user object 51 is formed above the surface of the display. This area is the effective recognition area 5 that allows recognition of the proximate touch.

The 'user object 51' refers to a means to input a command to the multi display apparatus 100 and may include, for example, a bodily part such as a hand.

When the user object 51 approaches into the effective recognition area 5, the infrared sensor 292 senses the infrared ray emitted from the infrared source 291 and reflected from the user object 51 which is approaching, as illustrated by the arrows in FIG. 46. The infrared sensor 292 generates an infrared scan image based on the sensed infrared ray. That is, the infrared sensor 292 may generate an infrared scan image corresponding to infrared rays reflected from the accessing user object 51, using a plurality of infrared sensor devices arranged in an array. The multi display apparatus 100 may detect the proximate touch input, using the generated infrared scan image.

Figure 47:
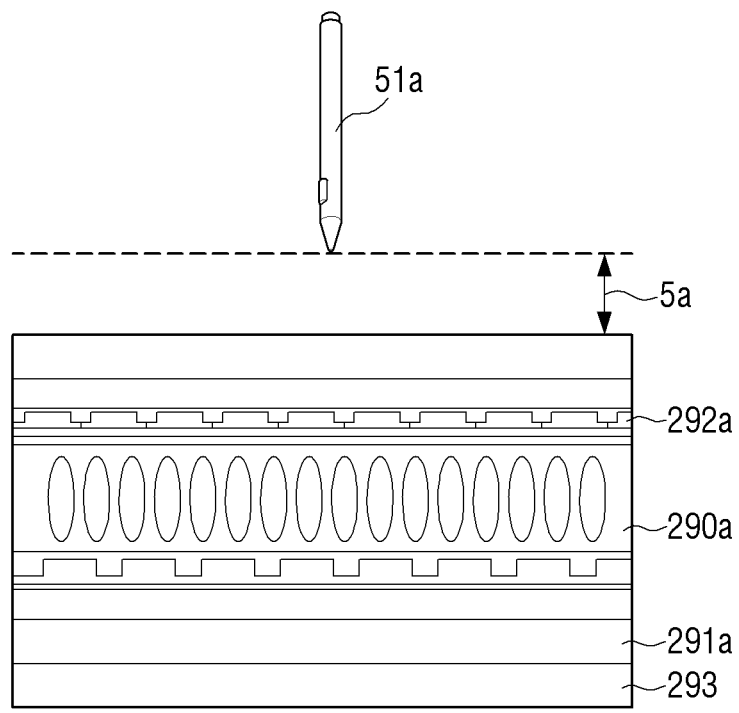

FIG. 47 illustrates a method of detecting proximate touch, according to another exemplary embodiment of the present general inventive concept. The user may input a control command to the multi display apparatus 100 in the proximate touching manner using a predetermined pen 51a.

Referring to FIG. 47, the display panel 290a and the proximate sensor source 291a emitting infrared rays, and the infrared sensor 292a, as illustrated above with reference to FIG. 46, are included. To allow proximate touch recognition, the pen 51a may include a coil (not illustrated). The display may include a capacitive sensor 293. The capacitive sensor 293 may include several coils (not illustrated).

When the pen 51a, including the coil therein, approaches within a predetermined distance (5a), electric current is induced on the coil of the capacitive sensor 293 by the electrostatic induction. The current is induced most greatly at the coil nearest to the pen 51a, and induced less as farther away from the pen 51a. Accordingly, the controller 130 recognizes the point with the highest induction of current to be the location of the pen 51a.

The display 190 as illustrated in FIG. 47 includes the infrared sensor 292a, and accordingly, the pen 51a approaching within a predetermined distance is recognized at both the infrared sensor 292a and the electrostatic sensor 293. Accordingly, the recognition at the electrostatic sensor 293 is given priority to solve a double recognition problem.

Figure 48:
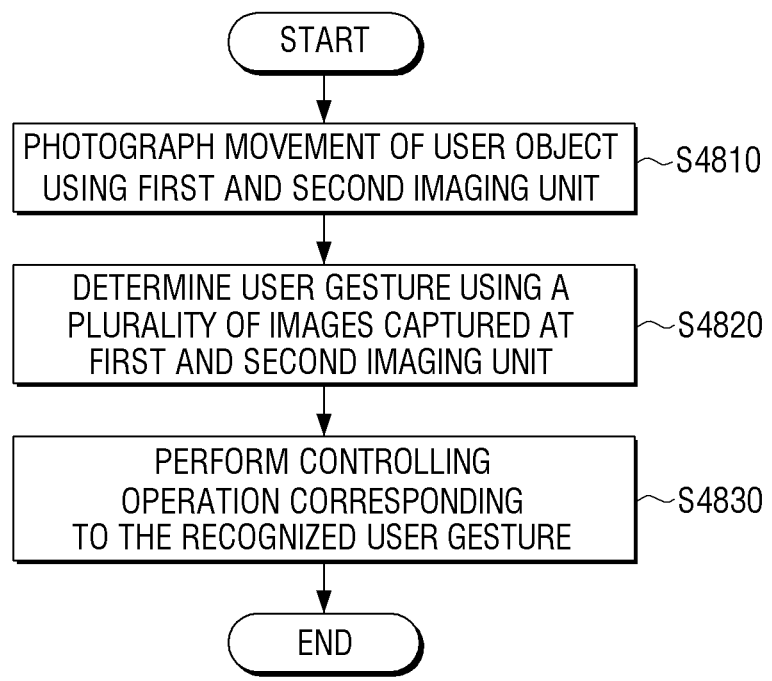
FIG. 48 is a flowchart illustrating a control method of a multi display apparatus according to an exemplary embodiment of the present general inventive concept.

FIG. 48 is a flowchart illustrating a control method of a multi display apparatus 100 according to an exemplary embodiment of the present general inventive concept.

Referring to FIG. 48, the multi display apparatus 100 photographs a movement of a user object 51 using the first and second imaging units 140a and 140b, at operation S4810. As explained above in various exemplary embodiments of the present general inventive concept, the multi display apparatus 100 may include a plurality of displays 190 and a hinge 185 connecting the displays 190. The first and second imaging units 140a and 140b may photograph the images of the user object 51 in respective recognition ranges 6 and 7. When the first and second imaging units 140a and 140b are arranged at different locations, the images of the user object 51 are photographed from different angles and acquired accordingly.

At operation S4820, the multi display apparatus 100 determines the user gesture recognized using the photographed images, after the gesture is photographed. As explained above, by analyzing the user gesture based on a plurality of images captured at different angles, even 3D gesture can be recognized and accuracy is enhanced. The method of recognizing the user gesture using a plurality of images has been explained above and will not be further explained for the sake of brevity.

When the user gesture is recognized, at operation S4830 the multi display apparatus 100 performs a control operation corresponding to the recognized user gesture. The multi display apparatus 100 detects the previously stored control command information to control command information that matches the recognized user gesture. The multi display apparatus 100 then performs an operation corresponding to the detected control command. An example of the operation has been explained above and will not be redundantly explained below for the sake of brevity.

According to various exemplary embodiments of the present general inventive concept, a multi display apparatus 100 having a plurality of displaying means recognizes a user's gestures with a plurality of imaging units and controls the operation according to the user's gestures. As a result, motion control based on more various user gestures is possible, and recognition accuracy also increases greatly. Above all, the user satisfactory greatly increases, as the user is enabled to control the multi display apparatus 100 more easily and conveniently.

According to various exemplary embodiments of the present general inventive concept, controlling a multi display apparatus becomes easier and more convenient using spatial gestures The input method using user gesture may be combined with other inputting methods such as touching, button inputting or voice recognition, to further increase the operability of the multi display apparatus 100.

The above-described exemplary embodiments of the present general inventive concept describe a multi display apparatus 100 which is suitable for portable applications, such as a smart phone or a tablet PC. However, the present general inventive concept is not limited to only these applications. Other exemplary embodiments of the present general inventive concept may use stationary displays, such as desktop PCs or wall-mounted televisions, which the user may control at a distance with gestures captured through imaging units in a similar manner to that described above in the exemplary embodiments of the present general inventive concept, or personal laptop devices, which two users may transfer documents, images, etc., with gestures captured through imaging units on each of the individual laptop devices.

Other exemplary embodiments of the present general inventive concept do not require the plurality of displays 190 to be connected to each other by a hinge 185 or other device. The displays 190 of the multi display apparatus 100 may be physically separated from one another and communicate wirelessly, so long as the recognition ranges of the imaging units are calibrated such that they overlap and create a gesture recognition area 10 to recognize a user's gesture.

An exemplary embodiment of display devices connected wirelessly is illustrated in FIG. 49. Two user terminals 1000a and 1000b may be tablet PCs, laptops, or other devices respectively equipped with displays 190a and 190b and imaging units 140a and 140b. These user terminals 1000a and 1000b may be connected over a wireless protocol such as Wi-Fi, as illustrated by the double arrow. The imaging units 140a and 140b of user terminals 1000a and 1000b may be adjustable to direct the recognition ranges 6 and 7. For example, the imaging units 140a and 140b may be rotatable by an angle of θa and θb, similar to the exemplary embodiment illustrated in FIG. 33. If at least one of the user terminals 1000a and 1000b is configured as the controller 130, and the respective imaging units 140a and 140b are angled such that their recognition ranges 6 and 7 overlap to produce a gesture recognition area 10, user gestures can be used to input commands to the user terminals 1000a and 1000b, similar to exemplary embodiments of present general inventive concept described above. Such a configuration also allows a user to transfer content between user terminals 1000a and 1000b by dragging content from one user terminal to another, similarly to the manner described above with respect to FIG. 19, for example. Further, the respective controllers can communicate via wireless connection to communicate the observed gestures.

Furthermore, the user object 51 does not need to be a user's hand or pen 51a. The user object 51 may be any object which can make a motion that the imaging module 140 can recognize. For example, the user's face or eye may be used as the user object 51, and the user may control the multi display apparatus 100 with their facial expression or eye movements. In this manner, users who lack the use of hands may still utilize the multi display apparatus 100 described herein.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

In one example, a non-transitory computer readable medium storing therein a program to implement operations of photographing using a first imaging unit 140a provided on a first body 2 of the multi display apparatus 100 and photographing using a second imaging unit 140b provided on a second body 4, recognizing user gesture using a plurality of images photographed at the respective imaging units 140a and 140b, and controlling according to the recognized user gestures, may be provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi display apparatus, comprising:
   a first body comprising a first display;
   a second body comprising a second display;
   a hinge to connect the first and second bodies to each other;
   a first imaging unit provided on the first body and having a first recognition range;
   a second imaging unit provided on the second body and having a second recognition range; and
   a controller to recognize a user's gesture using a plurality of images photographed at the first and second imaging units, and perform a corresponding control operation in response to the recognized user gesture, the controller recognizing the user's gesture within an overlapping range between the first recognition range and the second recognition range, using a direction of movement of a user object moving in the first recognition range and a direction of movement of the user object moving in the second recognition range.

2. The multi display apparatus of claim 1, wherein the controller detects an angle between the first and second bodies with reference to the hinge, and activates the first and second imaging units when the detected angle is within a preset angle range.

3. The multi display apparatus of claim 1, wherein the controller recognizes the user's gesture three-dimensionally.

4. The multi display apparatus of claim 1, wherein the controller recognizes the user's gesture as a stereo image.

5. The multi display apparatus of claim 1, wherein, when the user object moves, thus forming one successive pattern, the controller successively performs a plurality of control operations corresponding to respective user's gestures forming the successive pattern.

6. The multi display apparatus of claim 1, wherein the user's gesture comprises one of a single finger gesture, a two finger gesture, a multi finger gesture, a palm gesture, a multi palm gesture, a first gesture, and a multi first gesture.

7. The multi display apparatus of claim 1, wherein the controller performs an operation of selecting an icon, when recognizing a grip gesture with respect to the icon displayed on the first or second display.

8. A control method of a multi display apparatus comprising a first body comprising a first display, a second body comprising a second display, and a hinge which connects the first and second bodies to each other, the control method comprising:
   photographing a user object, using a first imaging unit provided on the first body and a second imaging unit provided on the second body;
   recognizing a user's gesture within an overlapping range between a first recognition range of the first imaging unit and a second recognition range of the second imaging unit, using a plurality of images of the user object photographed by the first and second imaging units, respectively, to determine a direction of movement of the user object moving in the first recognition range and a direction of movement of the user object moving in the second recognition range; and
   performing a corresponding control operation in response to the recognized user's gesture.

9. The control method of claim 8, wherein the recognizing the user's gesture comprises:
   detecting an angle between the first and second bodies with reference to the hinge; and
   activating the first and second imaging units when the detected angle is within a preset angle range.

10. The control method of claim 8, wherein the user's gesture is recognized three-dimensionally.

11. The control method of claim 8, wherein the user's gesture is recognized as a stereo image.

12. The control method of claim 8, wherein, when the user object moves, thus forming one successive pattern, the performing the control operation comprises:
    successively performing a plurality of control operations corresponding to respective user's gestures forming the successive pattern.

13. The control method of claim 8, wherein the user's gesture comprises:
    one of a single finger gesture, a two finger gesture, a multi finger gesture, a palm gesture, a multi palm gesture, a first gesture, and a multi first gesture.

14. The control method of claim 8, wherein the performing the control operation comprises:
    performing an operation of selecting an icon, when a grip gesture with respect to the icon displayed on the first or second display is recognized.

15. A non-transitory computer-readable medium to contain computer-readable codes as a program to execute the control method of claim 8.

16. A multi display apparatus, comprising:
    a plurality of displays;
    a first imaging unit having a first recognition range;
    a second imaging unit having a second recognition range; and
    a controller to determine a user gesture based on a plurality of images of a first user object captured by the first and second imaging units in a gesture recognition area where the first and second recognition ranges overlap, and to perform a command operation corresponding to the determined user gesture.

17. The multi display apparatus of claim 16, wherein the first user object comprises:
    at least one of a user's hand, a user's face, a user's eye, or a stylus pen.

18. The multi display apparatus of claim 16, wherein the user gesture corresponds to a movement of the first user object determined by the controller based on the plurality of images of the first user object captured by the first and second imaging units.

19. The multi display apparatus of claim 16, wherein the plurality of displays are connected to one another by a flexible connector.

20. The multi display apparatus of claim 16, further comprising:
    a sensor to determine an orientation of the plurality of displays relative to each other;
    wherein the controller performs a command operation corresponding to the determined user gesture and the determined orientation of the plurality of displays.

21. The multi display apparatus of claim 16, wherein:
    the first and second imaging units capture a plurality of images of a plurality of user objects; and
    the controller determines the user gesture based on the plurality of images of the plurality of user objects captured by the first and second imaging units.

22. The multi display apparatus of claim 16, wherein the command operation comprises transferring content from a first one of the plurality of displays to a second one of the plurality of displays.

23. The multi display apparatus of claim 22, wherein the content comprises:
an application executable by the controller, the application being executed after it is transferred to the second one of the plurality of displays.

24. The multi display apparatus of claim 16, wherein at least one of the first and second recognition ranges may be adjusted independently of an orientation of the displays.

25. The multi display apparatus of claim 16, wherein at least one of the plurality of displays is a touch screen.

26. The multi display apparatus of claim 25, wherein the touch screen is configured to accept input from the first user object when the first user object approaches within a predetermined distance from the touch screen.

27. The multi display apparatus of claim 16, wherein the plurality of displays are connected wirelessly to each other and the controller.

28. A control method of a multi display apparatus having a plurality of displays, the method comprising:
capturing a plurality of images of a first user object within a first recognition range;
capturing a plurality of images of the first user object within a second recognition range;
determining a user gesture within a gesture recognition area where the first and second recognition ranges overlap, based on the captured images of the user object; and
performing a command operation corresponding to the determined user gesture.

\* \* \* \* \*